(12) United States Patent
Guo et al.

(10) Patent No.: US 11,503,759 B2
(45) Date of Patent: *Nov. 22, 2022

(54) GRASS TRIMMING HEAD AND GRASS TRIMMER HAVING THE SAME

(71) Applicant: Nanjing Chervon Industry Co., Ltd., Nanjing (CN)

(72) Inventors: Jianpeng Guo, Nanjing (CN); Toshinari Yamaoka, Nanjing (CN); Fangjie Nie, Nanjing (CN); Qi Zhang, Nanjing (CN); Zongjing Li, Nanjing (CN); Fei Wang, Nanjing (CN); Lanxi Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 77 days.

This patent is subject to a terminal disclaimer.

(21) Appl. No.: 17/066,502

(22) Filed: Oct. 9, 2020

(65) Prior Publication Data
US 2021/0022287 A1    Jan. 28, 2021

Related U.S. Application Data

(63) Continuation of application No. 16/781,147, filed on Feb. 4, 2020, now Pat. No. 10,856,466, which is a
(Continued)

(30) Foreign Application Priority Data

Aug. 7, 2017    (CN) .......................... 201720979716.X
Aug. 7, 2017    (CN) .......................... 201720979787.X

(51) Int. Cl.
*A01D 34/416*    (2006.01)
*A01D 101/00*    (2006.01)

(52) U.S. Cl.
CPC ...... *A01D 34/4166* (2013.01); *A01D 2101/00* (2013.01)

(58) Field of Classification Search
CPC .............. A01D 34/4166; A01D 34/416; A01D 2101/00
See application file for complete search history.

(56) References Cited

U.S. PATENT DOCUMENTS

| 4,680,213 A | 7/1987 | Fourezon |
| 4,906,506 A | 3/1990 | Nishimura et al. |
| (Continued) |

FOREIGN PATENT DOCUMENTS

| CN | 203633147 U | 6/2014 |
| CN | 204168758 U | 2/2015 |
| (Continued) |

OTHER PUBLICATIONS

ISA/CN, International Search Report issued on PCT application No. PCT/CN2018/096413, dated Oct. 25, 2018, 2 pages.
(Continued)

*Primary Examiner* — Hwei-Siu C Payer
(74) *Attorney, Agent, or Firm* — Greenberg Traurig, LLP

(57) ABSTRACT

A grass trimming head includes a housing assembly and a spool. The housing assembly is formed with a housing cavity and an outer aperture for allowing a cutting line to be inserted from an outside of the housing assembly into the housing cavity. At least a portion of the spool is arranged inside the housing cavity, and the spool is rotatable with respect to the housing assembly about a central axis. The spool is formed with an inner aperture for allowing the cutting line to be inserted into the spool or a clamping portion configured to fix the cutting line.

18 Claims, 52 Drawing Sheets

Related U.S. Application Data continuation of application No. PCT/CN2018/096413, filed on Jul. 20, 2018.

(56) References Cited

U.S. PATENT DOCUMENTS

| | | | |
|---|---|---|---|
| 5,175,932 | A | 1/1993 | Lange et al. |
| 5,659,960 | A | 8/1997 | Everts et al. |
| 5,695,404 | A | 12/1997 | Shaulis |
| 6,148,523 | A | 11/2000 | Everts et al. |
| 6,301,788 | B1 | 10/2001 | Webster |
| 6,487,780 | B1 | 12/2002 | Peterson et al. |
| 8,025,249 | B2 * | 9/2011 | Alliss ............... A01D 34/4165 30/276 |
| 9,516,807 | B2 | 12/2016 | Alliss |
| 9,517,555 | B2 | 12/2016 | Racov et al. |
| 10,273,112 | B2 | 4/2019 | Alliss |
| 10,517,210 | B2 | 12/2019 | Cabrera |
| 10,856,466 | B2 * | 12/2020 | Guo ............... A01D 34/4166 |
| 2003/0229993 | A1 | 12/2003 | Agne |
| 2013/0236667 | A1 | 9/2013 | Kenney et al. |
| 2015/0150191 | A1 | 6/2015 | Alliss |
| 2015/0342116 | A1 | 12/2015 | Sprungman et al. |
| 2015/0344646 | A1 | 12/2015 | Hansen |
| 2016/0021819 | A1 | 1/2016 | Nakano et al. |
| 2016/0219783 | A1 | 8/2016 | Kitamura |
| 2017/0079204 | A1 | 3/2017 | Yamaoka |
| 2017/0238461 | A1 * | 8/2017 | Cabrera ............... A01D 34/416 |
| 2018/0177135 | A1 | 6/2018 | Fu |
| 2019/0075721 | A1 | 3/2019 | Cholst |
| 2020/0008348 | A1 * | 1/2020 | Guo ............... A01D 34/4162 |
| 2020/0017182 | A1 | 1/2020 | Guo |
| 2020/0112227 | A1 | 4/2020 | Kouda et al. |
| 2021/0022287 | A1 * | 1/2021 | Guo ............... A01D 34/4166 |
| 2021/0185912 | A1 | 6/2021 | Wilks |
| 2021/0368676 | A1 | 12/2021 | Guo et al. |

FOREIGN PATENT DOCUMENTS

| | | |
|---|---|---|
| CN | 105393697 A | 3/2016 |
| CN | 106993429 A | 8/2017 |
| CN | 207720711 U | 8/2018 |
| EP | 0955800 A1 | 11/1999 |
| EP | 0955800 B1 | 10/2003 |
| EP | 3130212 A1 | 2/2017 |
| FR | 3013251 A1 | 5/2015 |

OTHER PUBLICATIONS

European Patent Office, extended European search report issued on European patent application No. 18843837.8, dated Aug. 13, 2020, 5 pages.

U.S. Patent and Trademark Office, Non-Final Office Action issued in U.S. Appl. No. 17/402,976, dated Dec. 13, 2021, 11 pgs.

U.S. Patent and Trademark Office, Non-Final Office Action issued in U.S. Appl. No. 17/402,976, dated Mar. 25, 2022, 16 pgs.

U.S. Patent and Trademark Office, Final Office Action issued in U.S. Appl. No. 17/402,976, dated Jul. 12, 2022, 18 pgs.

* cited by examiner

GRASS TRIMMING HEAD AND GRASS TRIMMER HAVING THE SAME

RELATED APPLICATION INFORMATION

The present application is a continuation of U.S. application Ser. No. 16/781,147, now U.S. Pat. No. 10,856,466, filed Feb. 4, 2020, which claims the benefit of International Application Number PCT/CN2018/096413, filed on Jul. 20, 2018, through which this application claims the benefit of Chinese Patent Application No. 201720979787.X, filed on Aug. 7, 2017, and Chinese Patent Application No. 201720979716.X, filed on Aug. 7, 2017, each of which is incorporated herein by reference in its entirety.

TECHNICAL FIELD

The present disclosure relates to a grass trimming head and a grass trimmer having the same.

BACKGROUND

A grass trimmer is a gardening tool and used to trim the lawn. The grass trimmer includes a grass trimming head. The grass trimming head is rotated at a high speed to drive a cutting line mounted on the grass trimming head to rotate, realizing the cutting function.

The grass trimming head includes a spool allowing the cutting line to be wound thereon. During the cutting operation, the cutting line is worn away gradually due to wear. After operating for a period, it is needed to change a new cutting line and wind the new cutting line around the spool. For the existing grass trimming head, the spool needs to be disassembled to wind the cutting line around the spool. The winding manner is time consuming and laborious, and the situation of blocking the cutting line is more likely to occur.

SUMMARY

In order to solve the shortcomings of the related art, an object of the present disclosure is to provide a grass trimming head capable of conveniently winding and a grass trimmer having the same.

In order to achieve this object, the technical scheme adopted by the present disclosure is as follows.

A grass trimming head, includes a housing and a spool. The housing assembly is formed with a housing cavity and provided with an outer aperture for allowing a cutting line to be inserted from an outside of the housing assembly into the housing cavity. At least a portion of the spool is arranged inside the housing cavity, and the spool is rotatable with respect to the housing assembly about a central axis. And the spool is provided with an inner aperture for allowing the cutting line to be inserted into the spool or a clamping portion configured to fix the cutting line.

In one example, the spool includes an upper spool portion and a lower spool portion around. The first flange portion is connected to an upper end of the upper winding portion. The second flange portion is connected to a lower end of the upper winding portion. The lower spool portion includes a lower winding portion, a third flange portion and a fourth flange portion. The lower winding portion is configured for winding the cutting line. The third flange portion is connected to an upper end of the lower winding portion. And the fourth flange portion is connected to a lower end of the lower winding portion. The upper spool portion is coupled to the lower spool portion to form a line guide passage configured for the cutting line passing through the spool.

In one example, the line guide passage extends along a curved line.

In one example, the upper spool portion is coupled to the lower spool portion to form at least two line guide passages intersected with each other.

In one example, the upper spool portion is coupled to the lower spool portion to form three line guide passages. Any two of the three line guide passages are intersected with each other, and the three line guide passages are arranged around the central axis.

In one example, the housing assembly includes an upper housing and a lower housing. The spool is arranged between the upper housing and the lower housing. The lower housing is provided with a protrusion portion protruding towards the upper housing, and the lower spool portion is formed with a groove matched with the protrusion portion. And the protrusion portion is matched with the groove to guide the housing assembly to move with respect to the spool along the central axis.

In one example, the grass trimming head further includes a bearing and a knocking cap. The protrusion portion is formed with a mounting groove. The bearing is arranged inside the mounting groove, and the bearing is connected to the knocking cap and the lower housing.

In one example, the grass trimming head further includes a spring. The groove is arranged throughout the lower spool portion along the central axis. The spring protrudes out of the groove. The spring is arranged between the upper spool portion and the lower housing, and configured to an acting force causing the upper spool portion and the lower housing to go away from each other.

In one example, the upper housing is formed with a first matching tooth. The spool is formed with a first engaging tooth matched with the first matching tooth, and the first engaging tooth is formed with an inclined surface.

In one example, the grass trimming head further includes an eyelet member. The eyelet member is fixed to the housing assembly and configured for the cutting line passing out from the housing assembly.

In one example, the housing assembly includes a housing and an eyelet member. The housing is formed with the housing cavity, and the eyelet member is fixed to the housing and formed with the outer aperture. The spool is formed with the inner aperture, and a distance from the eyelet member to the spool is less than or equal to 3 mm.

In one example, the spool includes at least one winding portion configured for winding the cutting line and two flange portions arranged at two ends of the at least one winding portion. The inner aperture is arranged on the at least two flange portions. And a distance from the eyelet member to each flange portion is less than or equal to 3 mm.

In one example, the eyelet member is formed with two bumps protruding towards the spool, and the two bumps are arranged on two sides of the outer aperture respectively.

In one example, the two bumps are arranged along a circumferential direction of the central axis.

In one example, the spool includes an upper winding portion, a lower winding portion, a middle flange portion, an upper flange portion, and a lower flange portion. The upper winding portion is configured for winding the cutting line. A lower winding portion is configured for winding the cutting line. A middle flange portion is located between the upper winding portion and the lower winding portion and formed with the inner aperture for the cutting line to be inserted into An upper flange portion is connected to an upper end of the upper winding portion. And the lower flange portion is connected to a lower end of the lower winding portion. The two bumps are located between an upper surface and a lower surface of the middle flange portion along the central axis.

In one example, the outer aperture is a waist-shaped hole. A size of the outer aperture along the central axis is defined as a height of the outer aperture. A size of the outer aperture along a direction perpendicular to the central axis is defined as a width of the outer aperture. A size of the outer aperture along an extending direction is defined as a depth of the outer aperture. A distance between the two bumps is the same as the width of the outer aperture. And the width of outer aperture is greater than the height of the outer aperture.

In one example, the eyelet member is formed with a notch on one side of a projection of the eyelet member on a plane perpendicular to the central axis, the one side of the projection faces towards the spool.

In one example, a distance from the eyelet member to a flange portion is less than a maximum outer diameter of the cutting line.

In one example, the grass trimming head further includes a driving member configured to apply an acting force to the housing assembly or the spool. The acting force causes the housing assembly and the spool to relatively rotate. The spool has a line loading position with respect to the housing assembly. In condition that the spool is at the line loading position with respect to the housing assembly, the cutting line be directly inserted into the inner aperture or the clamping portion after passing through the outer aperture. The housing assembly is formed with a first positioning surface, and the spool is formed with a second positioning surface matched with the first positioning surface. In condition that one of the spool and the housing assembly is rotated with respect to another to cause the first positioning surface and the second positioning surface to be in contact, the spool is at the line loading position.

In one example, the driving member is a spring. The spring is arranged between the housing assembly and the spool, and configured to apply the acting force to the spool or the housing assembly, and the acting force causes the first positioning surface and the second positioning surface to go towards each other.

In one example, the housing assembly is formed with a plurality of first matching teeth arranged around a circumferential direction of the central axis, and the spool is formed with a plurality of first engaging teeth matched with the plurality of first matching teeth. The spring is configured to apply the acting force to the spool or the housing assembly, and the acting force causes the first matching teeth and the second matching teeth to be in contact. Each of the first matching teeth or the first engaging teeth is provided with an inclined surface inclined to a normal surface of the central axis. Each of the first matching teeth is formed with the first positioning surface, and each of the first engaging teeth is formed with the second positioning surface. A number of the first engaging teeth is the same as a number of inner apertures.

In one example, in condition that the first positioning surface is in contact with the second positioning surface, two sides of a matching tooth is in contact with two adjacent first engaging teeth respectively.

In one example, each of the first matching teeth is formed with a first inclined surface inclined to the normal surface of the central axis, and each of the first engaging teeth is formed with a second inclined surface inclined to the normal surface of the central axis. The first inclined surface and the first positioning surface are located on two sides of a respective matching tooth respectively, and the second inclined surface and the second positioning surface are located on two sides of a respective engaging tooth respectively. In condition that the first positioning surface is in contact with the second positioning surface, the first inclined surface is in contact with the second inclined surface.

In one example, the spool includes an upper winding portion, a lower winding portion, a middle flange portion, an upper flange portion, and a lower flange portion. The upper winding portion is configured for winding the cutting line. The lower winding portion, configured for winding the cutting line. The middle flange portion is located between the upper winding portion and the lower winding portion and formed with the inner aperture for the cutting line to be inserted into. The upper flange portion is connected to an upper end of the upper winding portion. And the lower flange portion is connected to a lower end of the lower winding portion. The first engaging teeth are arranged on the upper flange portion or the lower flange portion.

In one example, the housing assembly includes a housing and an eyelet member. The housing is formed with the housing cavity. And the eyelet member is fixed to the housing and formed with the outer aperture for the cutting line passing through. At least a portion of the eyelet member protrudes towards the spool, and a distance from the eyelet member to the middle spool is less than or equal to 3 mm.

In one example, an even number of the first engaging teeth are provided.

In one example, an angle between the inclined surface and the normal surface of the central axis is greater than or equal to 8 degrees, and less than or equal to 18 degrees.

In one example, the driving member is an elastic member. The elastic member is connected to the spool and the housing assembly, and configured to apply the acting force to the spool or the housing assembly, and the acting force causes the first positioning surface and the second positioning surface to go towards each other.

In one example, the driving member is a magnetic member. The magnetic member is connected to the spool and the housing assembly, and configured to apply the acting force to the spool or the housing assembly, and the acting force causes the first positioning surface and the second positioning surface to go towards each other.

In one example, the magnetic member includes a first magnetic member and a second magnetic member. The first magnetic member is fixed to the spool, and the second magnetic member is fixed to the housing assembly.

In one example, the spool is formed with a plurality of line guide passages for the cutting line passing throughout. The spool includes a first piece and a second piece, and the first piece is coupled to the second piece to form the plurality of line guide passages.

In one example, at least two of projections of the plurality of the line guide passages on a plane perpendicular to the central axis are intersected to each other.

In one example, the grass trimming head further includes a knocking cap. The knocking cap comprises a contact portion configured for contacting with ground. And a ratio of a projection area of the contact portion on a plane perpendicular to the central axis to a projection area of the housing assembly on the plane perpendicular to the central axis is greater than or equal to 0.3, and less than or equal to 1.

In one example, a surface of the contact portion is a smooth curved surface.

In one example, the projection area of the contact portion on the plane perpendicular to the central axis has a circular shape.

In one example, a ratio of a maximum size of the contact portion in a radial direction of the central axis to a maximum size of the spool in the radial direction of the central axis is greater than or equal to 0.7, and less than or equal to 1.1.

In one example, the housing assembly includes an upper housing and a lower housing. The knocking cap is rotatably connected to the lower housing.

In one example, the grass trimming head further includes a bearing connected to the knocking cap and the lower housing.

In one example, the lower housing is provided with a protrusion portion protruding towards the upper housing, and the spool is formed with a groove matched with the protrusion portion.

In one example, the protrusion portion is formed with a mounting groove, and the bearing is arranged inside the mounting groove.

In one example, the grass trimming head further includes a spring. At least a portion of the spring is arranged inside the groove, and the spring is connected to the lower housing and the spool.

In one example, the knocking cap is rotatably connected to the spool.

A grass trimmer, includes a grass trimming mechanism and an operation device. The grass trimming mechanism including a grass trimming head described above and a motor configured to drive the grass trimming head to rotate. The operation device is configured for being operated by the user to control the grass trimmer.

The advantage of the present disclosure is that the user can perform the winding operation quickly and conveniently without disassembling the spool.

DETAILED DESCRIPTION

Hereinafter the present disclosure will be described in detail in conjunction with accompanying drawings and examples.

Figure 1:
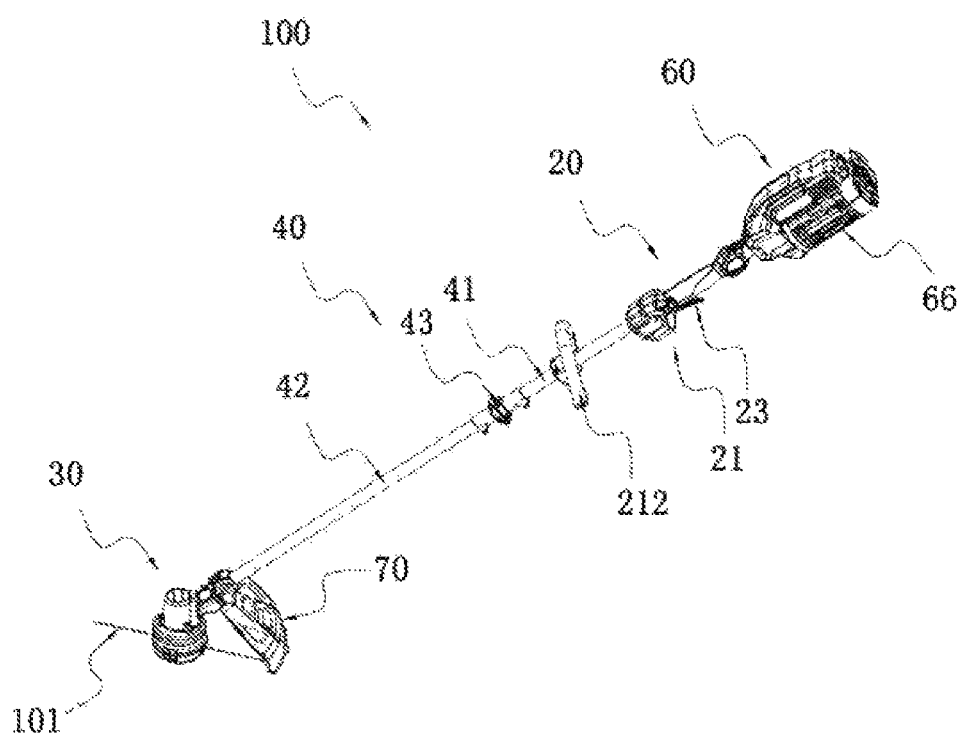
FIG. 1 is a schematic view illustrating a grass trimmer.
Figure 2:
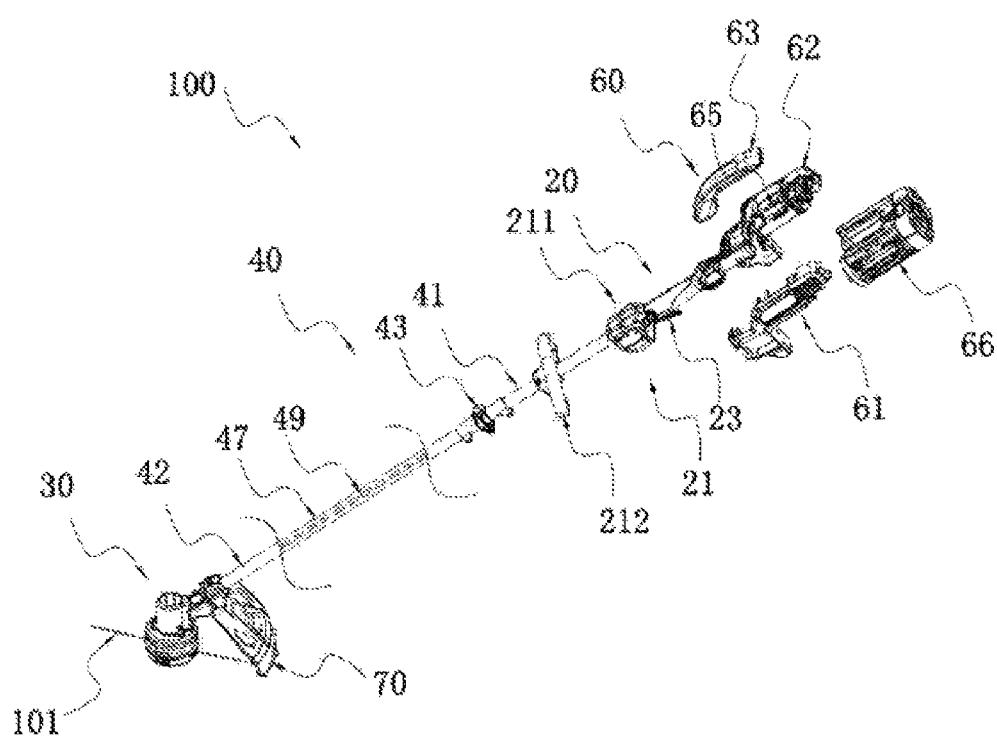
FIG. 2 is a partial structural view illustrating a grass trimmer.
Figure 3:
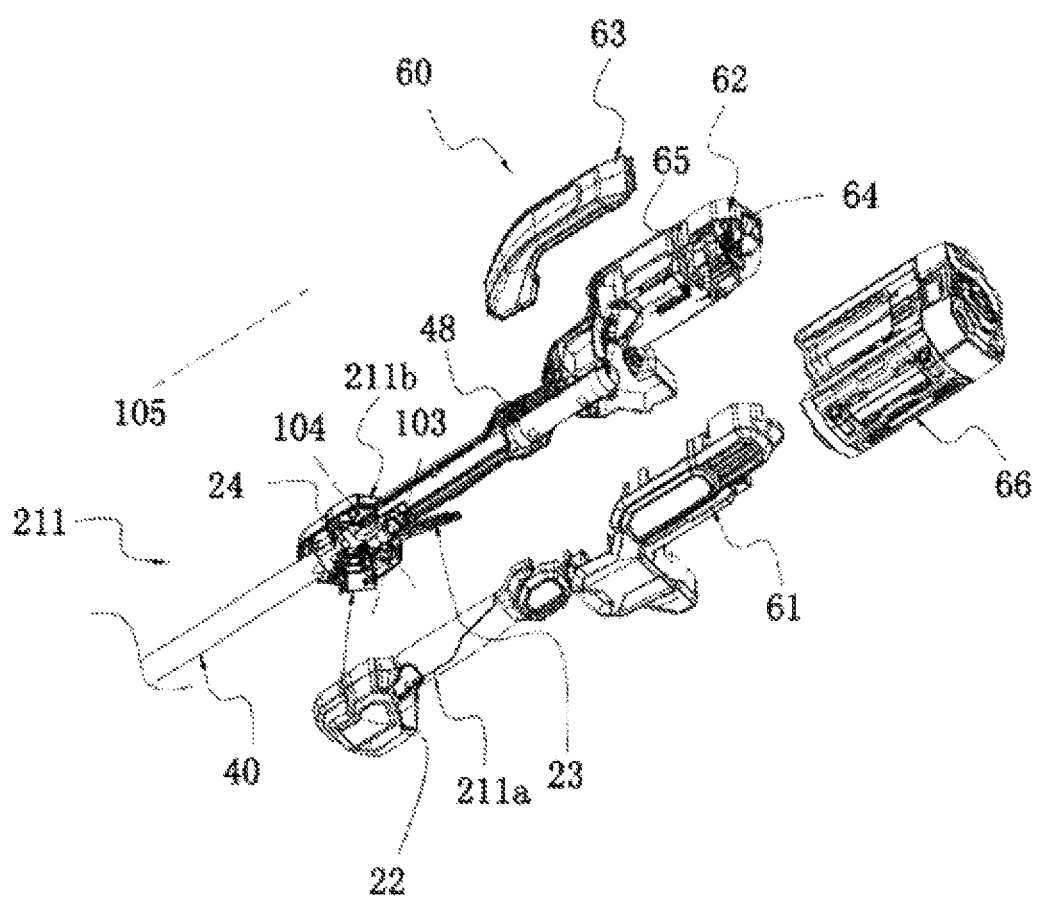
FIG. 3 is a schematic view illustrating a first housing of the grass trimmer in FIG. 2.

As shown in FIG. 1 to FIG. 3, a grass trimmer 100 includes a motor 10, an operation device 20, a grass trimming mechanism 30 and a connecting pipe 40.

The operation device 20 is used for user's operation to control the grass trimmer 100. In one example, the operation device 20 includes a handle 21, a first switch 22 and a first operation member 23. The handle 21 is used for being gripped by the user. The handle 21 includes a handle housing 211. The first switch 22 is arranged inside the handle housing 211. The handle housing 211 includes a left handle housing 211a and a right handle housing 211b. The first switch 22 is located between the left handle housing 211a and the right handle housing 211b. The connecting pipe 40 is clamped by the left handle housing 211a and the right handle housing 211b from two sides of the connecting pipe 40. In another example, the grass trimmer 100 further includes an auxiliary handle 212. The auxiliary handle 212 is fixed to the connecting pipe 40.

The first operation member 23 is used for being operated by the user so as to control the first switch 22, when the handle 21 is gripped by the user. The first switch 22 is electrically connected to the motor 10 and configured to control the motor 10. The first switch 22 may activate the motor 10 so that the grass trimmer 100 realizes the cutting function. In another example, the first switch 22 is further configured to control a rotating speed of the motor 10. The first operation member 23 is a trigger. The operation device 20 further includes a locking member 24 for preventing the first operation member 23 from being accidentally activated. When the locking member 24 is triggered, the first operation member 23 can be operated by the user. The locking member 24 is a trigger. The first operation member 23 is rotatably connected to the handle housing 211 about a first axis 103. The locking member 24 is rotatably connected to the handle housing 211 about a second axis 104. The first axis 103 is perpendicular to the second axis 104. The connecting pipe 40 extends along a first straight line 105. The first axis 103 is perpendicular to the first straight line 105. The second axis 104 is perpendicular to the first straight line 105. When the handle 21 is gripped by the user, the locking member 24 may be triggered by the thumb, and the first operation member 23 is triggered by the index finger, so that the operation is convenient and comfortable.

Figure 4:
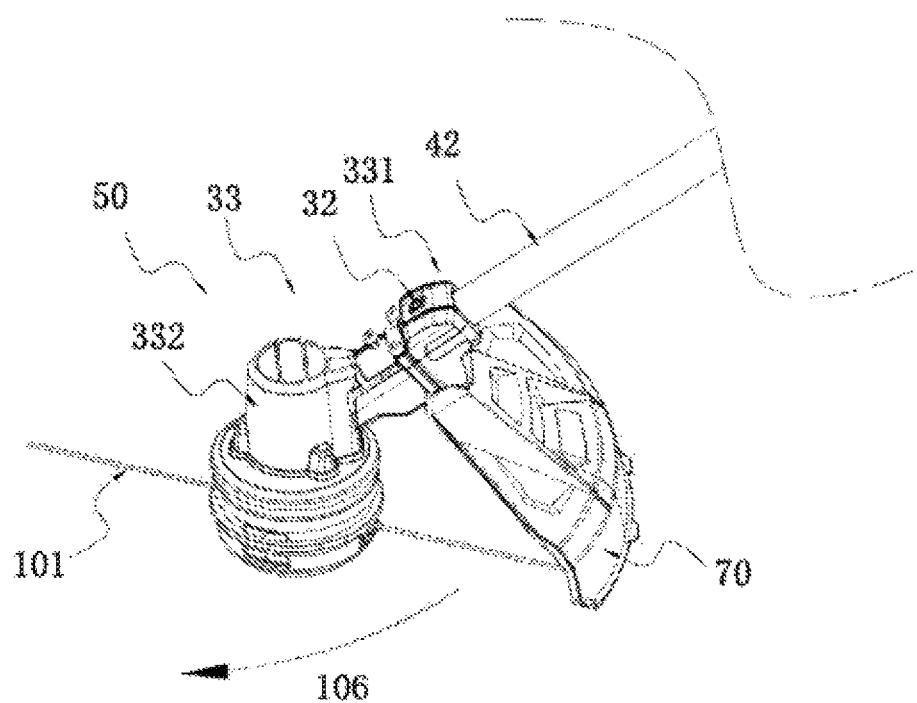
FIG. 4 is a schematic view illustrating a working housing in FIG. 1.
Figure 5:
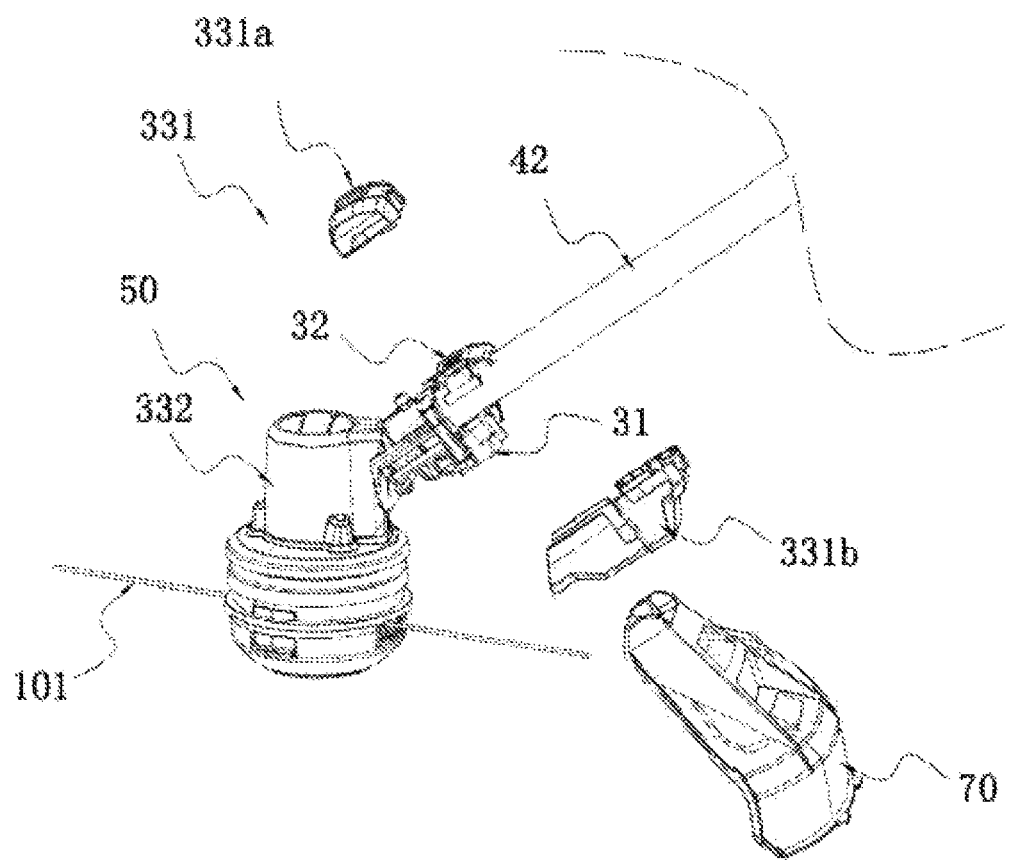
FIG. 5 is an exploded view illustrating partial structures in FIG. 4.
Figure 6:
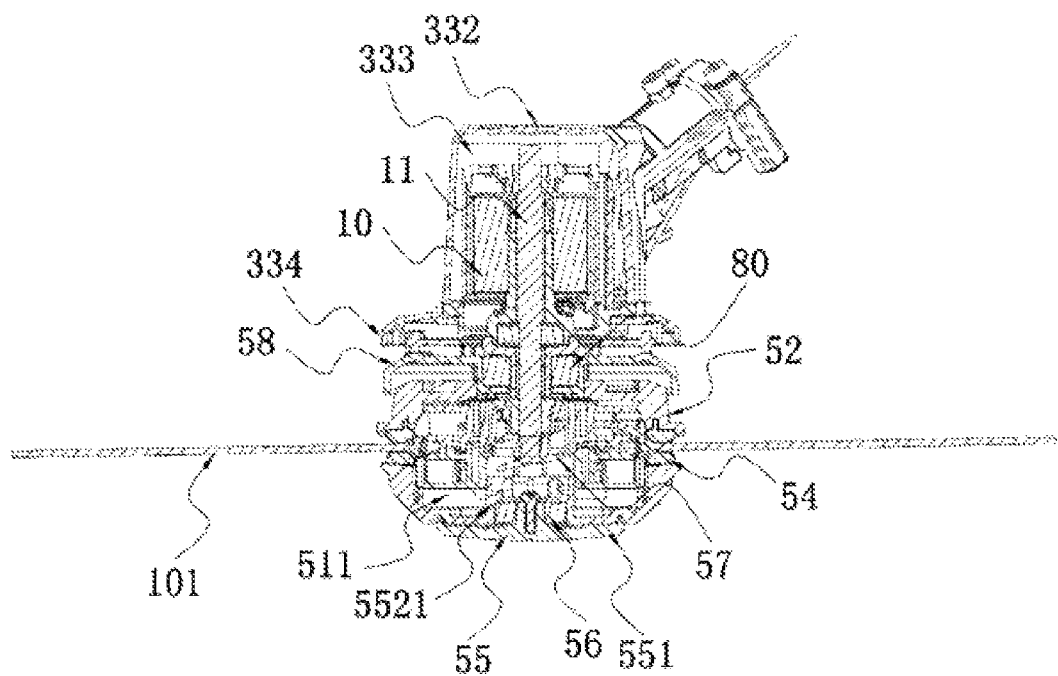
FIG. 6 is a cross-sectional view illustrating a grass trimming head and a motor in FIG. 1.

As shown in FIG. 4 to FIG. 6, the grass trimming mechanism 30 is used for realizing the tooling function. The grass trimming mechanism 30 includes a grass trimming head 50. The grass trimming head 50 is used for accommodating the cutting line 101. A portion of the cutting line 101 protruding out of the grass trimming head 50 is driven by the grass trimming head 50 to rotate so as to cut the vegetation. The motor 10 is configured to drive the grass trimming head 50 to rotate. The grass trimming head 50 includes a spool 53 and a housing 52. The spool 53 is configured for being wound by the cutting line 101. At least a portion of the spool 53 is arranged within the housing 52.

As shown in FIG. 1 to FIG. 2, the connecting pipe 40 is connected to the operation device 20 and the grass trimming mechanism 30. The connecting pipe 40 is connected to the grass trimming head 50 and a handle 21.

The grass trimmer 100 has an auto-winding mode and a cutting mode.

When the grass trimmer 100 is in the auto-winding mode, the spool 53, the housing 52 or the cutting line 101 do not need to be manually rotated, and the cutting line 101 can be automatically wound to the spool 53. In one example, when the grass trimmer 100 is in the auto-winding mode, the motor 10 drives at least one of the spool 53 and the housing 52, so that the spool 53 and the housing 52 are relatively rotated to automatically wind the cutting line 101 to the spool 53.

When the grass trimmer 100 is in the cutting mode, the motor 10 drives the spool 53 and the housing 52 to synchronously rotate, and the cutting line 101 and the spool 53 remain relatively fixed, so that the motor 10 drives the grass trimming head 50 to rotate so as to drive the cutting line 101 to rotate, achieving the cutting of the vegetation.

As shown in FIG. 5 and FIG. 6, the grass trimming mechanism 30 further includes a second switch 31 and a second operation member 32. The second switch 31 is electrically connected to the motor 10. The second operation member 32 is configured for being operated by the user to control the second switch 31. The second switch 31 is configured to control the motor 10 so that the grass trimmer 100 is in or enters the auto-winding mode. The motor 10 drives at least one of the spool 53 and the housing 52 so that the spool 53 and the housing 52 are relatively rotated to automatically wind the cutting line 101 to the spool 53. The first switch 22 is configured to control the motor 10 so that the grass trimmer 100 is in or enters the cutting mode. The motor 10 drives the spool 53 and the housing 52 to synchronously rotate so as to drive the cutting line 101 to rotate to cut the vegetation.

In one example, when the grass trimmer 100 is in the auto-winding mode, a rotating speed of the spool 53 is greater than or equal to 100 rpm, and less than or equal to 2000 rpm. In one example, the rotating speed of the spool 53 is greater than or equal to 200 rpm, and less than or equal to 800 rpm. In another example, the rotating speed of the spool 53 is greater than or equal to 30 rpm, and less than or equal to 600 rpm. Or the rotating speed of the spool 53 is greater than or equal to 60 rpm, and less than or equal to 300 rpm. A ratio of a rotating speed of the spool 53 in the cutting mode to a rotating speed of the spool 53 in the auto-winding mode is greater than or equal to 5, and less than or equal to 300. In another example, the ratio of the rotating speed of the spool 53 in the cutting mode to the rotating speed of the spool 53 in the auto-winding mode is greater than or equal to 10, and less than or equal to 200.

As shown in FIG. 4, FIG. 5, FIG. 9 and FIG. 10, the grass trimming mechanism 30 further includes a working housing 33. The working housing 33 is configured for connecting each component of the grass trimming mechanism 30 to be a whole. In one example, the working housing 33 includes a switch housing 331 and a motor housing 332. The switch housing 331 and the motor housing 332 may be a whole or may be two separate detachable components. In one example, the switch housing 331 is configured to fix and accommodate the second switch 31. The motor housing 332 is configured to accommodate or mount the motor 10. The switch housing 331 is fixed to the motor housing 332. The working housing 33 is connected to one end of the connecting pipe 40. In one example, the motor housing 332 is fixed to the one end of the connecting pipe 40, and the switch housing 331 is connected to the one end of the connecting pipe 40. The connecting pipe 40 is arranged throughout the switch housing 331. The switch housing 331 includes a first switch housing 331a and a second switch housing 331b. The first switch housing 331a and the second switch housing 331b are arranged on two sides of the connecting pipe 40. The motor 10 and grass trimming head 50 are arranged on a same end of the connecting pipe 40. The motor is located inside the working housing 33.

In another example, the motor is arranged on one end of the connecting pipe facing away from the grass trimming head, that is, the motor is not located inside the working housing.

A shield 70 plays a role of safety protection, and prevents the cutting line 101 from causing damages to the user. In one example, the shield 70 is fixed to the working housing 33. In one example, the shield 70 is fixed to the motor housing 332. At least a portion of the switch housing 331 is located between the motor housing 332 and the shield 70. In one example, the shield is fixed to the connecting pipe.

The second operation member 32 is adjacent to the grass trimming head 50. After the cutting line 101 and the spool 53 are combined, the second operation member 32 may be directly operated by the user to activate the automatic winding function. The first operation member 23 is arranged away from the grass trimming head 50. When the user grips the handle 21 to perform the cutting operation, the user can be away from the grass trimming head 50 to avoid the occurrence of the damages. The first operation member 23 and the second operation member 32 are away from each other. The first operation member 23 and the second operation 32 are arranged on two ends of the connecting pipe 40, so that the user is unable to touch the second operation member 32 when operating the first operation member 23, and the user is also unable to touch the first operation member 23 when operating the second operation member 32, which effectively avoids the damages caused by the housing where one operation member is accidentally touched when another operation member is operated by the user.

The second operation member 32 and the second switch 31 are located on two sides of the connecting pipe 40. In one example, the second switch 31 is arranged below the connecting pipe 40, and the second operation member 32 is arranged above the connecting pipe 40. The grass trimming head 50 and the second operation member 32 are located on the two sides of the connecting pipe 40. The second operation member 32 is located above the connecting pipe 40 and away from the grass trimming head 50 to prevent the cutting line 101 from causing damages to the human body when the second operation member 32 is operated by the user. An angled area is formed by the motor housing 332 and the connecting pipe 40. In other words, the angled area is formed by the grass trimming head 50 and the connecting pipe 40. The second switch 31 is located within the angled area. The angled area realizes the protection on the second switch 21 and prevents the second switch 31 from touching the ground to cause damages. The manner that the second operation member 32 and the second switch 31 are located on the two sides of the connecting pipe 40 also avoids the problem of excessive volume caused by the second operation member 32 and the second switch 31 being located on the same side of the connecting pipe 40.

As shown in FIG. 2 and FIG. 3, the grass trimmer 100 further includes a circuit board 65, a first housing 60 and a battery pack 66. The circuit board 65 is electrically connected to the first switch 22, and electrically connected to the second switch 31. The circuit board 65 is accommodated by the first housing 60. The circuit board 65 is electrically connected to the motor 10 and the battery pack 66 so that the battery pack 66 supplies power to the motor 10 and controls the motor 10.

The first housing 60 is formed with a first chamber 64 for accommodating the circuit board 65. The motor housing 332 is formed with a second chamber 333 for accommodating the motor 10. The connecting pipe 40 has a hollow tubular structure. The connecting pipe 40 is formed with an airflow passage 47 for communicating the first chamber 64 with the second chamber 333. Cooling airflow can pass through the airflow passage 47 to communicate the first chamber 64 with the second chamber 333 so as to cool the motor 10 and the circuit board 65.

The grass trimmer 100 includes a guide wire 49. The guide wire 49 is electrically connected to the battery pack 66 and the motor 10. The guide wire 49 is located inside the connecting pipe 40.

In one example, the first housing and the handle housing may be a whole. When the first housing and the handle housing is a whole, it should be understood that the whole may be described to be the first housing or may be described to be the handle housing.

The battery pack 66 may be detachably connected to the first housing 60. The first housing 60 is fixed to another end of the connecting pipe 40. In one example, the first housing 60 and the motor housing 332 are respectively fixed to the two ends of the connecting pipe 40.

In one example, the grass trimmer includes a cable wire. The cable wire is connected to the battery pack or commercial power.

In one example, the grass trimmer may be not provided with the operation member. That is, the grass trimmer does not include one or both of the first operation member and the second operation member. The grass trimmer is controlled by adopting a non-contact switch.

In one example, the grass trimmer is not provided with the second operation member and the second switch. The grass trimmer includes the non-contact switch. In other words, the second switch is a non-contact switch. The non-contact switch is configured to activate the motor 10 to drive at least one of the spool 53 and the housing 52 so that the spool 53 and the housing 52 are relatively rotated to automatically wind the cutting line 101 to the spool 53.

In one example, the non-contact switch is a voice-activated switch. In one example, the non-contact switch is a light-activated switch. In one example, the non-contact switch is an infrared sensor switch. In one example, the non-contact switch is magnetic switch. In one example, the non-contact switch is a proximity switch.

The grass trimmer 100 further includes a remote controller. The remote controller is configured for the remote control to control the on/off of the non-contact switch. The user may adopt a mobile device, such as a mobile phone, to control the grass trimmer 100.

In one example, the grass trimming head 50 and the non-contact switch are located on the same end of the connecting pipe 40.

In one example, the grass trimming head 50 and the non-contact switch are located on the two ends of the connecting pipe 40.

In one example, the non-contact switch is located inside the first housing 60.

In one example, the non-contact switch and the first switch 22 are located inside the handle housing 211.

In one example, the non-contact switch is located inside the connecting pipe 40.

Figure 11A:
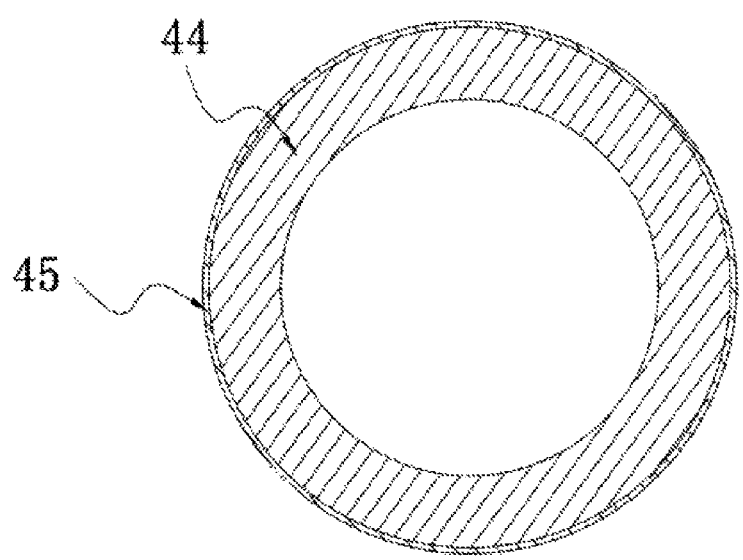
FIG. 11A is a cross-sectional view illustrating a connecting pipe in FIG. 1.

As shown in FIG. 1 and FIG. 11A, the connecting pipe 40 includes an inner layer member 44 made of a fiber material and an outer layer member 45 made of a fiber material. The outer layer member 45 is wrapped around an outer periphery of the inner layer member 44. A thickness of the inner layer member 44 is greater than a thickness of the outer layer member 45.

In one example, a fiber arrangement direction of the inner layer member 44 is different from a fiber arrangement direction of the outer layer member 45.

The inner layer member 44 is rolled from multi-layered fiber material sheets arranged layer by layer. The fiber arrangement direction of the inner layer member 44 extends along a straight line. The fiber arrangement direction of the inner layer member 44 coincides with an extending direction of the connecting pipe 40. Fibers of the outer layer member 45 are arranged in cross.

The inner layer member 44 has a relatively high strength. The outer layer member 45 enhances the stability of combining the multi-layered fiber material sheets. The connecting pipe 40 has a relatively high strength, reliability and stability.

A wall thickness of the connecting pipe 40 is greater than or equal to 0.5 mm, less than or equal to 1.5 mm.

In one example, a density of the motor housing 332 is greater than a density of the handle housing 211. The density of the handle housing 211 is greater than a density of the inner layer member 44.

In one example, the inner layer member 44 is made of a carbon fiber material. The outer layer member 45 is made of a carbon fiber material. The handle housing 211 is made of a plastic material. The motor housing 332 is made of a metal material.

The connecting pipe 40 may be formed as a complete long pipe, or be formed by connecting a plurality of long pipes. In one example, the connecting pipe 40 is formed by connecting the first connecting pipe 41 and the second connecting pipe 42. The first connecting pipe 41 and the second connecting pipe 42 are connected by a connecting seat 43 to facilitate the storage and transportation.

As shown in FIG. 3, the grass trimmer 100 further includes a fixing clamp 48. The fixing clamp 48 is formed by bending a metal sheet. The fixing clamp 48 is sleeved on an outer periphery of the connecting pipe 40. The connecting pipe 40 is fixed to the first housing 60 by the fixing clamp 48. The first housing 60 includes a first housing 61 and a second housing 62. The connecting pipe 40 is located between the first housing 61 and the second housing 62. The first housing 60 further includes an arm support member 63 for supporting the user's arm. The arm support member 63 is located on an upper portion of the first housing 60.

A ratio of a circumference of the connecting pipe 40 to a size of the fixing clamp 48 in the extending direction of the connecting pipe 40 is greater than or equal to 6, and less than or equal to 16.

Figure 11B:
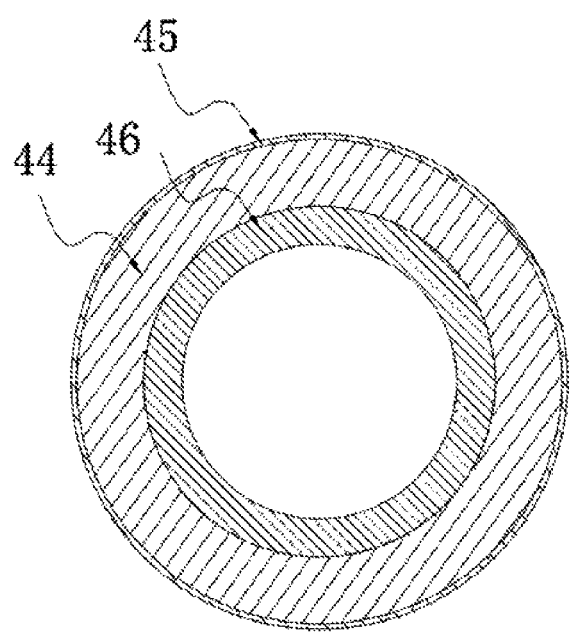
FIG. 11B is a schematic view illustrating the connecting pipe in FIG. 11A adding an embedded member.

In one example, as shown in FIG. 11B, the connecting pipe 40 further includes an embedded member 46. The inner layer member 44 is sleeved on an outer periphery of the embedded member 46. A material of the embedded member 46 is different from a material of the inner layer member 44. The embedded member 46 is made of plastic or a metal material.

In one example, the inner layer member is a tubular body formed by the fiber material being surrounded or stacked.

As shown in FIG. 6, the grass trimming head 50 is configured to mount and accommodate the cutting line 101. One portion of the cutting line 101 is accommodated inside the grass trimming head 50, and another portion of the cutting line 101 protrudes out of the grass trimming head 50 to cut the vegetation when the grass trimming head 50 is rotated. The motor 10 drives the grass trimming head 50 to rotate about a central axis 102 so as to drive the cutting line 101 to rotate to cut the vegetation. In one example, the motor may be replaced by an internal combustion engine.

Figure 7:
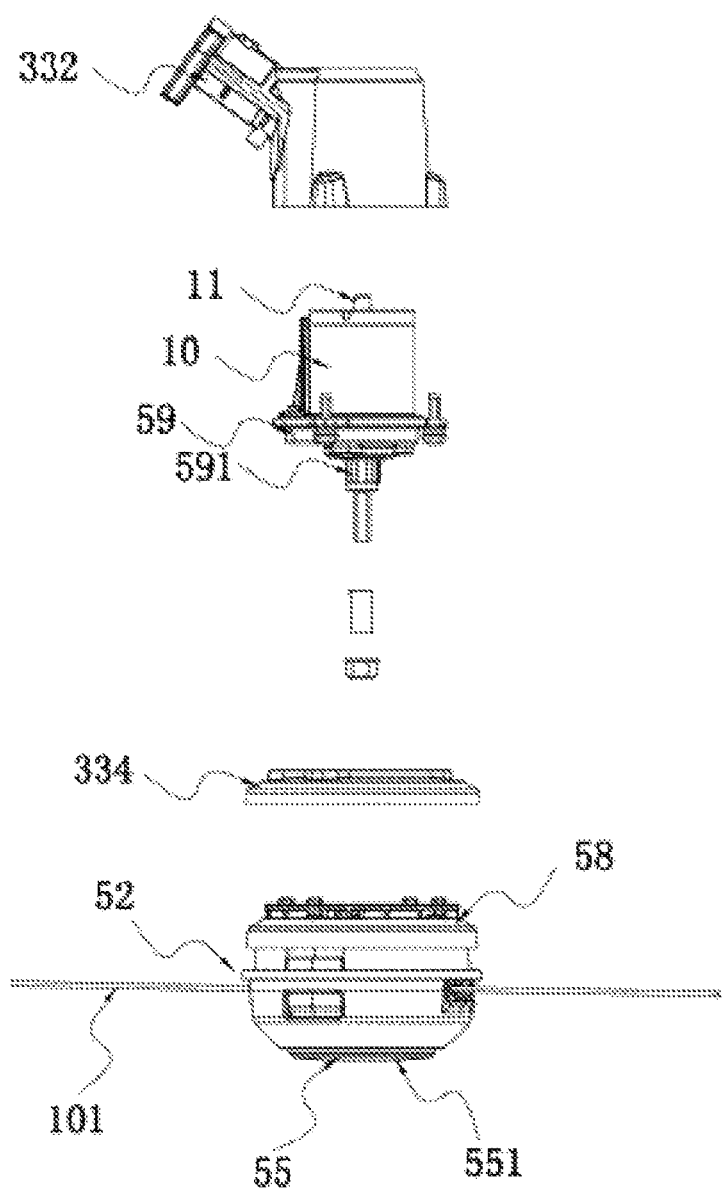
FIG. 7 is an exploded view illustrating the grass trimming head and the motor in FIG. 1.
Figure 8:
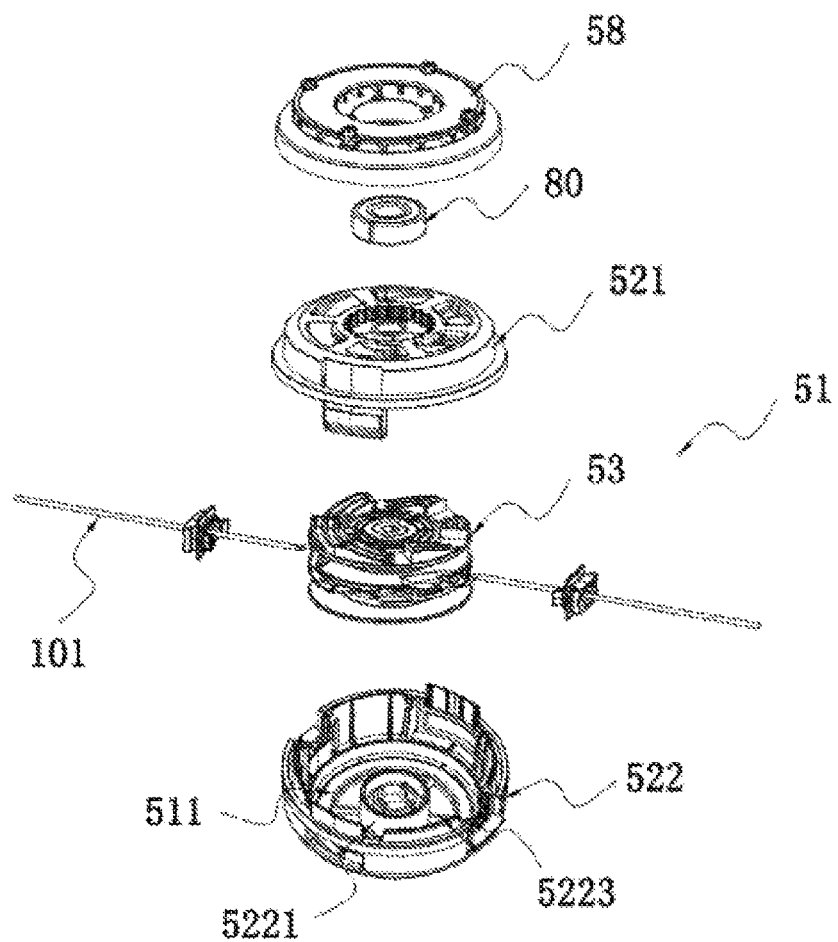
FIG. 8 is an exploded view illustrating the grass trimming head in FIG. 7.
Figure 9:
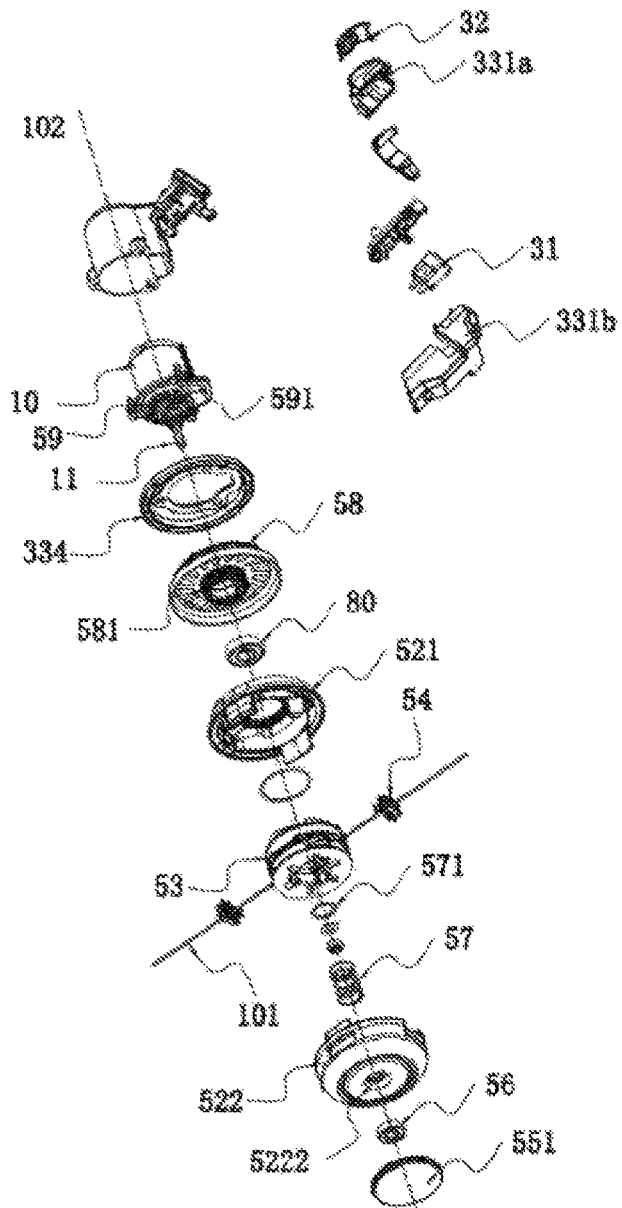
FIG. 9 is an exploded view illustrating the grass trimming head, the motor, and a grass trimming mechanism in FIG. 4.
Figure 10:
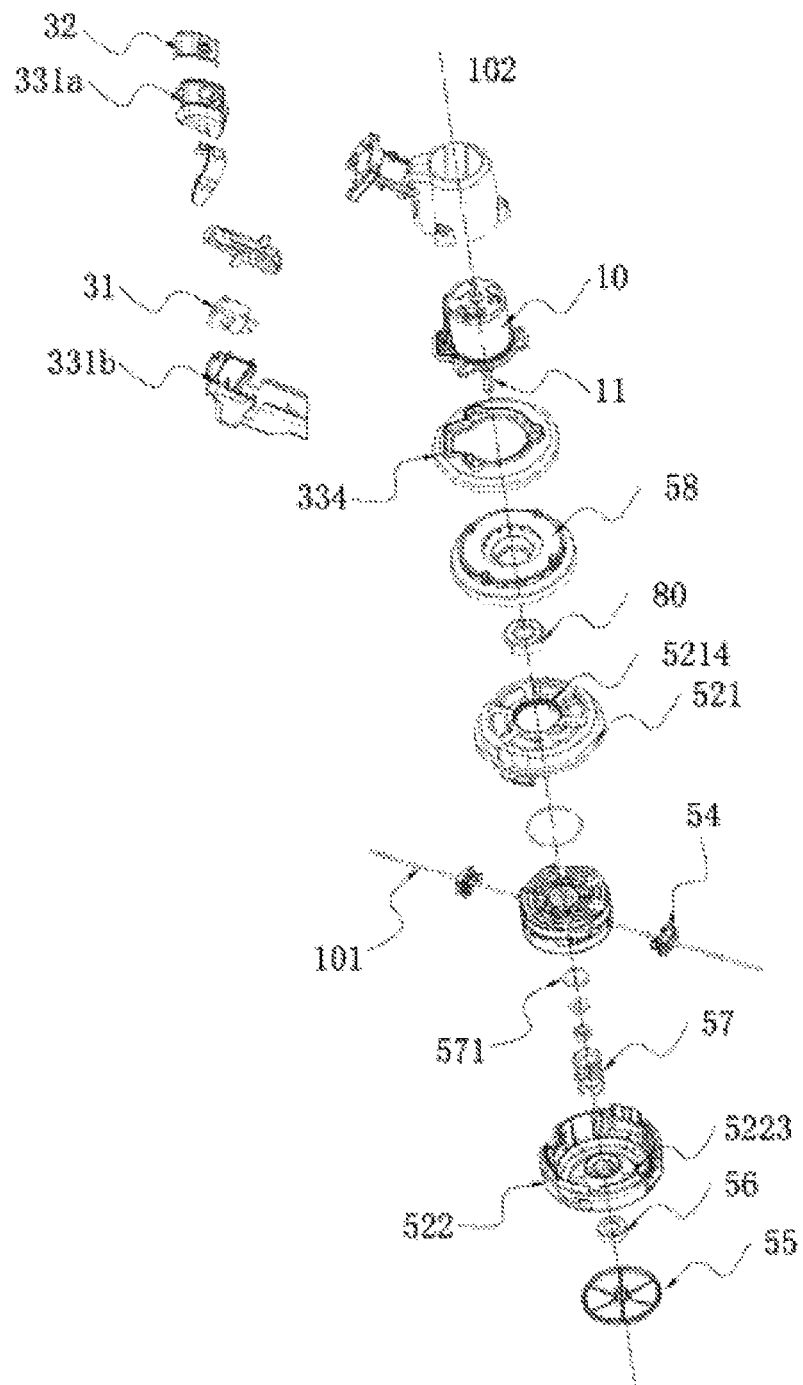
FIG. 10 is an exploded view illustrating another perspective of the grass trimming head, the motor, and the grass trimming mechanism in FIG. 4.

As shown in FIG. 7 and FIG. 8, the grass trimming head 50 includes the spool 53 and the housing 52. The motor 10 includes a motor shaft 11. The motor shaft 11 is connected to the spool 53 to drive the spool 53 to rotate. The housing 52 includes an upper housing 521 and a lower housing 522. The grass trimming head 50 further includes a fan 58. The fan 58 is provided with a blade for generating airflow. The motor 10 is configured to drive the fan 58 to rotate to generate the airflow.

The grass trimmer 100 includes a damping device 80. In one example, the damping device 80 includes a one-way bearing 81. The one-way bearing 81 is configured to enable the housing 52 being in a one-way rotational connection to the motor 10. In one example, the one-way bearing 81 is configured to allow the housing 52 to rotate in only one direction with respect to the motor 10 or the motor housing 332. That is, the one-way bearing 81 prevents the housing 52 from rotating in another direction with respect to the motor 10 or the motor housing 332.

As shown in FIG. 6 to FIG. 10, the grass trimmer 100 is provided with a support member 59. The support member 59 is fixed to motor 10 and enables the motor shaft 11 to pass therethrough. The support member 59 is formed with a boss portion 591 to support an inner ring of the one-way bearing 81. The inner ring of the one-way bearing 81 is sleeved on an outer periphery of the boss portion 591 and fixed to the support member 59.

The one-way bearing 81 is connected to the housing 52. In one example, the one-way bearing 81 is connected to the housing 52 through an intermediate piece. The intermediate piece is configured to be a fan 58. The one-way bearing 81 is arranged between the support member 59 and the fan 58 instead of being directly connected to the housing 52, so that the fan 58 is rotated in only one direction with respect to the support member 59. The fan 58 is in a non-rotational connection to the housing 52, thus the housing 52 is rotated in only one direction with respect to the support member 59. The fan 58 is in a synchronous rotation with the housing 52, that is, the fan 58 and the housing 52 are non-rotatable with respect to each other.

In one example, the upper housing 521 is formed with a first connecting tooth 5214. The fan 58 is formed with a second connecting tooth 581 connected to the first connecting tooth 5214. The first connecting tooth 5214 and the second connecting tooth 581 are matched to realize a synchronous rotation of the first connecting tooth 5214 and the second connecting tooth 581. And the first connecting tooth 5214 and the second connecting tooth 581 are matched with respect to each other to play a role of guiding, so that the housing 52 is slidable with respect to the fan 58 along the central axis 102, and the fan 58 is rotatable along with the housing 52 about the central axis 102.

In one example, the one-way bearing is fixed to the housing.

In one example, the housing is formed with the blade for generating the airflow, that is, no separate fan is provided, in other words, the fan and the housing is arranged to be a whole.

In the cutting mode, the motor shaft 11 is rotated to drive the spool 53 to rotate, and the spool 53 drives the upper housing 521 to rotate. In one example, the spool 53 is formed with a first engaging tooth 536. The upper housing 521 is formed with a first matching tooth 5211. The first engaging tooth 536 is matched with the first matching tooth 5211, so that the spool 53 drives the upper housing 521 to rotate.

The upper housing 521 drives the fan 58 to rotate. Under the action of the one-way bearing 81, the fan 58 is rotatable with respect to the motor housing 332 along a first direction (referring to a direction shown by an arrow 106 in FIG. 4). At this time, the motor 10 is rotated in a forward direction to drive the spool 53 and the housing 52 to rotate along the first direction, realizing the motor 10 driving the grass trimming head 50 to rotate along the first direction. The motor 10 drives the spool 53 and the housing 52 to synchronously rotate.

When the cutting line 101 needs to be replenished by the user, the cutting line 101 may pass through an outer aperture 544 on one side to enter into a housing cavity 511, and pass through an inner aperture 5351 to pass through a line guide passage 5352, and then pass out from the housing 52 through an outer aperture 544 on another side. When the cutting line 101 needs to be wound to the spool, the user does not need to open the housing, namely, disassembly the upper housing and the lower housing. The cutting line may be directly inserted into the housing, and then be wound to be spool through the relative rotation of the spool and the housing. Such grass trimming head is usually referred to as an externally inserted winding grass trimming head.

The grass trimmer 100 is controlled by the user to execute the auto-winding mode. The motor 10 is reversely rotated to drive the spool 53 to rotate along a second direction opposite to the first direction. Since the non-rotational effect of the one-way bearing 81, the fan 58 cannot be rotated along the second direction. The fan 58 is connected to the housing 52 through the first connecting tooth 5214 and the second connecting tooth 581, that is, the housing 52 is non-rotatable along the second direction. The spool 53 is, driven by the motor shaft 11, rotated with respect to the housing 52 along the second direction to realize the automatic winding.

The first matching tooth 5211 or a second matching tooth 5223 is a ratchet, so that the spool 53 and the housing 52 is rotatable with respect to each other in the auto-winding mode, and the spool 53 can drive the housing 52 to rotate in the cutting mode.

The grass trimmer 100 further includes a fan cover 334 fixed to the motor housing 332. The fan cover 334 covers the blade of the fan 58 at least in a radial direction of the central axis 102 to prevent the grass clippings from being wound around the fan 58. And the fan cover 334 is configured to change an airflow flowing direction of the fan 58, so that the airflow generated by the fan 58 blows the grass clippings outwards and downwards along the radial direction of the central axis 102.

The motor shaft 11 directly drives the spool 53 to rotate. The housing 52 is rotatable with respect to the spool 53, and is slidable with respect to the spool 53 along the central axis 102. The housing 52 is slidable with respect to the spool 53 between a first axial position and a second axial position.

When the housing 52 is in the first axial position with respect to the spool 53, the first matching tooth 5211 is matched with the first engaging tooth 536, so that the spool 53 drives the motor 52 to synchronously rotate when the spool 53 is rotated.

The grass trimmer 100 has a feeding mode. The feeding mode is configured to enable a portion of the cutting line 101 being wound around the spool 53 to be released to increase a length of the cutting line 101 passing out from the grass trimming head 50. When the grass trimmer 100 is in the cutting mode, the user knocks the grass trimming head 50, so that the housing 52 is moved to the second axial position from the first axial position, and the spool 53 is rotatable with respect to the housing 52 to release a portion of the cutting line 101.

In one example, the spool 53 is formed with the first engaging tooth 536 and a second engaging tooth 537. The housing 52 is formed with the first matching tooth 5211 matched with the first engaging tooth 536 and the second matching tooth 5223 matched with the second engaging tooth 537. A plurality of first matching teeth 5211 are arranged along a circumferential direction of the central axis 102. A plurality of first engaging teeth 536 are arranged along the circumferential direction of the central axis 102. In one example, the engaging tooth 536 is arranged on an upper portion of the spool 53, and the second engaging tooth 537 is arranged on a lower portion of the spool 53. The first matching tooth 5211 is formed on the upper housing 521, and the second matching tooth 5223 is formed on the lower housing 522.

When the housing 52 is moved to the second axial position, the first matching tooth 5211 is unengaged with the first engaging tooth 536, so that the spool 53 and the housing 52 is rotatable with respect to each other. At this time, the second engaging tooth 537 and the second matching tooth 5223 are matched so that the housing 52 is rotated by a specific angle with respect to the spool 53 so as to release a specific length of cutting line 101.

The grass trimming head 50 further includes a spring 57. The spring 57 is configured to apply an acting force between the upper housing 522 and the spool 53 so that the housing 52 is moved to the first axial position in which the housing 52 is synchronously rotated with the spool 53. In one example, the spring 57 is a compression spring. When the housing 52 is not subject to an external force generated by the user knocking the ground, the spring 57 applies the acting force to the housing 52 to make the housing 52 back to the first axial position. The spool 53 is formed with a groove 5344. The spring 57 is arranged inside the groove 5344. The lower housing 522 is provided with a protrusion portion 5221 protruding towards the upper housing 521. The protrusion portion 5221 and the groove 5344 are matched to guide the housing 52 to move with respect to the spool 53 between the first axial position and the second axial position. The spring 57 is arranged between the protrusion portion 5221 and the spool 53. One end of the spring 57 is in contact with the protrusion portion 5221, and another end of the spring 57 is provided with a first contact member 571. The first contact member 571 reduces wear between the spool 53 and the spring 57. The first contact member 571 is a metal member. The spool 53 and the housing 52 are plastic members.

In one example, the spring may not be in direct contact with the housing. In one example, the contact member is arranged between the spring and the housing. The contact member is in direct contact with the spring.

In one example, the first engaging tooth is arranged on the lower portion of the spool, the first matching tooth is formed on the lower housing. The spring applies the acting force to the spool or the housing assembly so that the first matching tooth and the first engaging tooth are in contact.

The spool 53 is provided with the inner aperture 5351 for the cutting line 101 to be inserted into, and the inner aperture 5351 is capable of fixing the cutting line 101.

The grass trimming head 50 includes a housing assembly 51. The housing assembly 51 is formed with the housing cavity 511 and the outer aperture 544. The cutting line 101 may be inserted into the housing cavity 511 from the outside of the housing assembly 51. At least a portion of the spool 53 is arranged inside the housing cavity 511. The spool 53 is rotatable with respect to the housing assembly 51 about the central axis 102.

In one example, the housing assembly 51 includes the housing 52 and an eyelet member 54. The housing 52 is formed with the housing cavity 511. The eyelet member 54 is formed with an outer aperture 544. The eyelet member 54 is fixed to the housing 52. The eyelet member 54 is made of a metal material. The housing 52 is made of a plastic material. The eyelet member 54 may prevent the cutting line 101 form wearing a hole wall of the outer aperture 544.

In one example, the housing assembly includes the housing, and the housing assembly does not include the eyelet member. The housing is formed with the outer aperture. In one example, the housing includes the upper housing and the lower housing, in other words, the housing assembly includes the upper housing and the lower housing.

The inner aperture 5351 and the outer aperture 544 may be automatically aligned, so that it is convenient for the user to insert the cutting line 101 into the housing cavity 511 through the outer aperture 544 and insert the cutting line 101 into the inner aperture 5351. In other words, the cutting line 101 passing through the outer aperture 544 may be directly inserted into the inner aperture 5351.

The housing assembly 51 is formed with a first positioning surface 5212. The spool 53 is formed with a second positioning surface 5362 matched with the first positioning surface 5212. When the first positioning surface 5212 is in contact with the second positioning surface 5362, the inner aperture 5351 is aligned with the outer aperture 544.

The grass trimming head 50 further includes a driving member. The driving member is configured to apply an acting force to the housing assembly 51 or the spool 53, and the acting force causes the housing assembly 51 and the spool 53 to rotate with respect to each other so that the first positioning surface 5212 and the second positioning surface 5362 are in contact.

In one example, the spring 57 is the driving member. The spring 57 is arranged between the housing assembly 51 and the spool 53. The spring 57 applies an acting force to the spool 53 or the housing assembly 51, and the acting force causes the first positioning surface 5212 and the second positioning surface 5362 to go towards each other.

The first matching tooth 5211 or the first engaging tooth 536 has an inclined surface inclined to a normal surface of the central axis 102. An angle between the inclined surface and the normal surface of the central axis 102 is greater than or equal to 8 degrees, and less than or equal to 18 degrees. By arranging the inclined surface, the first matching tooth 5211 and the second matching tooth 5223 enables the spool 53 and the housing 52 to relatively rotate under the driving by the acting force of the spring 57.

Figure 21A:
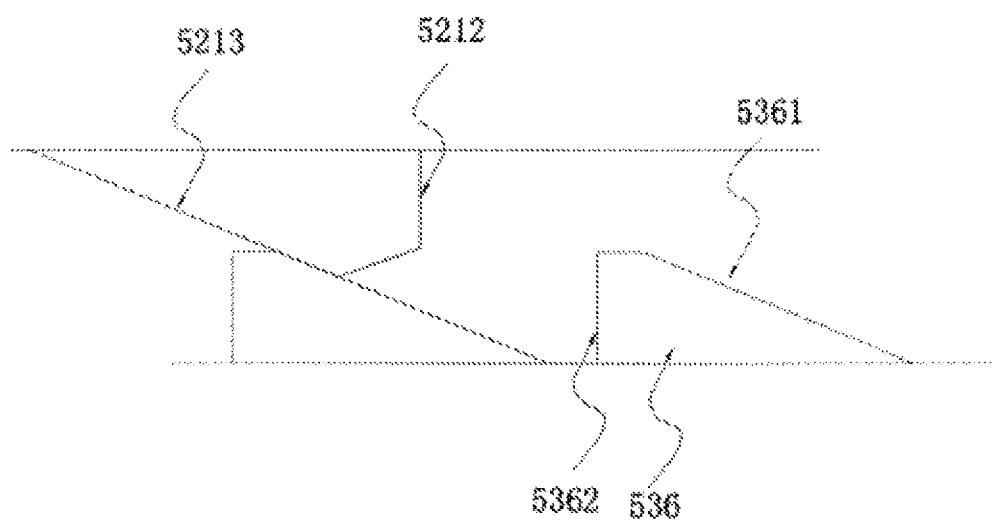
FIG. 21A is a schematic view illustrating a first engaging tooth and a first matching tooth of the grass trimming head in FIG. 8 sliding with respect to each other.
Figure 21B:
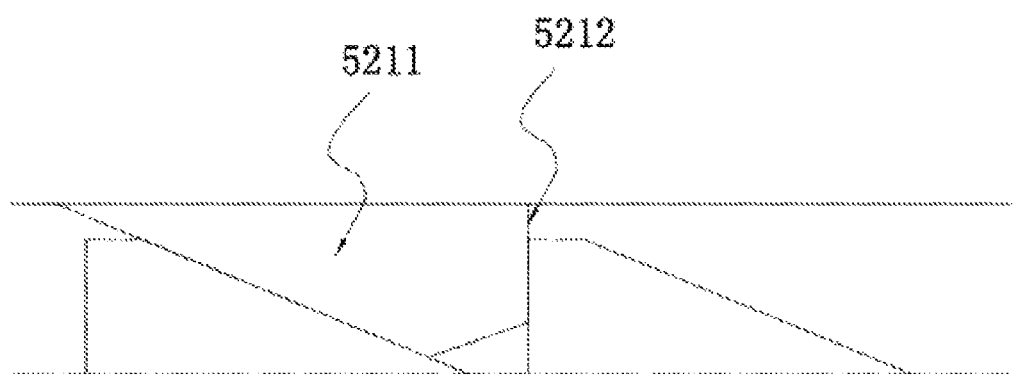
FIG. 21B is a schematic view illustrating a first positioning surface and a second positioning surface in FIG. 21A being in contact.

As shown in FIG. 21A and FIG. 21B, in one example, the first matching tooth 5211 is formed with a first inclined surface 5213 and the first positioning surface 5212. The first engaging tooth 536 is formed with a second inclined surface 5361 and the second positioning surface 5362.

The first inclined surface 5213 and the first positioning surface 5212 are located on two sides of the first matching tooth 5211. The second inclined surface 5361 and the second positioning surface 5362 are located on two sides of the first engaging tooth 536.

When the first positioning surface 5212 is in contact with the second positioning surface 5362, the two sides of the first matching tooth 5211 are in contact with two adjacent first engaging teeth 536 respectively.

When the first positioning surface 5212 is in contact with the second positioning surface 5362, the first inclined surface 5213 is in contact with the second inclined surface 5361.

The spool 53 is formed with a plurality of inner apertures 5351. An even number of the inner apertures 5351 are provided. An even number of first engaging teeth 536 are provided. The plurality of inner apertures 5351 are evenly distributed in a circumferential direction of an axis of the spool 53. In one example, a number of the first engaging teeth 536 is the same as a number of the inner apertures 5351.

In one example, a number of the second engaging teeth 537 is the same as a number of the inner apertures 5351. For example, the spool 53 is formed with six inner apertures 5351, and the spool 53 is formed with six first engaging teeth 536 and six second engaging teeth 537.

The spool 53 is formed with at least one winding portion 531 for the cutting line 101 winding and two flange portions 532 arranged on two ends of the winding portion 531. The inner aperture 5351 is arranged on the two flange portions 532.

In one example, the spool 53 includes two winding portions 531 and three flange portions 532.

The spool 53 includes an upper winding portion 5331, a lower winding portion 5341, a middle flange portion 535, an upper flange portion and a lower flange portion. The upper winding portion 5331 is configured for winding the cutting line 101 and the lower winding portion 5341 is configured for winding the cutting line 101. The upper flange portion, the lower flange portion and the middle flange portion 535 are configured to limit a position of the cutting line 101. The upper flange portion is connected to an upper end of the upper winding portion 5331. The lower flange portion is connected to a lower end of the lower winding portion 5341. The middle flange portion 535 is located between the upper winding portion 5331 and the lower winding portion 5341. In one example, the middle flange portion 535 is formed with the inner aperture 5351 for the cutting line 101 to be inserted into.

The spool 53 includes a first part and a second part. The first part and the second part are referred to as an upper spool 533 and a lower spool 534 respectively. The lower spool 534 is coupled to the upper spool 533 to form a whole. The upper spool 533 includes the upper winding portion 5331, a first flange portion 5332 and a second flange portion 5333. The lower spool 534 includes the lower winding portion 5341, a third flange portion 5342 and a fourth flange portion 5343. The first flange portion 5332 is connected to the upper end of the upper winding portion 5331. The second flange portion 5333 is connected to a lower end of the upper winding portion 5331. The third flange portion 5342 is connected to an upper end of the lower winding portion 5341. The fourth flange portion 5343 is connected to the lower end of the lower winding portion 5341. The first flange portion 5332 is the upper flange portion, and the fourth flange portion 5343 is the lower flange portion. The second flange portion 5333 and the third flange portion 5343 cooperatively form the middle flange portion 535.

The upper spool 533 is coupled to the lower spool 534 to form the line guide passage 5352 for cutting line 101 passing through the spool 53. Two ends of the line guide passage 5352 are defined as the inner apertures 5351. The cutting line 101 may be inserted into the line guide passage 5352 through the inner aperture 5351.

The line guide passage 5352 extends along a curve.

The upper spool 533 is coupled to the lower spool 534 to form two line guide passages 5352 intersected with each other. In one example, the upper spool 533 is coupled to the lower spool 534 to form three line guide passages, any two of which are intersected with each other. The three line guide passages 5352 is arranged around the central axis 102.

The line guide passage 5352 is formed by the upper spool 533 and the lower spool 534, which is beneficial for the processing and manufacturing of the line guide passage 5352.

The spool 53 is arranged between the upper housing 521 and the lower housing 522. The spool 53 is formed with the groove 5344. In one example, the lower spool 534 is formed with the groove 5344. The lower housing 522 is provided with the protrusion portion 5221 protruding towards the upper housing 521. The protrusion portion 5221 and the groove 5344 are matched to guide the housing 52 to move with respect to the spool 53 along the central axis 102. At least a portion of the spring 57 is located inside the groove 5344. The spring 57 is arranged throughout the groove 5344 and between the upper spool 533 and the lower housing 522. The spring 57 applies an acting force so that the upper spool 533 and the lower housing 522 are moved away from each other. In other words, the spring 57 applies an acting force so that the upper housing 521 and the upper spool 533 are moved closer to each other.

The upper spool 533 is fixed to the motor shaft 11. The motor 10 drives the upper spool 533 to rotate.

The housing assembly 51 is provided with the protrusion portion 5221 protruding towards the housing cavity 511. A minimum distance from the protrusion portion 5221 to the inner aperture 5351 is greater than or equal to 3 mm.

The hole wall of the outer aperture 544 protrudes towards the housing cavity 511 to form the protrusion portion 5221. In one example, the outer aperture 544 is provided with two protrusion portions 5221. The two protrusion portions 5221 are located on two sides of the outer aperture 544 and arranged along the circumferential direction of the central axis 102. That is, the two protrusion portions 5221 are located on left and right sides of the outer aperture 544 instead of upper and lower sides.

In one example, the eyelet member 54 is formed with the outer aperture 544. A distance from the eyelet member 54 to the spool 53 is less than 3 mm. A distance from the eyelet member 54 to the flange portion 532 is less than or equal to 3 mm. In one example, a distance from the eyelet member 54 to the middle flange portion 535 is less than or equal to 3 mm.

A end portion of the cutting line 101 being inserted into the housing cavity 511 through the outer aperture 544 is less likely to be deviated, and can be smoothly inserted into the inner aperture 5351.

At least portion of the eyelet member 54 protrudes towards the spool 53. The eyelet member 54 is formed with two bumps 542 protruding towards the spool 53. The two bumps 542 are arranged on two sides of an observation hole, and arranged along the circumferential direction of the central axis 102.

The two bumps 542 are located between an upper surface and a lower surface of the middle flange portion 535. A size of each bump 542 along a direction of the central axis 102 is less than a size of the middle flange portion 535 along the direction of the central axis 102.

The outer aperture 544 is a waist-shaped hole. A size of the outer aperture 544 along the direction of the central axis 102 is defined as a height of the outer aperture 544. A size of the outer aperture 544 along a direction perpendicular to the central axis 102 is defined as a width of the outer aperture 544. A size of the outer aperture 544 in an extending direction is defined as a depth of the outer aperture 544.

A distance between the two bumps 542 is the same as the width of the outer aperture 544. The width of the outer aperture 544 is greater than the height of the outer aperture 544.

The eyelet member 54 is formed with a notch 543 on one side of a projection of the eyelet member 54 on a plane perpendicular to the central axis 102 facing towards the spool 53. The eyelet member 54 is U-shaped.

The eyelet member 54 includes a body 541 and the two bumps 542. The body 541 is formed with the outer aperture 544. The two bumps 542 extend outward from the body 541. The two bumps 542 extend outward from a same side of the body 541.

The distance from the eyelet member 54 to the flange portion 532 is less than a maximum outer diameter of the cutting line 101.

Figure 12:
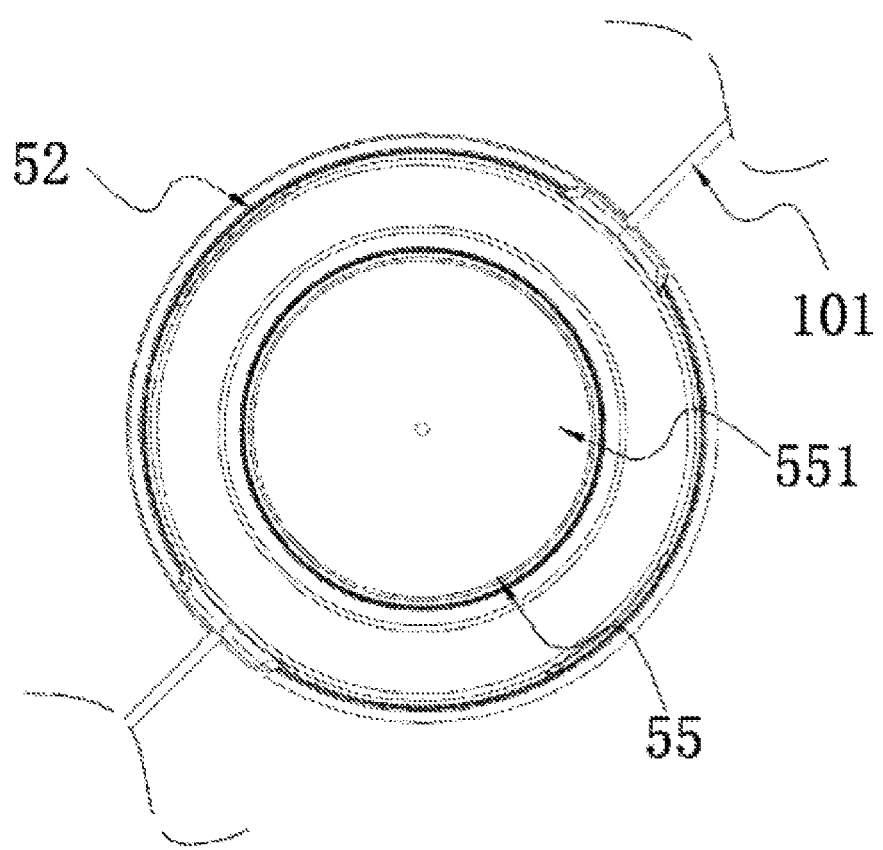
FIG. 12 is a schematic view illustrating a knocking cap of the grass trimming head in FIG. 6.
Figure 13:
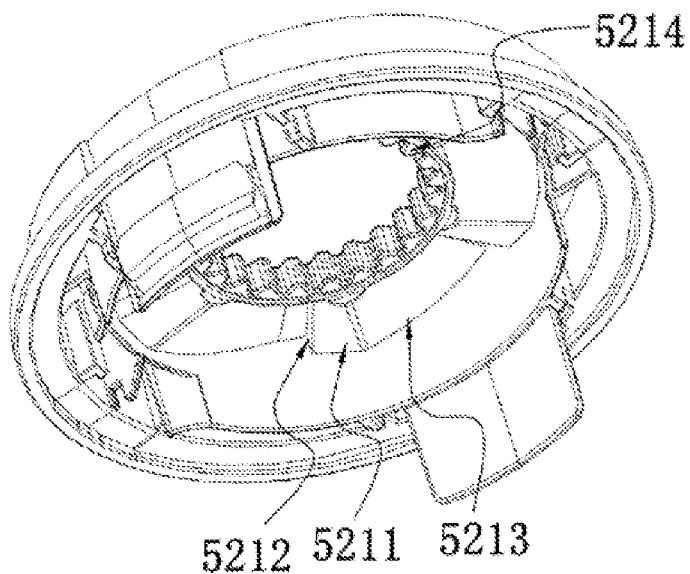
FIG. 13 is a schematic view illustrating an upper housing of the grass trimming head in FIG. 9.
Figure 14:
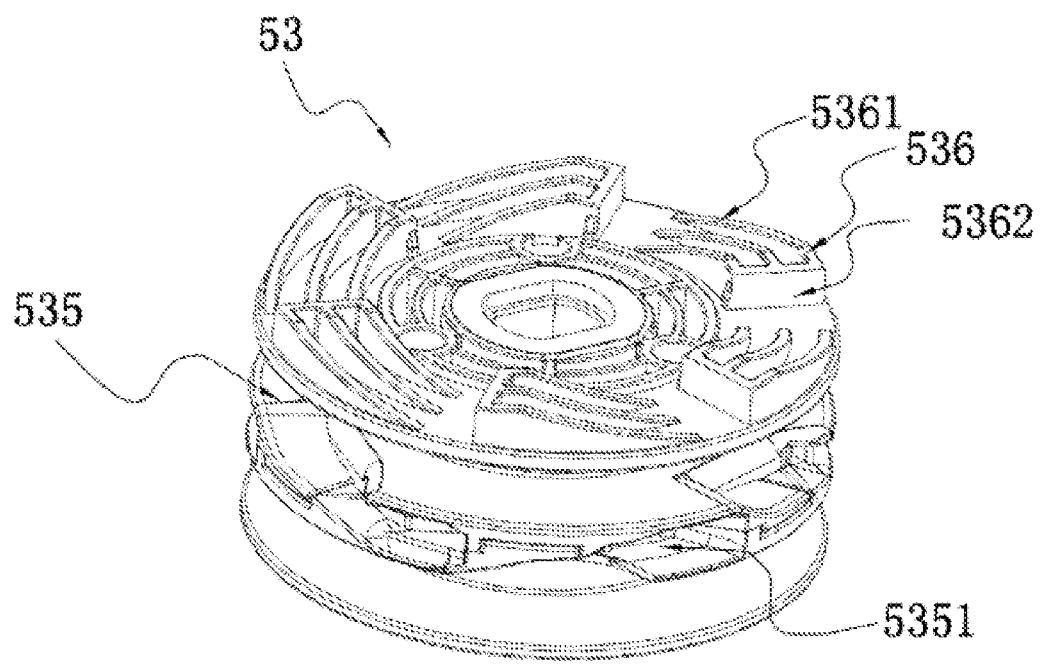
FIG. 14 is a schematic view illustrating a spool of the grass trimming head in FIG. 9.
Figure 15:
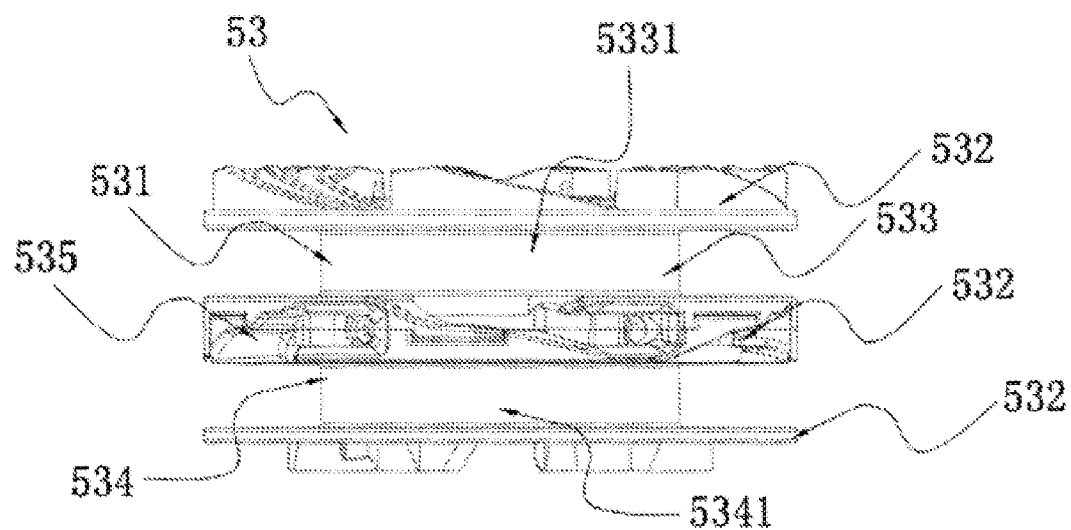
FIG. 15 is a schematic view illustrating another perspective of the spool in FIG. 14.
Figure 16:
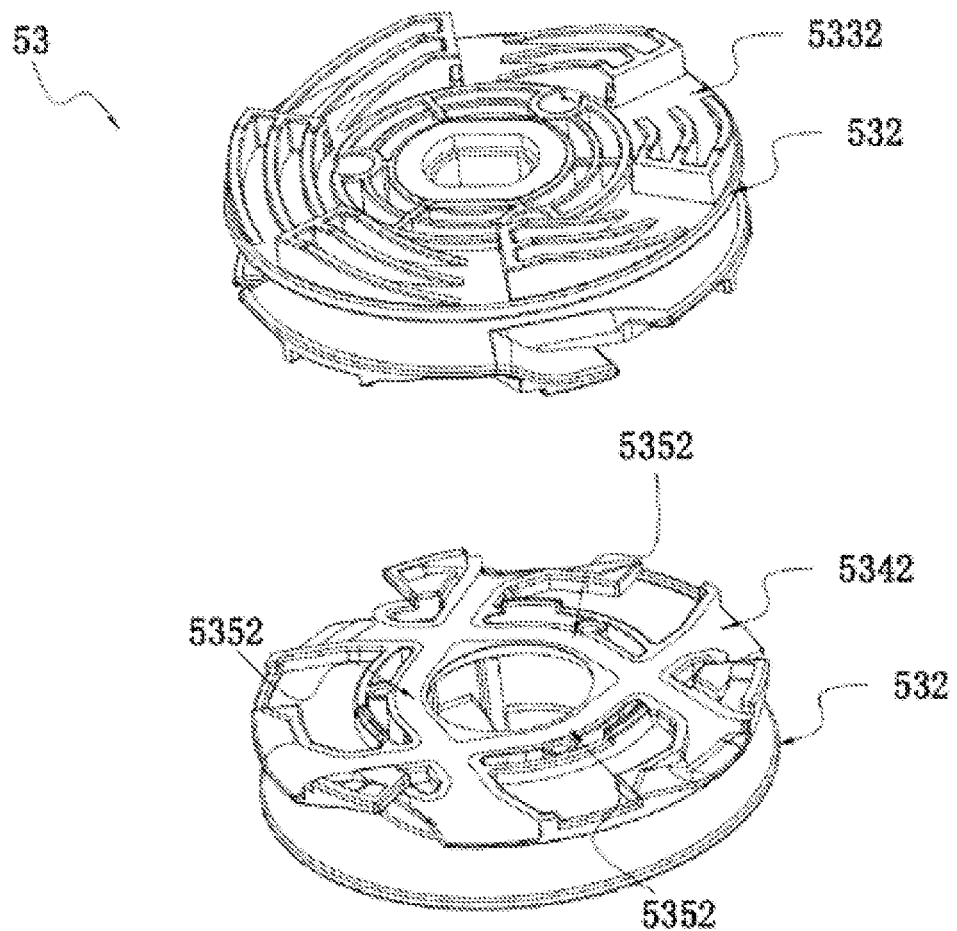
FIG. 16 is an exploded view illustrating the spool in FIG. 14.
Figure 17:
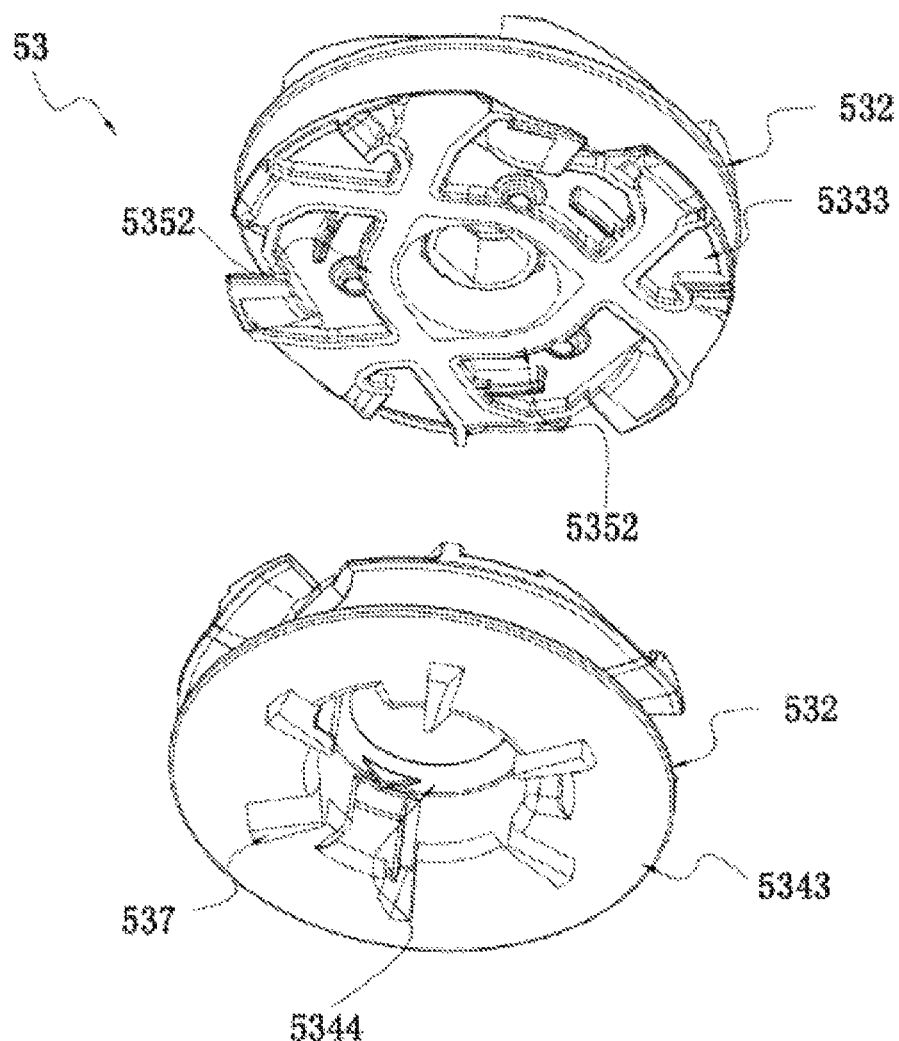
FIG. 17 is an exploded view illustrating another perspective of the spool in FIG. 14.
Figure 18:
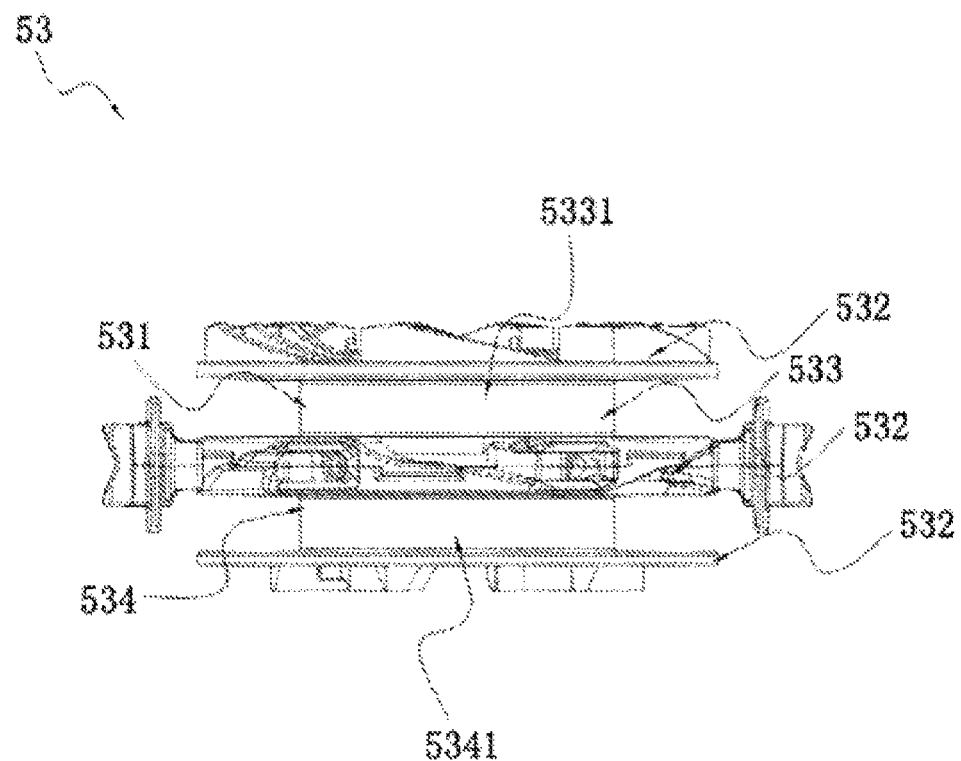
FIG. 18 is a schematic view illustrating of the spool and the eyelet member of the grass trimming head in FIG. 9.
Figure 19:
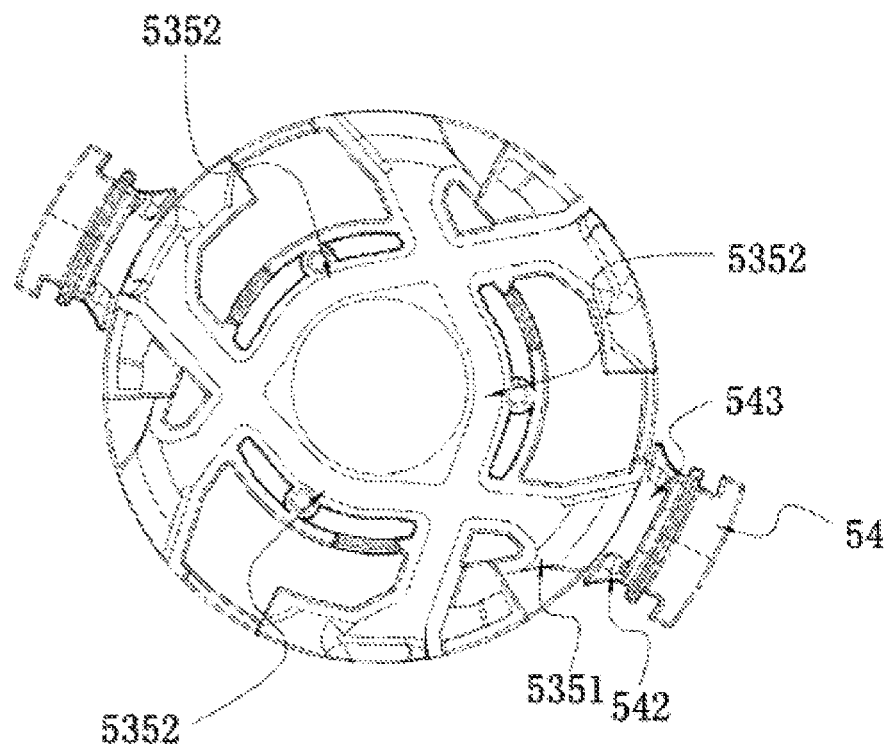
FIG. 19 is schematic view illustrating an outlet string passage of the spool in FIG. 18
Figure 20A:
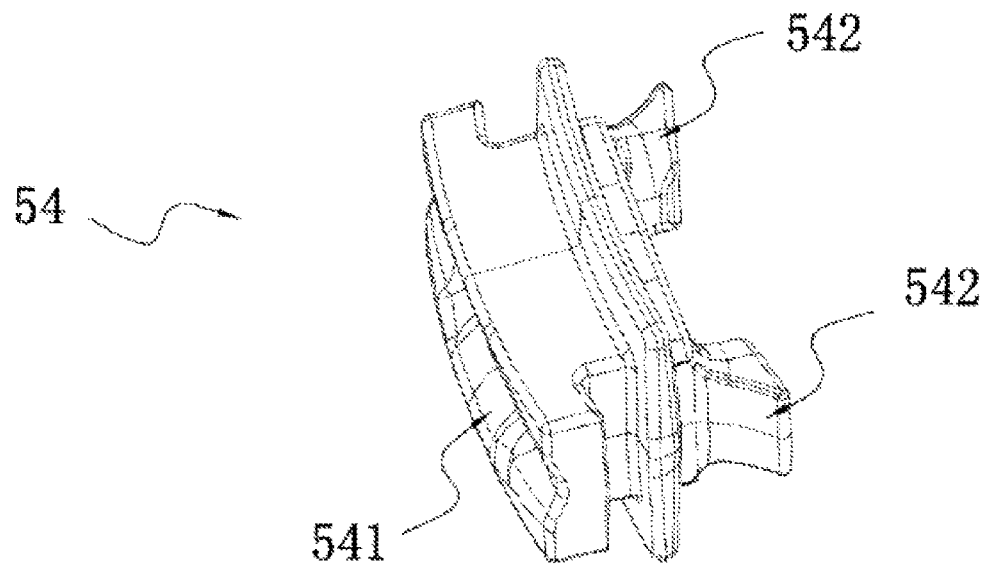
FIG. 20A is a schematic view illustrating the eyelet member of the grass trimming head in FIG. 9.
Figure 20B:
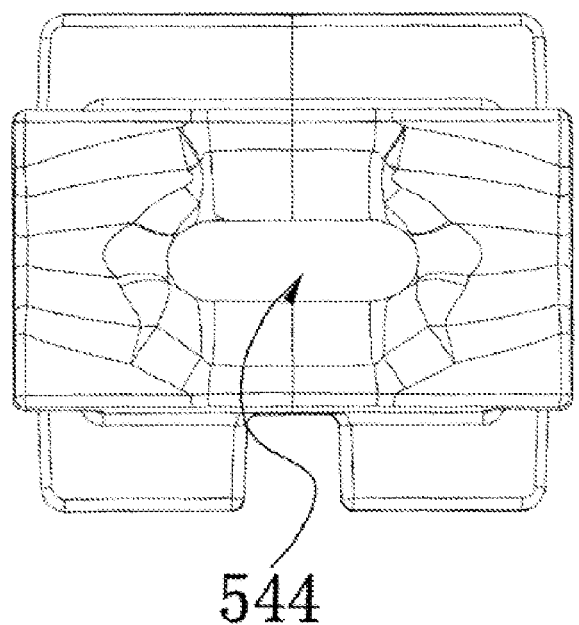
FIG. 20B is a schematic view illustrating another perspective of the eyelet member in FIG. 20A.
Figure 20C:
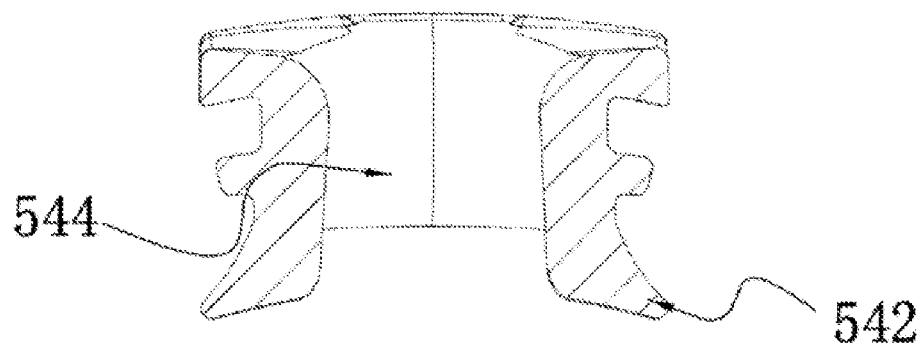
FIG. 20C is a cross-sectional view illustrating the eyelet member in FIG. 20A.

As shown in FIG. 6, FIG. 7 and FIG. 12, the grass trimming head 50 further includes a knocking cap 55. The knocking cap 55 is rotatably connected to the lower housing 522 so that the knocking cap 55 and the lower housing 522 are rotatable with respect to each other. At the same time, the knocking cap 55 is synchronously moved with the lower housing 522 in a direction of the axis. In other words, when a position of the knocking cap 55 is changed, the lower housing 522 is moved along with the knocking cap 55, namely, the housing 52 will change the axial position by knocking the knocking cap 55.

The knocking cap 55 includes a contact portion 551 protruding out of an outer surface of the housing 52.

A ratio of a projection area of the contact portion 551 on the plane perpendicular to the central axis 102 to a projection area of the housing 52 on the plane perpendicular to the central axis 102 is greater than or equal to 0.3, and less than or equal to 1.

A surface of the contact portion 551 is a smooth curved surface. A projection of the contact portion 551 on the plane perpendicular to the central axis 102 has a circular shape.

A ratio of the projection area of the contact portion 551 on the plane perpendicular to the central axis 102 to a projection area of the spool 53 on the plane perpendicular to the central axis 102 is greater than or equal to 0.5, and less than or equal to 1.2.

A ratio of a maximum size of the contact portion 55 in the radial direction of the central axis 102 to a maximum size of the spool 53 in the radial direction of the central axis 102 is greater than or equal to 0.7, and less than or equal to 1.1.

An area of the contact portion 551 is relatively large, so that grass trimming head 50 is ensured to be in contact with the ground before the housing 52 is in contact with the ground when the grass trimming head 50 is obliquely knocked by the user, which effectively avoids the wear of the housing 52.

A bearing 56 is arranged between the knocking cap 55 and the lower housing 522, and connected to the knocking cap 55 and the lower 522. The lower housing 522 is formed with a mounting groove 5222. In one example, the protrusion portion 5221 is formed with the mounting groove 5222. The bearing 56 is arranged inside the mounting groove 5222. The bearing 56 is connected to the knocking cap 55 and the lower housing 522.

Under the action of the bearing 56, the knocking cap 55 is freely rotatable with respect to the lower housing 522, reducing the wear of the grass trimming head 50. The spring 57 applies the acting force to the housing 52 so that the housing 52 is moved downward with respect to the spool 53. A shock absorbing member for slowing the impact between the lower housing 521 and the spool 53 is arranged between the lower housing 521 and the spool 53. In one example, the shock absorbing member is a rubber gasket.

Figure 22:
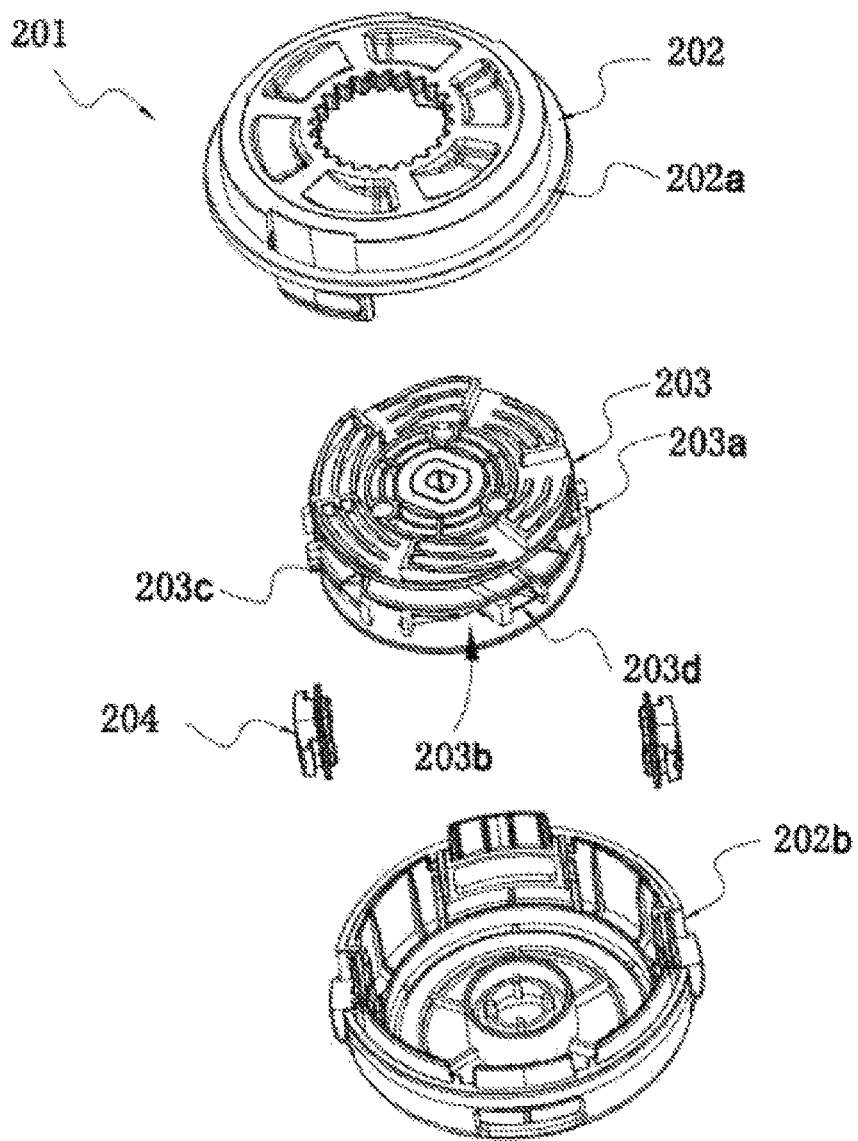
FIG. 22 is a schematic view illustrating a grass trimming head including a spool formed with a bump.
Figure 23:
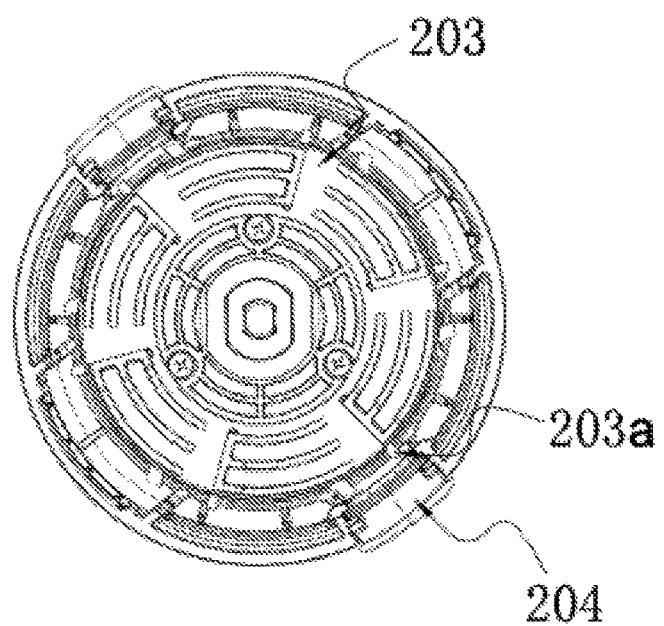
FIG. 23 is a schematic view illustrating the spool and a lower housing in FIG. 22.

As shown in FIG. 22 and FIG. 23, a grass trimming head 201 includes a spool 203 and a housing assembly. The housing assembly is formed with a housing cavity and an outer aperture. The cutting line can be inserted into the housing cavity from the outside of the housing assembly. At least a portion of the spool 203 is arranged inside the housing cavity. The spool 203 is rotatable with respect to the housing assembly about the central axis.

In one example, the housing assembly includes a housing 202 and an eyelet member 204. The housing 202 is formed with the housing cavity. The eyelet member 204 is formed with the outer aperture, and fixed to the housing 202. The housing 202 includes an upper housing 202a and a lower housing 202b.

A structure of the housing 202 in FIG. 22 is the same as a structure of the housing 52 in FIG. 1 to FIG. 12. The differences between the grass trimming head 201 in FIG. 22 and the grass trimming head 50 in FIG. 1 to FIG. 12 are that the spool 203 and the eyelet member 204 are different from the spool 53 and the eyelet member 54 in FIG. 1 to FIG. 12.

In one example, the spool 203 is formed with a bump 203a towards the housing 202. The eyelet member 204 is not provided with a bump. In one example, the spool 203 includes a winding portion 203b and a flange portion 203c. An inner aperture 203d is arranged on the flange portion 203c. The bump 203a is arranged on the flange portion 203c. Two bumps 203a are provided and located on two sides of the inner aperture 203d. The two bumps are arranged to guide the end portion of the cutting line entering the housing cavity, which is beneficial for the cutting line being directly inserted into the inner aperture 203d.

A minimum distance from the bump 203a to the outer aperture is less than or equal to 3 mm. A minimum distance from the bump 203a to the eyelet member 204 is less than or equal to 3 mm. The minimum distance from the bump 203a to the outer aperture is less than or equal to a maximum outer diameter of the cutting line. The maximum outer diameter of the cutting line is a maximum size of a cross section of the cutting line perpendicular to an extending direction of the cutting line.

Figure 24:
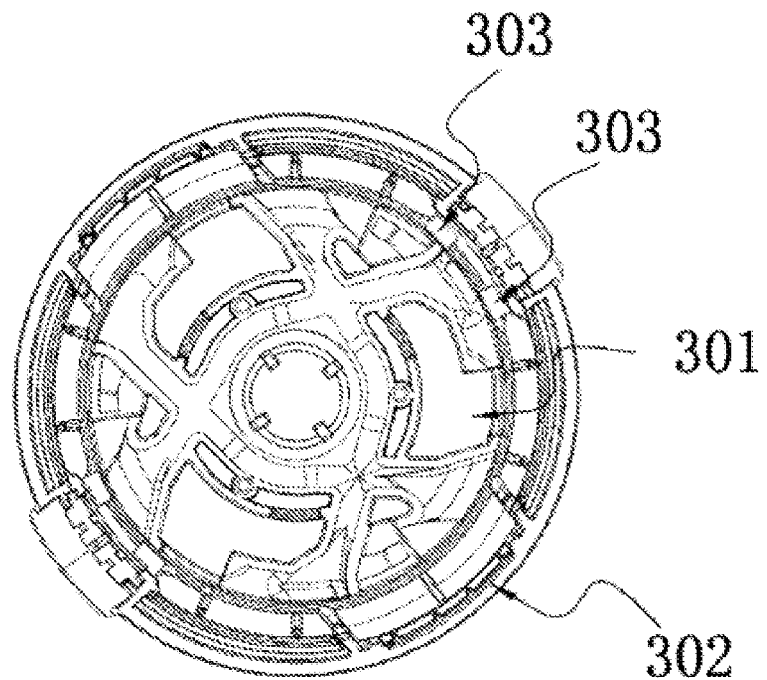
FIG. 24 is a schematic view illustrating a housing being formed with a bump.

In one example, a difference between a grass trimming head in FIG. 24 and the grass trimming head 50 in FIG. 1 to FIG. 12 is that a bump 303 is formed by a housing 302 instead of the eyelet member. A spool 301 and the spool 53 are the same in structure.

Figure 25:
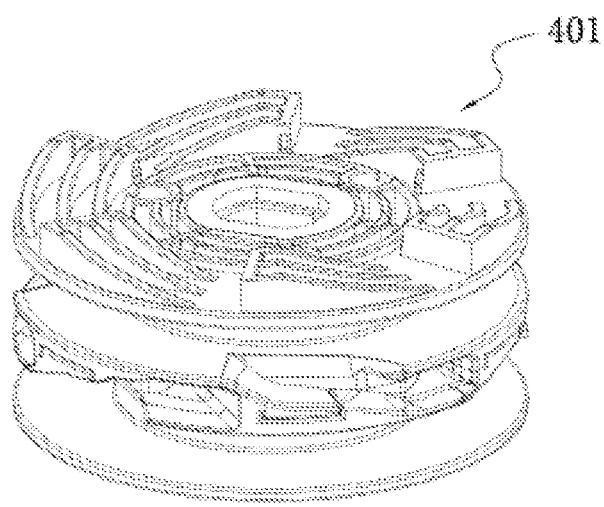
FIG. 25 is a schematic view illustrating another spool.
Figure 26:
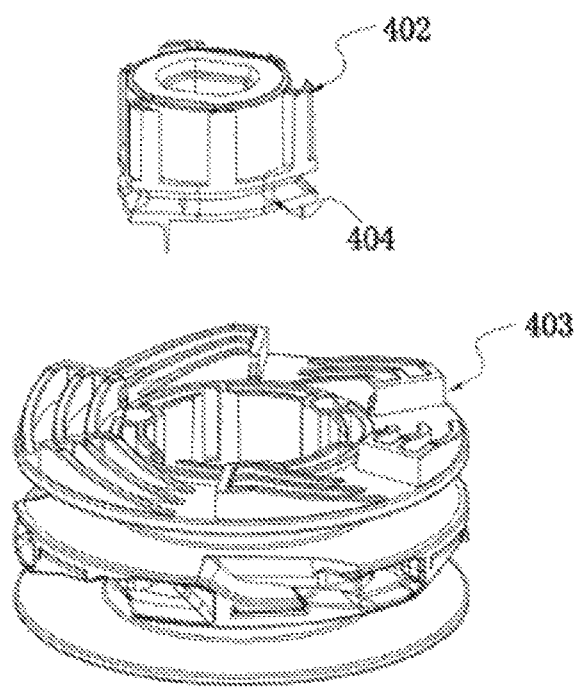
FIG. 26 is an exploded view illustrating the spool in FIG. 25.

As shown in FIG. 25 and FIG. 26, a spool 401 includes two winding portions and three flange portions. In one example, the spool 401 includes an upper winding portion, a lower winding portion, a middle flange portion, an upper flange portion and a lower flange portion. The upper winding portion and the lower winding portion are configured for the cutting line winding around. The upper flange portion, the lower flange portion, and the middle flange portion are configured to limit a position of the cutting line. The upper flange portion is connected to an upper end of the upper winding portion. The lower flange portion is connected to a lower end of the lower winding portion. The middle flange portion is located between the upper winding portion and the lower winding portion. In one example, the middle flange portion is formed with an inner aperture for the cutting line to be inserted into. A whole structure of the spool 401 shown in FIG. 25 and FIG. 26 is the same as the whole structure of the spool 53 shown in FIG. 1 to FIG. 12, and a different therebetween is that structures of the pieces combined into the spool 401 are different.

In one example, the spool 401 includes a first piece 403 and a second piece 402. The first piece 403 and the second piece 402 are combined into the spool 401. The first piece 403 is formed with a winding portion and a flange portion. In one example, the first piece 403 is formed with an upper winding portion, a lower winding portion, a middle flange portion, an upper flange portion and a lower flange portion.

The spool 401 is formed with at least two line guide passages 404 intersected with each other. In one example, the spool 401 is formed with three line guide passages 404. The first piece 403 and the second piece 402 are combined to form the line guide passages 404. Two ends of the line guide passages 404 are defined as inner apertures. In one example, an intersection portion of the two line guide passages 404 intersected with each other is formed by the combination of the first piece 403 and the second piece 402. The first piece 403 is arranged around the second piece 402, and arranged on an outer periphery of the second piece 402.

The spool 401 is constructed in a manner that the spool can be constructed and machine shaped by a simple mold, which is simple and quick in manufacture.

Figure 27:
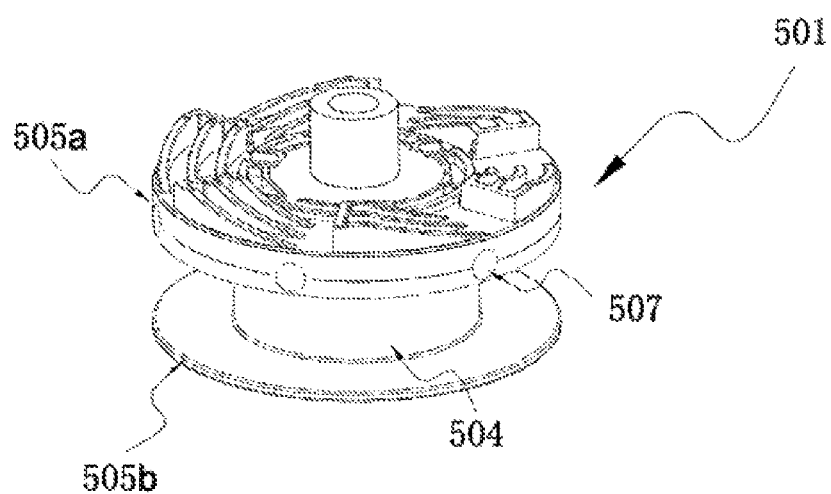
FIG. 27 is a schematic view illustrating another spool.
Figure 28:
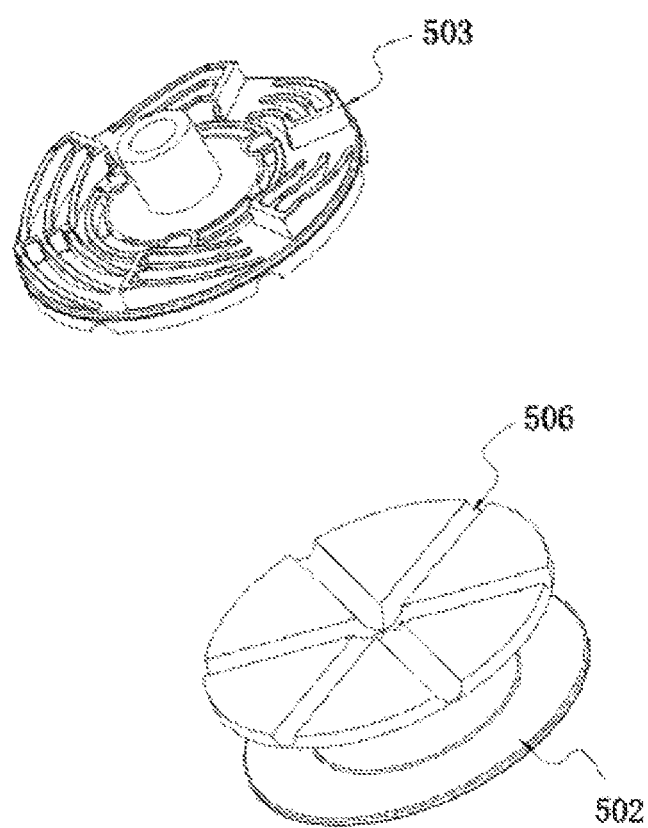
FIG. 28 is an exploded view illustrating the spool in FIG. 27.
Figure 29:
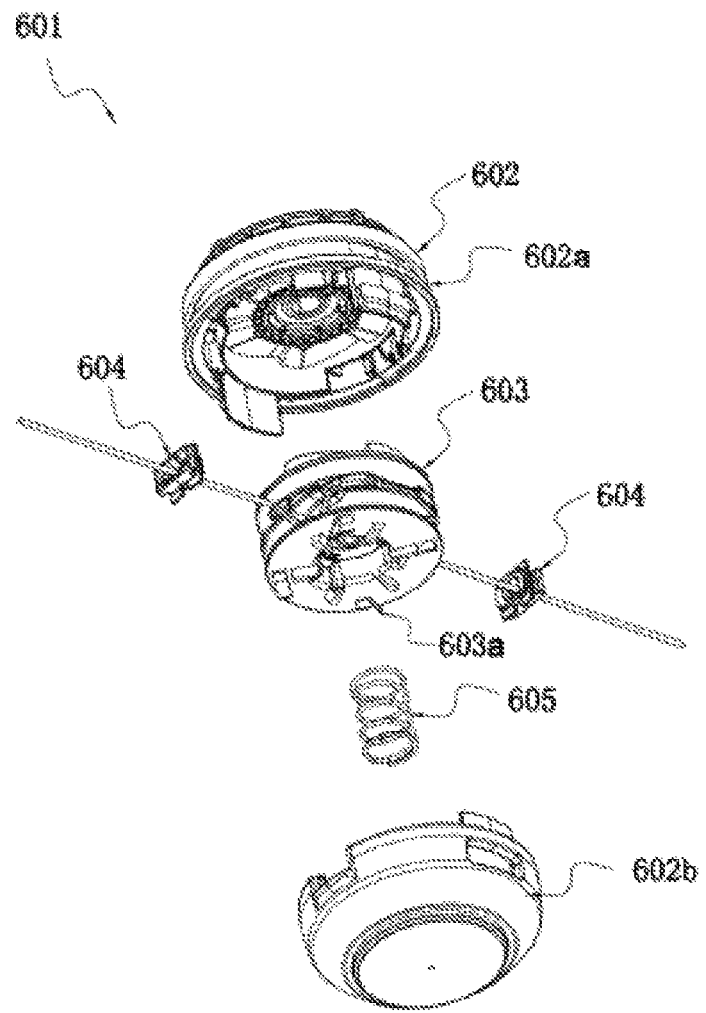
FIG. 29 is an exploded view illustrating another perspective of the spool in FIG. 27.

As shown in FIG. 27 to FIG. 29, a spool 501 is formed with at least one winding portion 504 for the cutting line winding around and two flange portions 505a and 505b arranged on two ends of the winding portion 504. An inner aperture 507 is arranged on the flange portions 505a and 505b.

In one example, the spool 501 is formed with one winding portion 504. An upper flange portion 505a and a lower flange portion 505b are located on the two ends of the winding portion 504 respectively. The inner aperture 507 is arranged on the upper flange portion 505a and the lower flange portion 505b.

The spool 501 includes a first piece 502 and a second piece 503. The first piece 502 and the second piece 503 are combined to form the spool 501. The first piece 502 is formed with a winding portion 504. The first piece 502 and the second piece 503 together form an upper flange portion 505a and a lower flange portion 505b. The first piece 502 and the second piece 503 are arranged along a rotational axis of the spool 501. The second piece 503 is located above the first piece 502.

The first piece 502 and the second piece 503 are formed with the line guide passage 506. In one example, the first piece 502 and the second piece 503 are combined to form at least two line guide passages 506 intersected with each other. In one example, the first piece 502 and the second piece 503 are combined to form three line guide passages 506, any two of which are intersected with each other. Two ends of the line guide passages 506 are defined as inner apertures 507.

Figure 30:
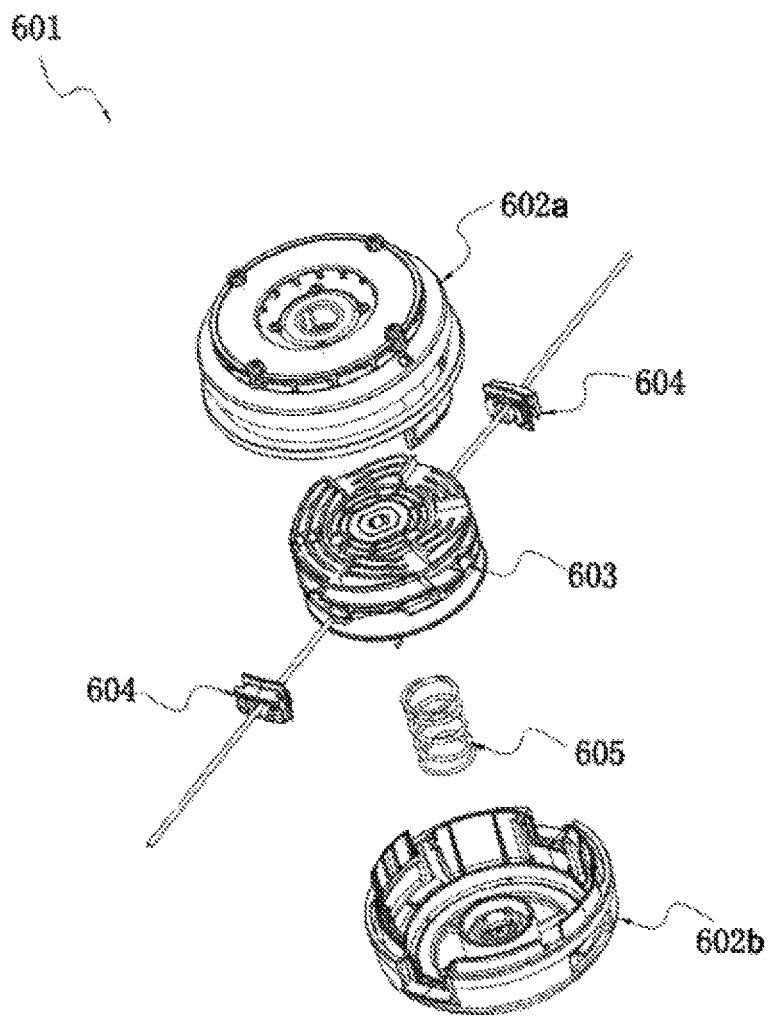
FIG. 30 is a schematic view illustrating another grass trimming head.
Figure 31:
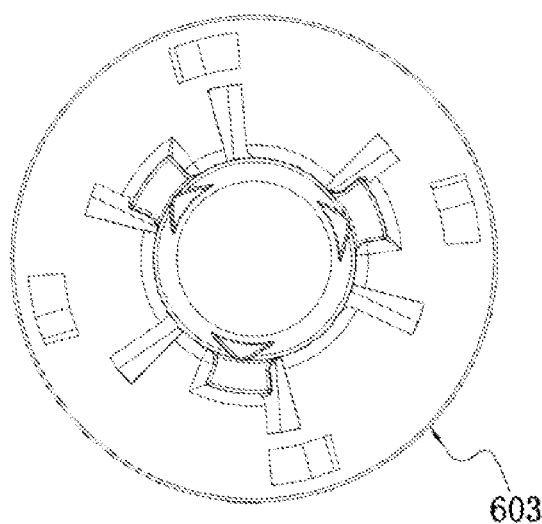
FIG. 31 is an exploded view of another perspective of the grass trimming head in FIG. 30.
Figure 32:
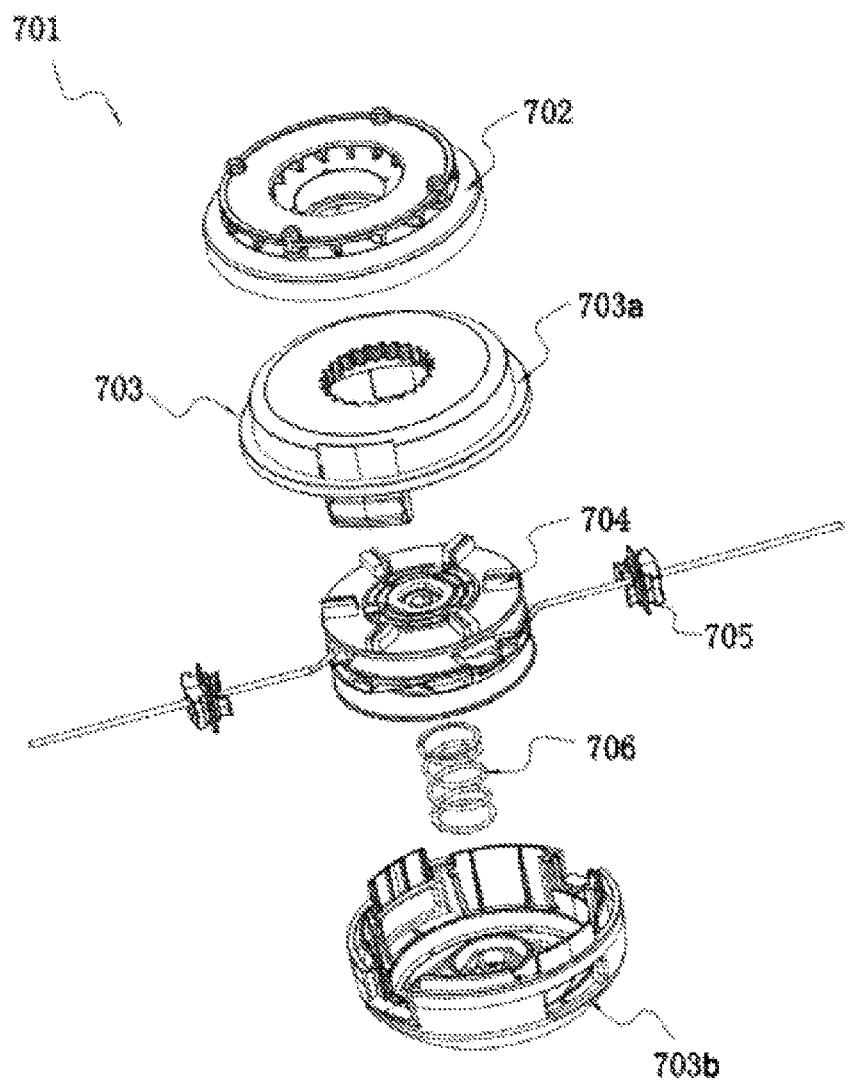
FIG. 32 is a schematic view illustrating the spool of the grass trimming head in FIG. 30.
Figure 33:
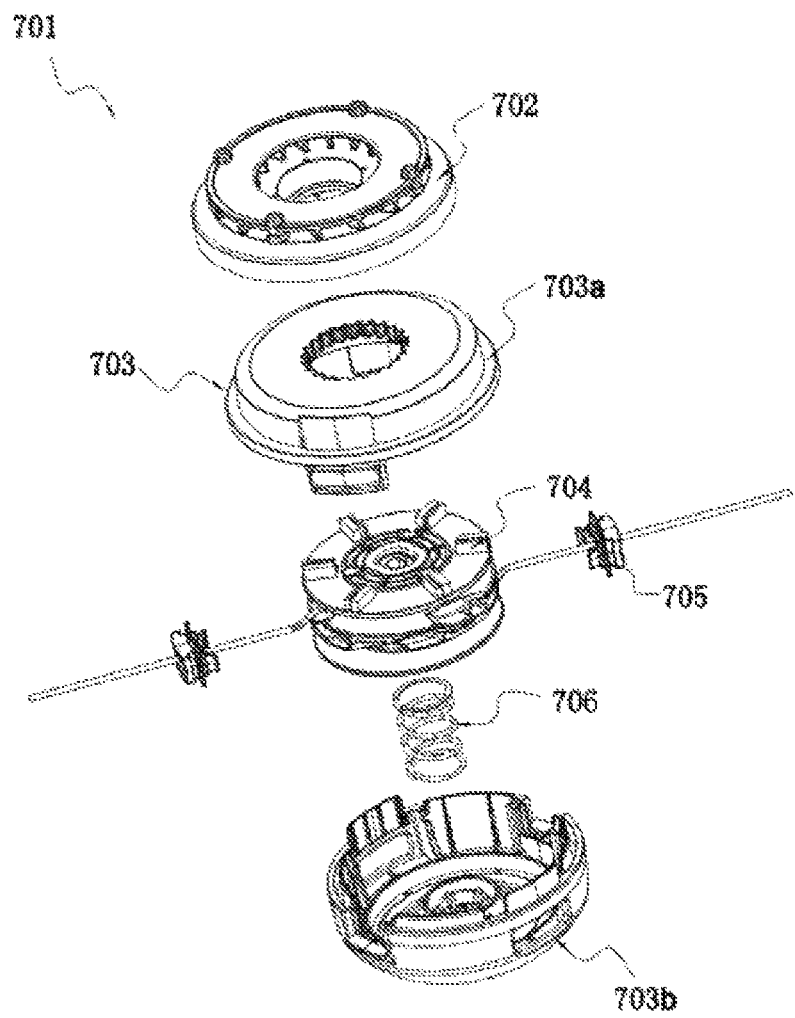
FIG. 33 is a schematic view illustrating another grass trimming head.
Figure 34:
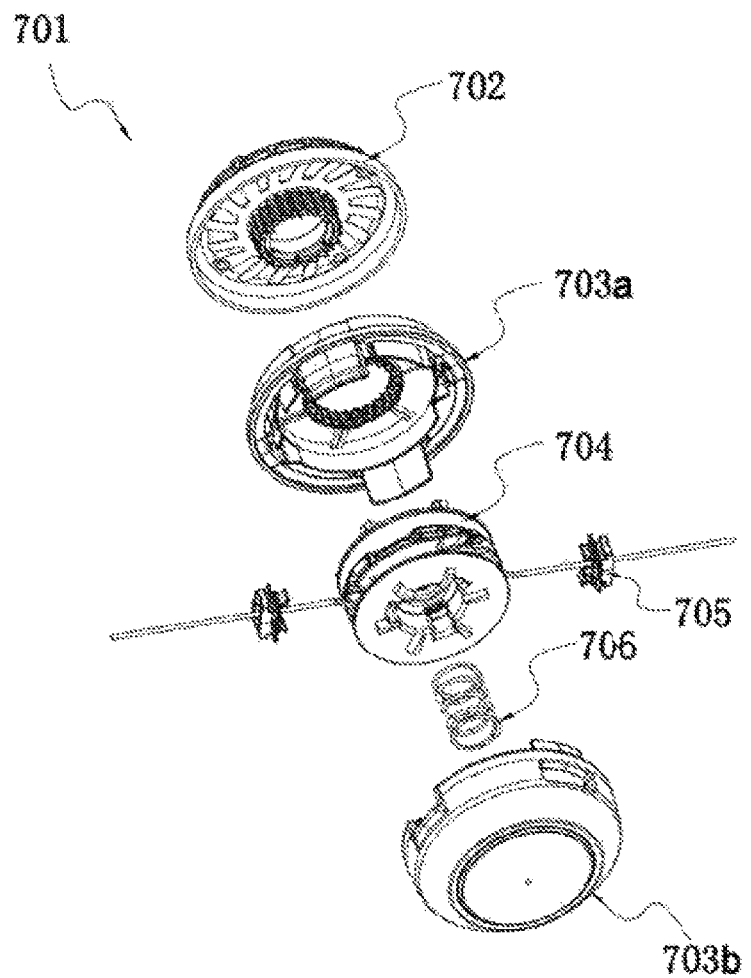
FIG. 34 is an exploded view illustrating the grass trimming head in FIG. 33.
Figure 35:
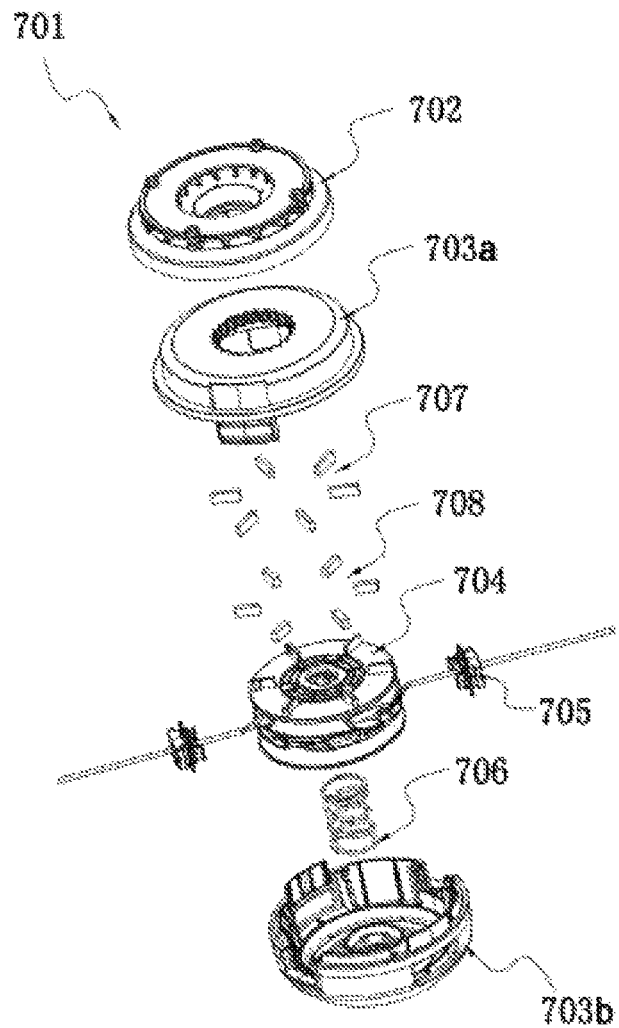
FIG. 35 is a schematic view illustrating a first magnetic member and a second magnetic member of the grass trimming head in FIG. 33.
Figure 36:
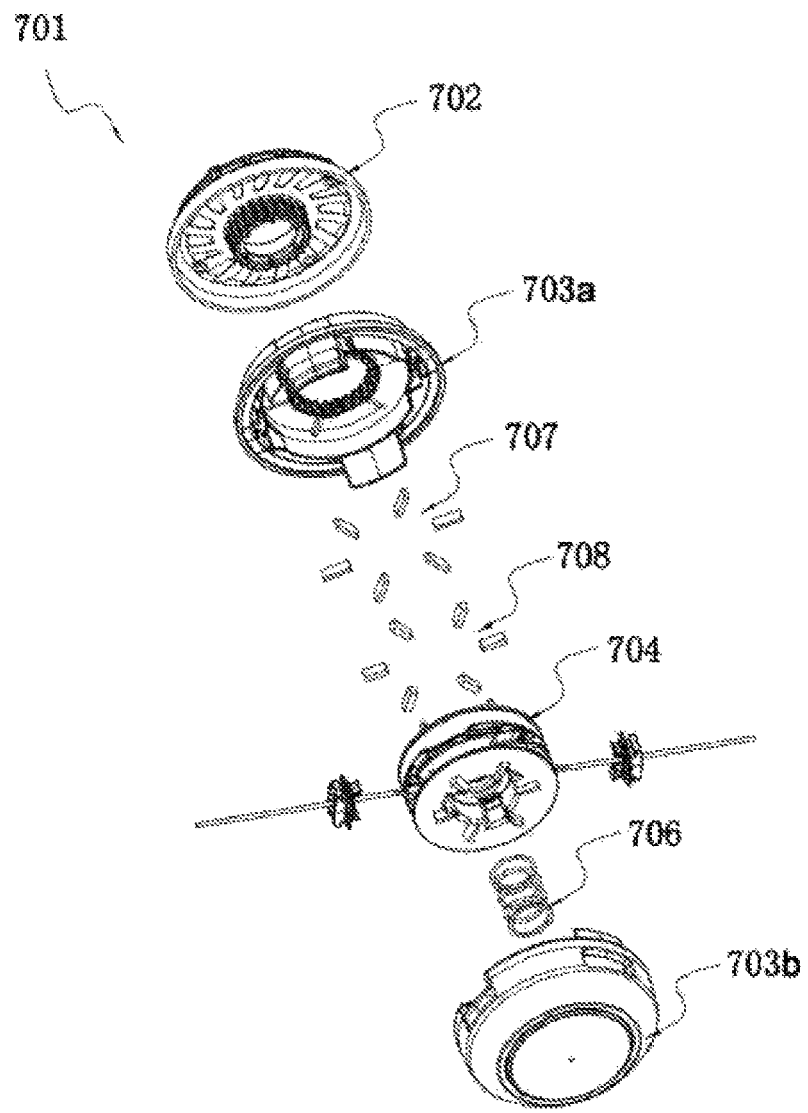
FIG. 36 is a schematic view illustrating another perspective the first magnetic member and the second magnetic member of the grass trimming head in FIG. 33.

As shown in FIG. 30 to FIG. 32, a grass trimming head 601 includes a spool 603 and a housing assembly. The housing assembly is formed with a housing cavity and provided with an outer aperture for cutting line passing through the housing cavity from the outside of the housing assembly. The housing assembly includes a housing 602 and an eyelet member 604. The housing 602 is formed with a housing cavity. At least a portion of the spool 603 is located inside the housing cavity. The housing 602 includes an upper housing 602a and the lower housing 602b. The eyelet member 604 is formed with an outer aperture. A spring 605 is arranged between the lower housing 602b and the spool 603.

Structures of the spool 603 and the housing assembly in FIG. 30 to FIG. 32 are the same as the structures of the spool 53 and the housing assembly in FIG. 1 to FIG. 12. A difference between the grass trimming head 601 in FIG. 30 to FIG. 32 and the grass trimming head 50 in FIG. 1 to FIG. 12 is that the grass trimming head 601 further includes an elastic member 603a. The elastic member 603a is a driving member. In one example, the elastic member 603a is an elastic tab. The elastic member 603a is fixed to a bottom portion of the spool 603, and connected to the spool 603 and the housing assembly. One end of the elastic member 603a is in contact with the lower housing 602b. The elastic member 603a applies an acting force to the lower housing 602b, and the acting force causes the lower housing 602b to rotate with respect to the spool 603 so that a first positioning surface and a second positioning surface go towards each other. In on example, when the elastic member 603a is compressed, the elastic member 603 generates at least one component force causing the lower housing 602b to rotate with respect to the spool 603, thereby driving the housing assembly to rotate with respect to the spool 603. When the first positioning surface is in contact with the second positioning surface, the spool 603 prevents the housing assembly from rotating. The elastic member 603 drives the housing 602 to rotate with respect to the spool 603, and the outer aperture is aligned with the inner aperture when the first positioning surface is in contact with the second positioning surface. The automatic alignment of the outer aperture and the inner aperture is convenient for the user. The user can conveniently insert the cutting line into the inner aperture through the outer aperture.

In one example, a torsion spring may be used as the driving member. The torsion spring is in contact with the spool and the housing to apply an acting force to the housing, and the acting force causes the housing to rotate with respect to the spool.

In one example, the driving member drives the spool to rotate with respect to the housing assembly. The driving member applies an acting force to the spool, and the acting force causes the spool to rotate with respect to the housing assembly.

In one example, the driving member drives the spool and the housing assembly to rotate. The driving member applies an acting force to the spool and the housing assembly, and the acting force causes the first positioning surface and the second positioning surface to go towards each other.

As shown in FIG. 33 to FIG. 36, a grass trimming head 701 includes a housing assembly. The housing assembly is formed with a housing cavity and an outer aperture. The cutting line can be inserted into the housing cavity from the outside of the housing assembly. At least a portion of a spool 704 is arranged inside the housing cavity. The spool 704 is rotatable with respect to the housing assembly about a central axis. The spool 704 is provided with an inner aperture for the cutting line to be inserted into. The inner aperture is configured to fix the cutting line.

In one example, the housing assembly includes a housing 703 and an eyelet member 705. The housing 703 is formed with the housing cavity. The housing 703 includes an upper housing 703a and a lower housing 703b. The eyelet member 705 is formed with an outer aperture, and fixed to the housing 703. The housing assembly is formed with a first positioning surface. The spool 704 is formed with a second positioning surface matched with the first positioning surface. When the first positioning surface is in contact with the second positioning surface, the inner aperture is aligned with an outer aperture.

The grass trimming head 701 further includes a fan 703. The fan 703 is synchronously rotated with the housing 703. The fan 702 in FIG. 33 to FIG. 36 is the same as the fan 58 in FIG. 1 to FIG. 12.

The grass trimming head 701 further includes a magnetic member. The magnetic member is used as the driving member. The magnetic member applies an acting force to the housing assembly or the spool 704, and the acting force causes the first positioning surface and the second positioning surface to go towards each other. The magnetic member applies an acting force to the housing assembly or the spool 704, and the acting force causes the housing assembly and the spool 704 to rotate with respect to each other so that the first positioning surface is in contact with the second positioning surface.

In one example, a first magnetic member 707 is fixed to the housing 703, and a second magnetic member 708 is fixed to the spool 704. A magnetic direction of the second magnetic member 708 is opposite to a magnetic direction of the first magnetic member 707. The first magnetic member 707 and the second magnetic member 708 repel each other to generate an acting force causing the spool 704 and the housing 703 to rotate with respect to each other.

In one example, the housing 703 is formed with a first matching tooth 703c. One end of the first matching tooth 703c is provided with a first positioning surface. The first magnetic member 707 is fixed to one end of the first matching tooth 703c facing away from the first positioning surface.

The spool 704 is formed with a first engaging tooth 704a. One end of the first engaging tooth 704a is provided with a second positioning surface. The second magnetic member 708 is fixed to one end of the first engaging tooth 704a facing away from the second positioning surface. A structure of the first matching tooth 703c of the housing assembly in FIG. 33 to FIG. 36 is different from the structure the first matching tooth 5211 of the housing assembly 51 in FIG. 1 to FIG. 12, while other structures thereof are the same. A structure of the first engaging tooth 704a of the spool 704 in FIG. 33 to FIG. 36 is different from the structure of the first engaging tooth 536 of the spool 53 in FIG. 1 to FIG. 12, while other structures thereof are the same. The first positioning surface in FIG. 33 to FIG. 36 is the same as the first positioning surface 5212 in FIG. 1 to FIG. 12. The second positioning surface in FIG. 33 to FIG. 36 is the same as the second positioning surface 5362 in FIG. 1 to FIG. 12.

In one example, a number of first engaging teeth 704a is the same as a number of inner apertures. A number of first magnetic members 707 is the same as a number of the inner apertures. A number of second magnetic members 708 is the same as a number of the inner apertures. In one example, six inner apertures are provided.

In one example, the grass trimmer includes a magnetic member and a metal member. The magnetic member is fixed to one of the spool and the housing, and the metal member is fixed to another of the spool and the housing. The magnetic member generates a suction force to the metal member. The magnetic member drives the housing assembly or the spool 704 to rotate with respect to the other one so that the first positioning surface is in contact with the second positioning surface, realizing the automatic alignment of the inner aperture and the outer aperture.

Figure 37:
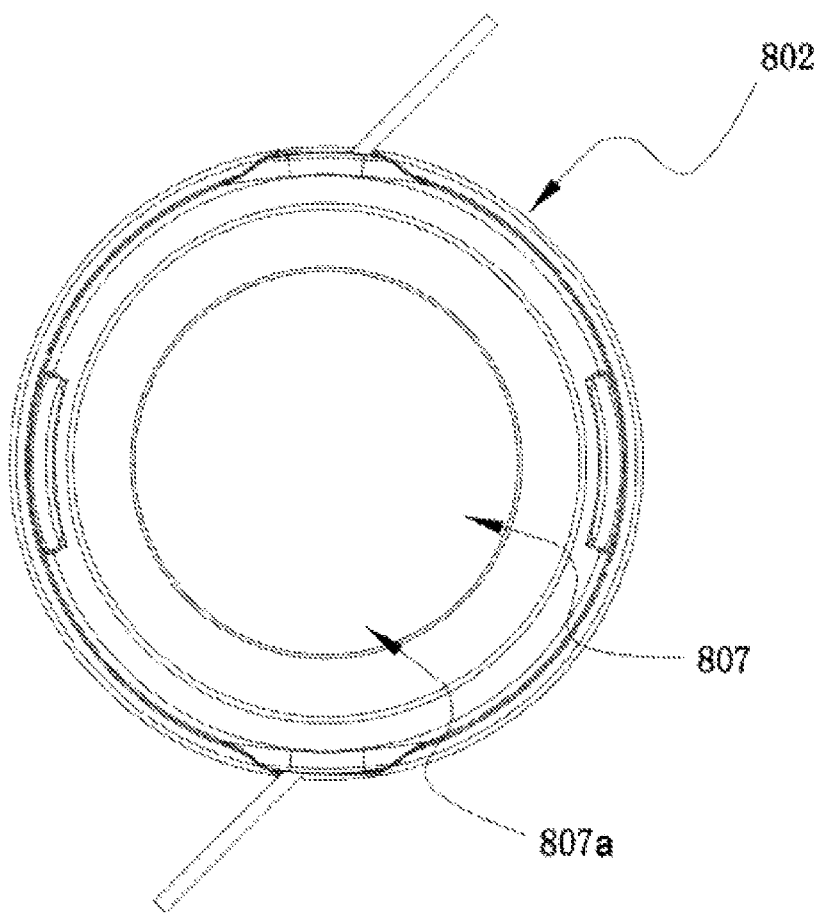
FIG. 37 is a schematic view illustrating another grass trimming head.
Figure 38:
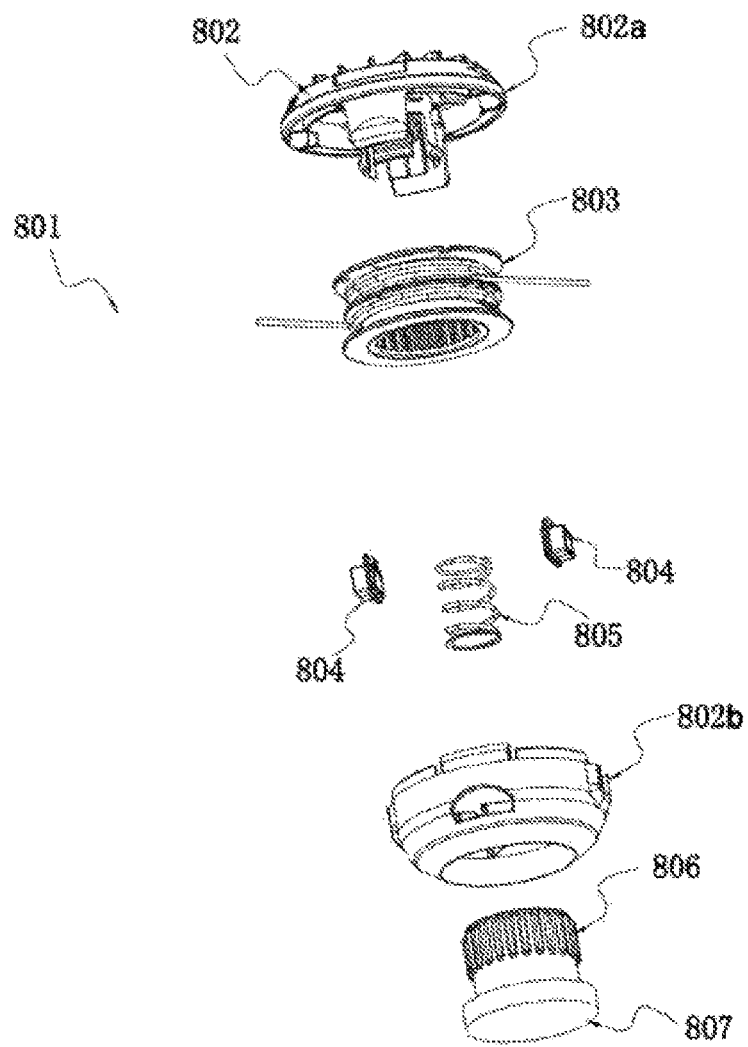
FIG. 38 is an exploded view illustrating the grass trimming head in FIG. 37.

As shown in FIG. 37 and FIG. 38, a grass trimming head 801 includes a housing 802, a spool 803, a knocking cap 807, a knocking cap supporting member 806 and a spring 805. The spool 803 is configured for the cutting line wining. At least portion of the spool 803 is arranged inside the housing 802, and the spool 803 is rotatable with respect to the housing 803 about a central axis. The housing 802 includes an upper housing 802a and a lower housing 802b. The spool 803 is located between the upper housing 802 and the lower housing 802b. The upper housing 802a is formed with a first matching tooth. The knocking cap supporting member 806 is formed with a first engaging tooth matched with the first matching tooth. In one example, the first engaging tooth is arranged on an inner surface of the knocking cap supporting member 806. An eyelet member 804 is fixed to the housing 802. The eyelet member 804 is formed with an outer aperture.

The spring 805 is arranged between the knocking cap supporting member 806 and the upper housing 802a. The knocking cap 807 is rotatably connected to the knocking cap supporting member 806. The knocking cap 807 includes a contact portion 807a protruding out of an outer surface of the housing 802. The contact portion 807a is configured to be in contact with the ground. The lower housing 802b is formed with an outlet. The knocking cap 807 protrudes out of the housing 802 from the outlet. The spool 803 is formed with a guiding portion. The knocking cap supporting member 806 is formed with a cooperating portion. The cooperating portion is arranged on an outer surface of the knocking cap supporting member 806. The guiding portion and the cooperating portion are matched so that the spool 803 and the knocking cap supporting member 806 remain in a synchronous rotation and are slidable along the central axis.

A ratio of a projection area of the contact portion 807a on a plane perpendicular to the central axis to a projection area of the housing 802 on the plane perpendicular to the central axis is greater than or equal to 0.3, and less than or equal to 1. A surface of the contact portion 807a is a smooth curved surface. A projection of the contact portion 807a on the plane perpendicular to the central axis has a circular shape.

In on example, the knocking cap supporting member and the spool may be a whole, that is, the knocking cap is rotatably connected to the spool.

Figure 39:
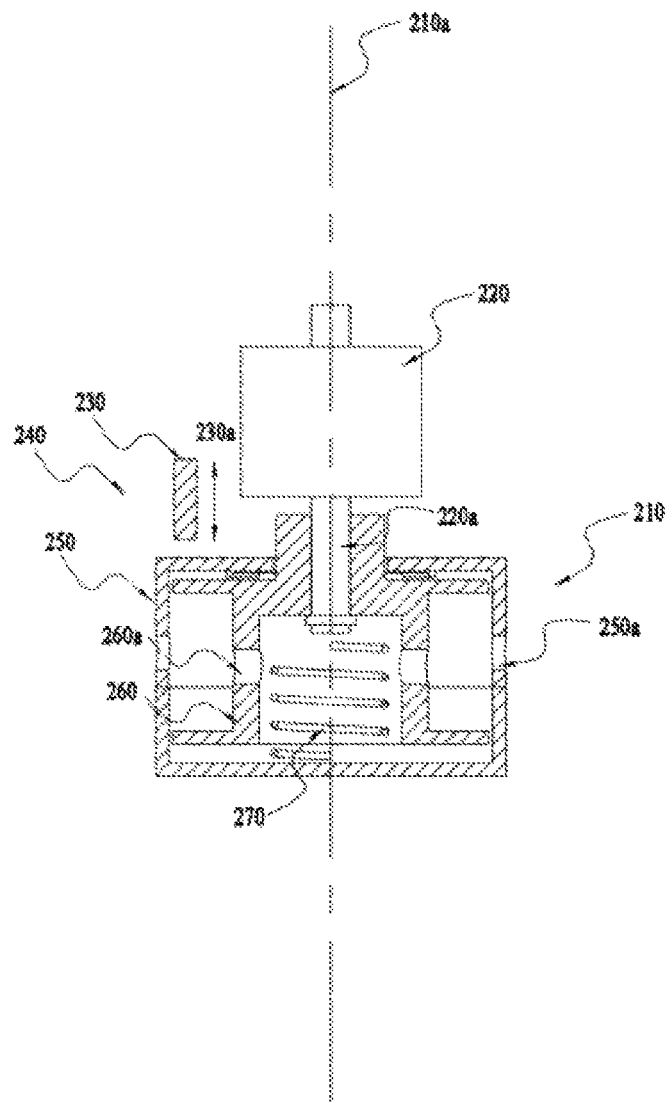
FIG. 39 is a schematic view illustrating a grass trimming head and a friction member.
Figure 40:
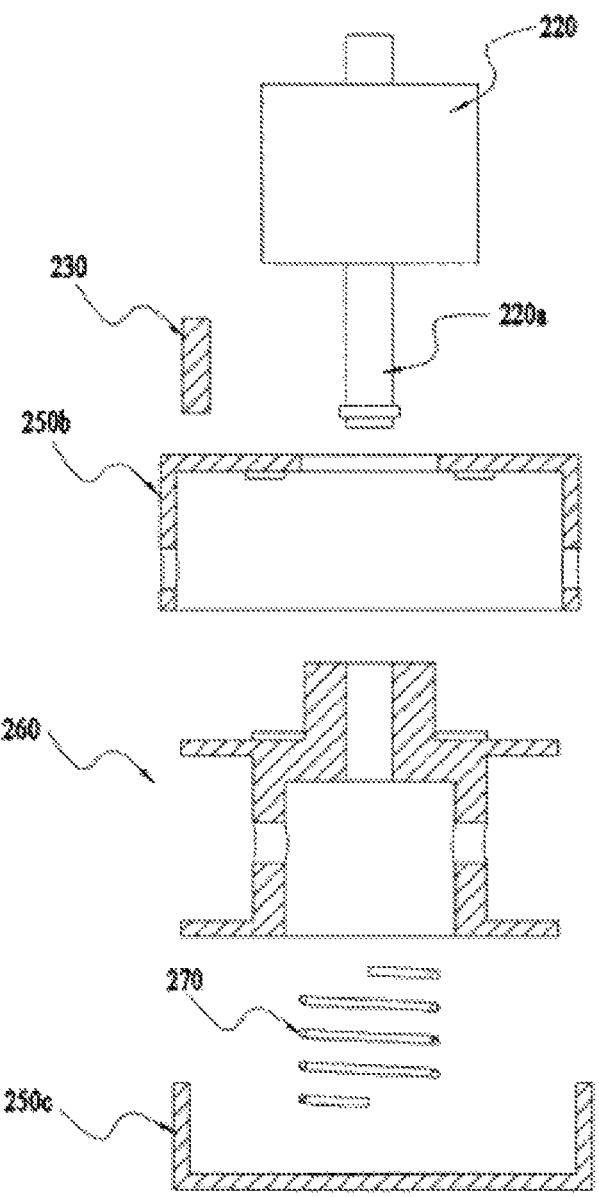
FIG. 40 is an exploded view illustrating the grass trimming head in FIG. 39.

As shown in FIG. 39 and FIG. 40, a grass trimming head 210 is configured to mount and accommodate a cutting line. One portion of the cutting line is accommodated inside the grass trimming head 210, and another portion of the cutting line protrudes out of the grass trimming head 210 to cut the vegetation when the grass trimming head 210 is rotated.

The motor 220 is configured to drive the grass trimming head 210 to rotate about a central axis 210a, thereby driving the cutting line to rotate to cut the vegetation. In one example, the motor 220 includes a motor shaft 220a. The motor shaft 220a is connected to the grass trimming head 210 to drive the grass trimming head 210 to rotate.

The grass trimming head 210 includes a spool 260 and a housing 250. The spool 260 is configured for the cutting line winding around and accommodated inside the housing 250. The spool 260 is provided with an inner aperture 260a. The inner aperture 260a is configured for fixing the cutting line or for the cutting line passing through. The housing 250 is formed with an outer aperture 250a for the cutting line passing through. In one example, the housing 250 includes an upper housing 250b and a lower housing 250c, which is convenient for the housing 250 to be assembled with the spool 260 and for the user to open the housing 250 to detect a situation inside the housing 250.

The grass trimming head 210 further includes a spring 270 applying an acting force between the housing 250 and the spool 260. The spring 27 applies an acting force causing the spool 260 to go away from the lower housing 250c.

When the cutting line needs to be replenished by the user, the user may align the inner aperture 260a with the outer aperture 250a, and then insert the cutting line into the inner aperture 260a through the outer aperture 250a. As long as the spool 260 and the housing 250 are moved with respect to each other, the cutting line is limited by the outer aperture 250a so that the cutting line is gradually wound around the spool 260 with the moving of the outer aperture 250a with respect to the spool 260. The motor shaft 220a is connected to the spool 260, and directly drives the spool 260 to rotate about the central axis 210a. The spool 260 is rotatably connected to the housing 250.

The grass trimmer further includes a damping device 240. In one example, the damping device 240 includes a friction member 230. The friction member 230 is movable along a direction 230a. When the friction member 230 is moved to be in contact with the housing 250, the friction member 230 causes, due to the contact friction, the housing 250 to have a tendency to rotate about the spool 260. With the increase of the friction force, the friction member 230 causes the spool 260 and the housing 250 to rotate with respect to each other, so that the grass trimmer has an auto-winding mode. The motor 220 drives at least one of the spool 260 and the housing 250 so that the spool 260 and the housing 250 are rotated with respect to each so as to automatically wind the cutting line around the spool 260. In one example, under the driving of the motor 220 and the action of the friction member 230, the spool 260 and the housing 250 are rotated with respect to each other so as to automatically wind the cutting line around the spool 260. The friction member 230 does not completely prevent the housing 250 from rotating, but only reduce a rotational speed of the housing 250, thereby realizing the relative rotation of the spool 260 and the housing 250.

Of course, when the spool 260 is wound by enough cutting line and a portion of the cutting line protruding out of the housing 250 is not sufficient to cut the vegetation, the spool 260 and the housing 250 is relatively rotated to realize the automatic string release.

In one example, the friction member 230 is configured to generate a damping function on the housing 250 so as to slow down the rotation of the housing 250, thereby causing the housing 250 and the spool 260 to relatively rotate. The user may directly or indirectly operate the friction member 230 to realize the cutting mode and the auto-winding mode of the grass trimmer. Of course, the user may firstly place the friction member 230 under a state corresponding to a desired mode and then start the motor 220.

Figure 41:
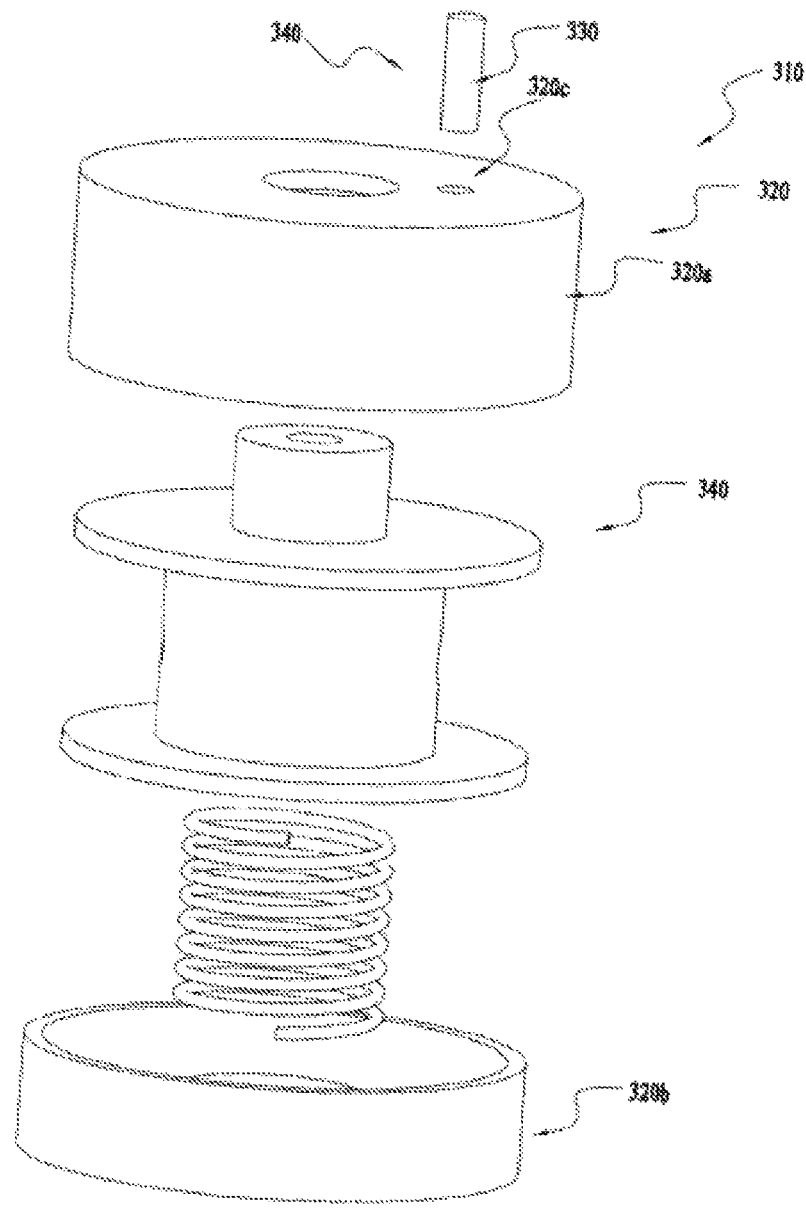
FIG. 41 is a schematic view illustrating a grass trimming head and a stopping member.
Figure 42:
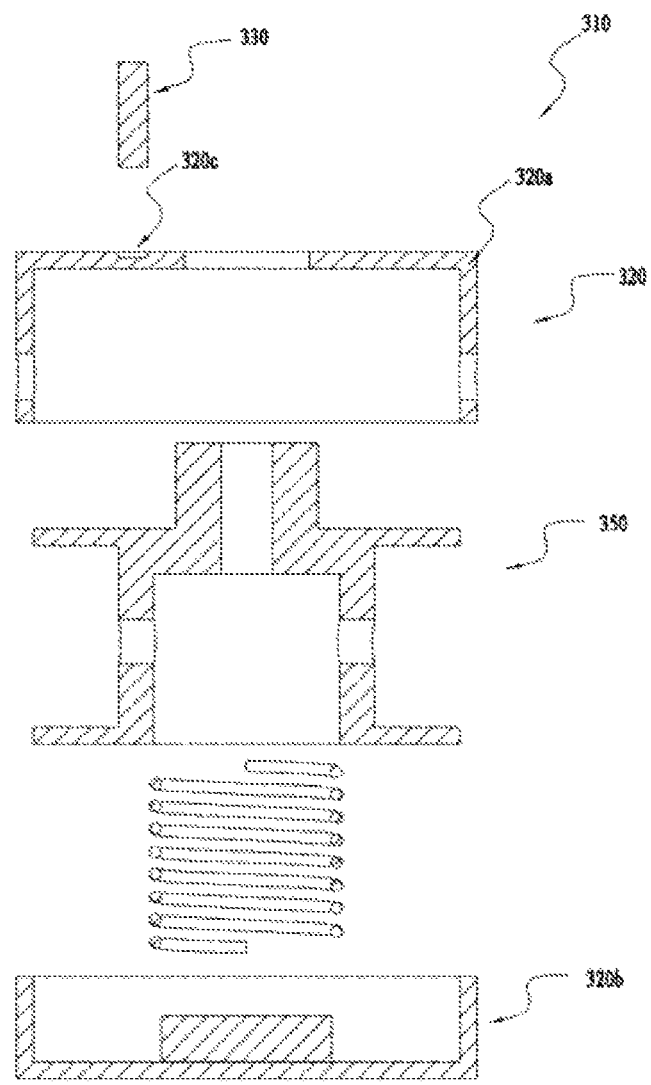
FIG. 42 is an exploded view illustrating another perspective of the stopping member of the grass trimming head in FIG. 41.

As shown in FIG. 41 and FIG. 42, in one example, a grass trimming head 310 includes a spool 350 and a housing 320. The housing 320 includes an upper housing 320a and a lower housing 320b.

Compared to the damping device 240 in FIG. 39 and FIG. 40, a damping device 340 in FIG. 41 and FIG. 42 includes a stopping member 330 for preventing the housing 320 from rotating. The housing 320 is formed with a stopping groove 320c matched with the stopping member 330. In one example, the stopping groove 320c is arranged on the upper housing 320a. In the auto-winding mode, the stopping member 330 is inserted into the stopping groove 320c and matched with the stopping groove 320c, so that the housing 320 is completely prevented from rotating with respect to the whole grass trimmer. Also, the relative rotation of the spool 350 and the housing 320 is realized so that the cutting line can be automatically wound around the spool 350, realizing the automatic winding function.

The stopping member 330 is also configured to damp the rotation of the housing 320. The difference is as follows. The damping effect of the friction member 230 is to slow down the moving tendency. The damping effect of the stopping member 330 is to limit the displacement. The slowing down of the moving tendency and the limitation of the displacement are both defined as damping. The friction member 230 and the stopping member 330 may be both considered as the damping device 340.

Figure 43:
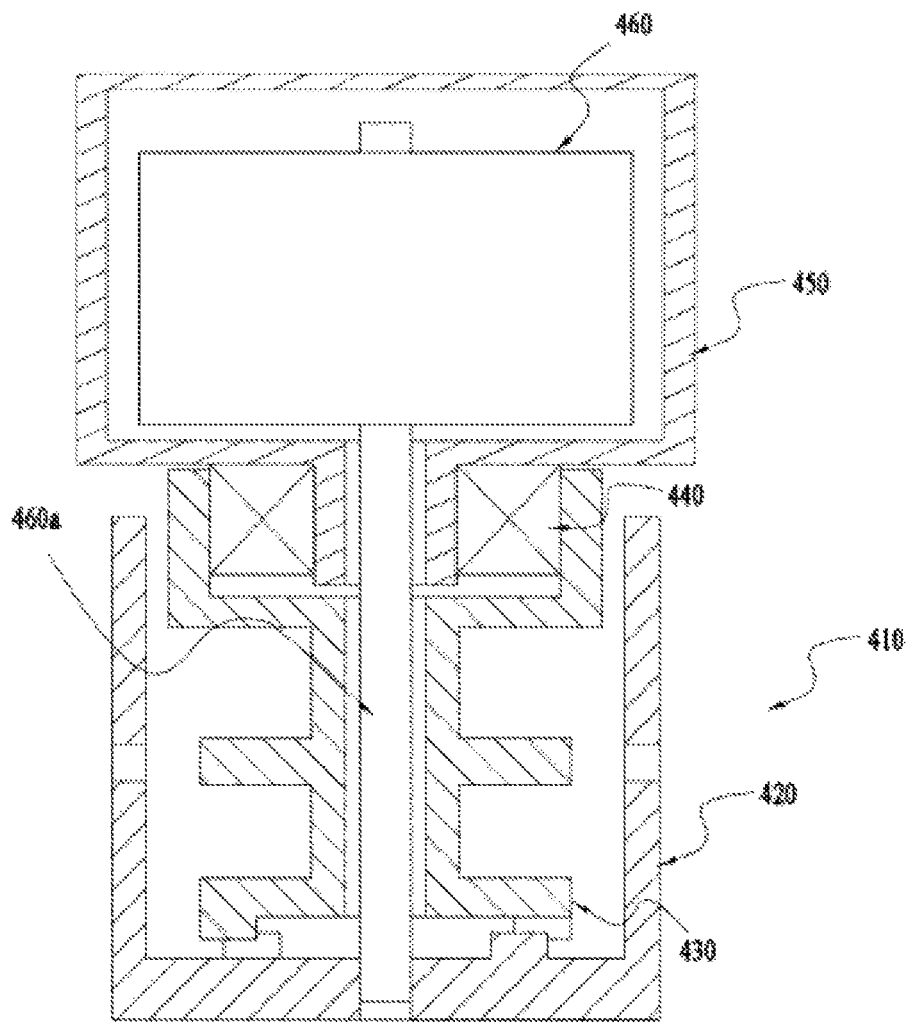
FIG. 43 is a schematic view illustrating of a motor and a grass trimming head.
Figure 44:
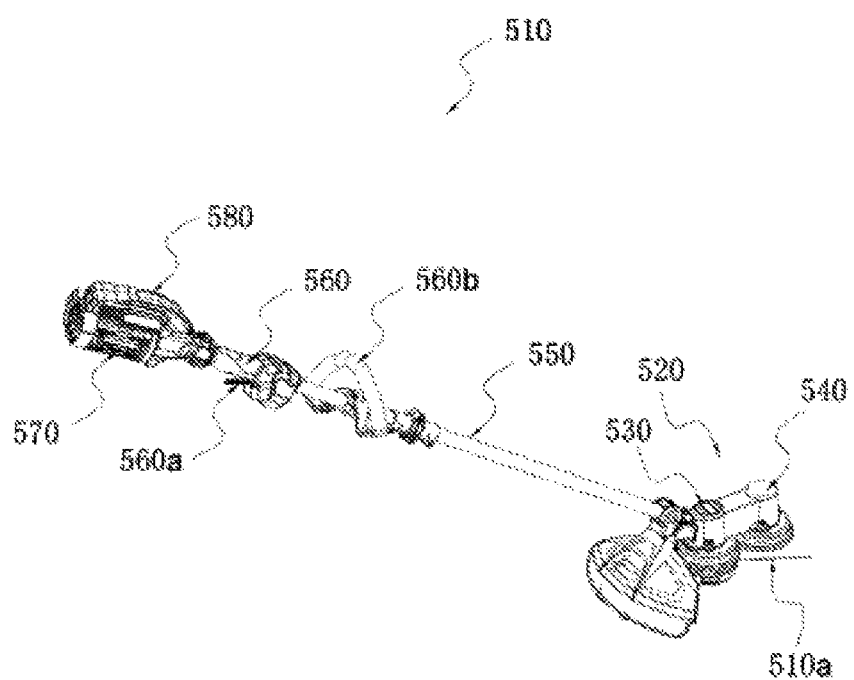
FIG. 44 is a schematic view illustrating another grass trimmer.
Figure 45:
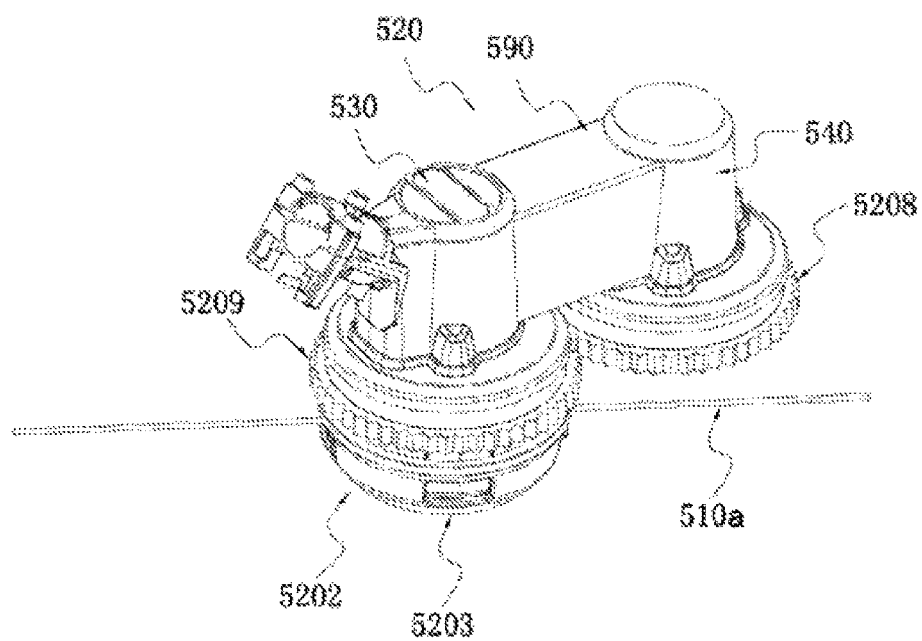
FIG. 45 is a partial structural schematic view illustrating the grass trimmer in FIG. 44.
Figure 46:
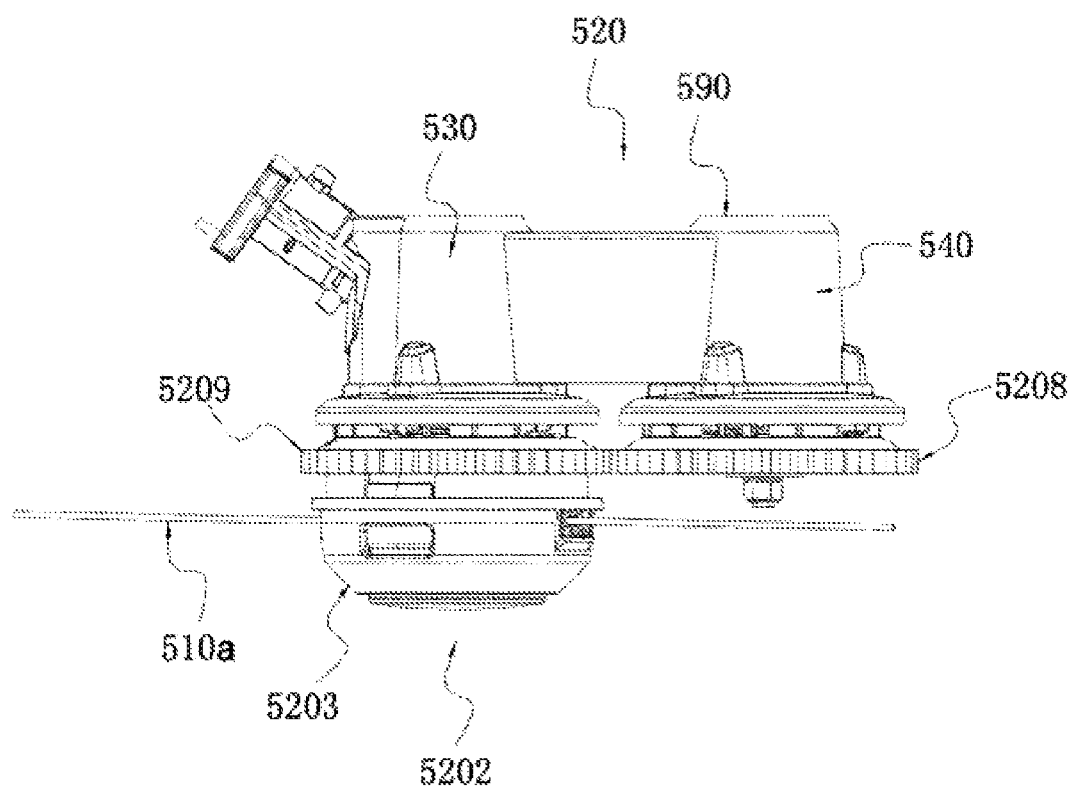
FIG. 46 is a schematic view illustrating another perspective of the partial grass trimmer in FIG. 45.
Figure 47:
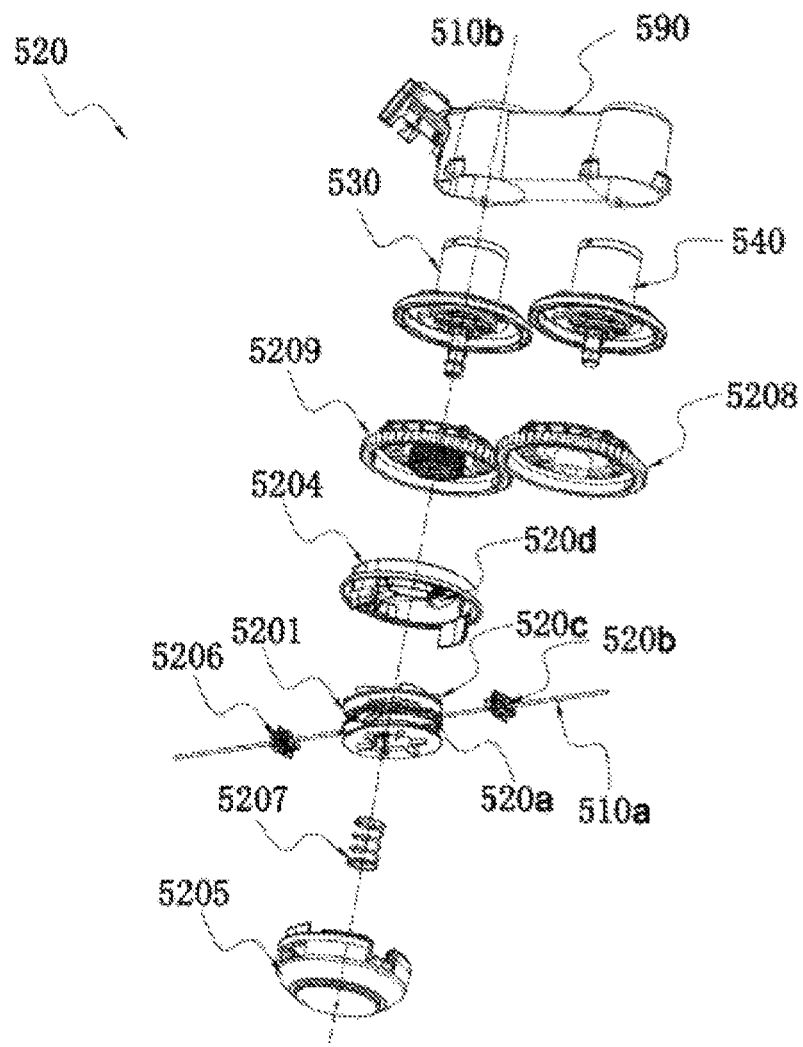
FIG. 47 is an exploded view of the partial grass trimmer in FIG. 45.
Figure 48:
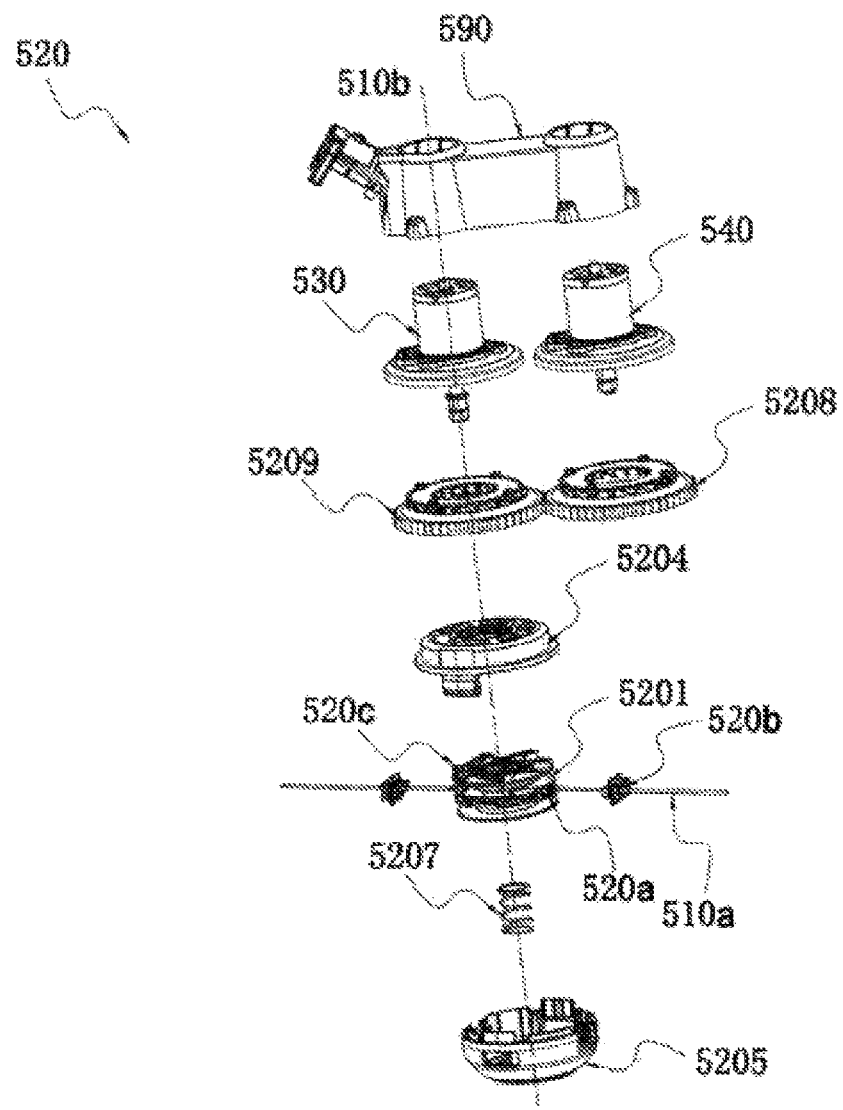
FIG. 48 is an exploded view of another perspective of the partial grass trimmer in FIG. 45.
Figure 49:
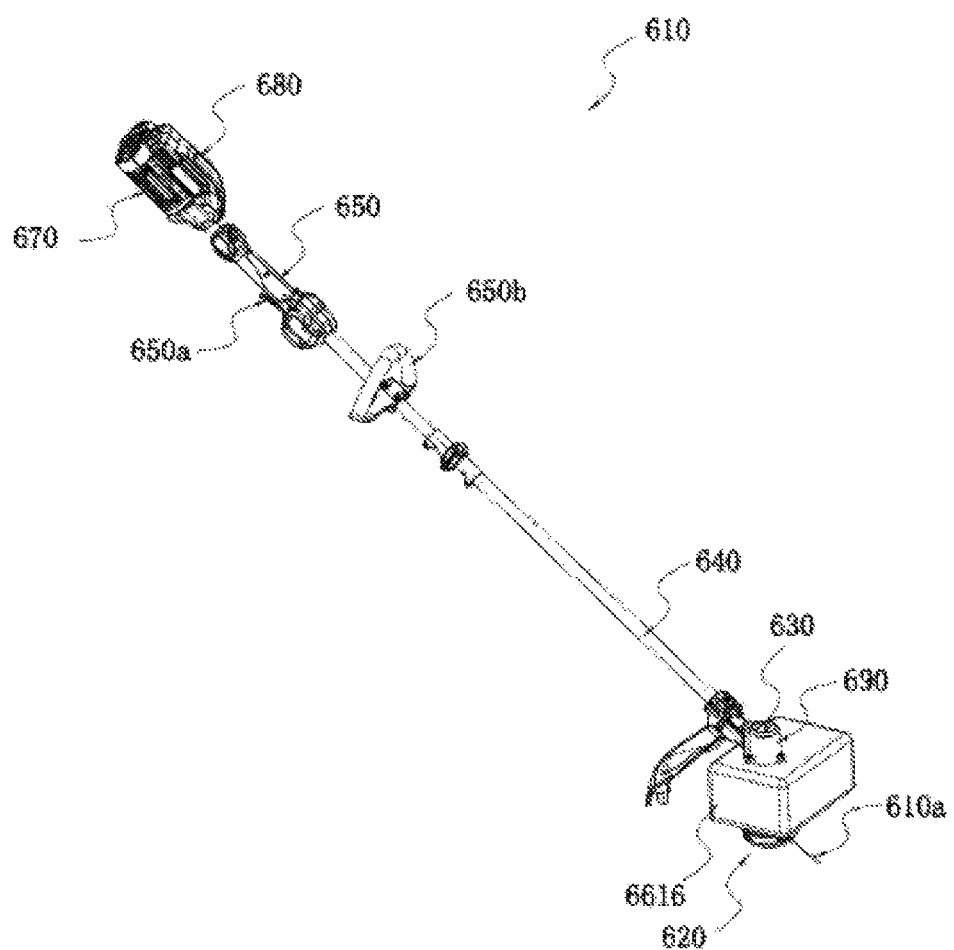
FIG. 49 is a schematic view illustrating another grass trimmer.
Figure 50:
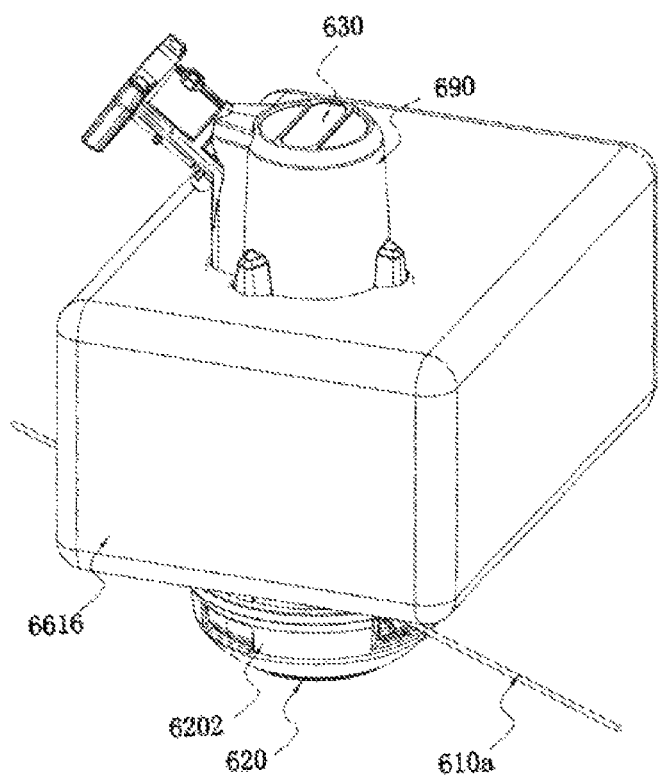
FIG. 50 is a partial structural schematic view illustrating the grass trimmer in FIG. 49.
Figure 51:
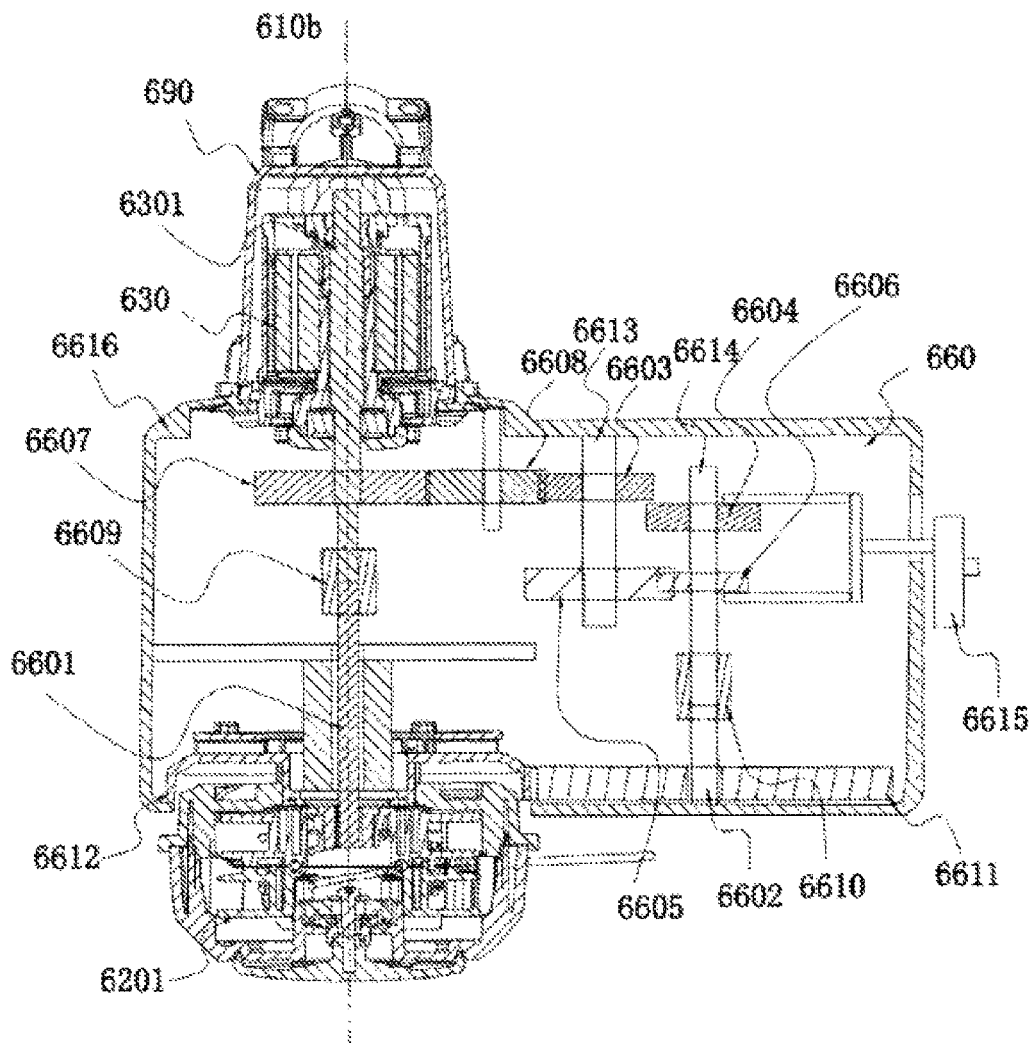
FIG. 51 is a schematic view illustrating a function switching member in FIG. 50 being at a second position.
Figure 52:
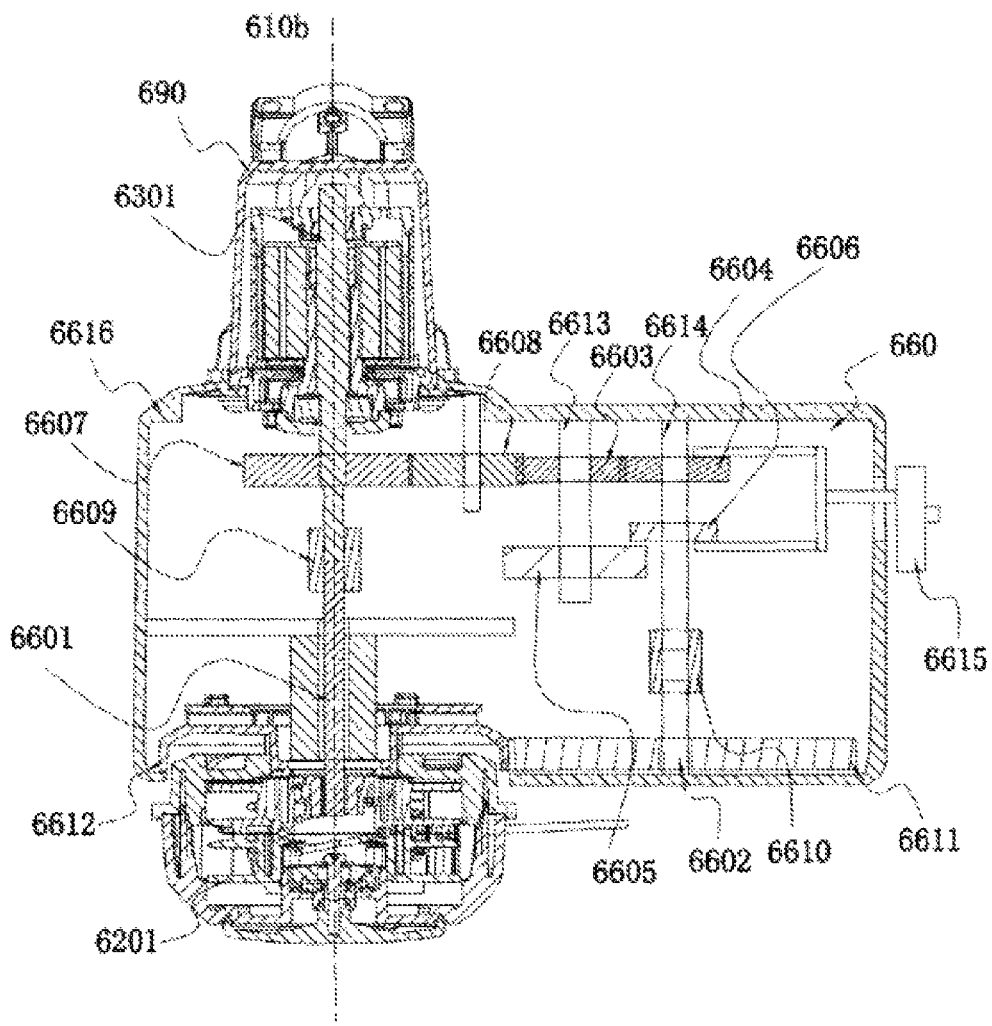
FIG. 52 is a schematic view illustrating the function switching member in FIG. 50 being at a first position.

FIG. 43 shows a solution in which a motor shaft 460a of the motor 460 drives the housing 420 and a one-way bearing 440 is adopted to damp the spool 430.

As shown in FIG. 43, the grass trimming head 410 includes a spool 430 and a housing 420. The motor 460 is accommodated by the motor housing 450. The one-way bearing 440 is arranged between the spool 430 and the motor housing 450 so that the spool 430 is rotatable with respect to the motor housing 450 in only one direction. In one example, the motor housing 450 is formed with a boss portion. An inner ring of the one-way bearing 440 is sleeved on an outer periphery of the boss portion, and fixedly connected to the motor housing 450. An outer ring of the one-way bearing 440 is rotatable with respect to the motor housing 450 in only one direction. The outer ring of the bearing 440 is prevented from rotating with respect to the motor housing 450 in another direction. The spool 430 is sleeved on the outer ring of the one-way bearing 440. The one-way bearing 440 enables the spool 430 to rotate with respect to the motor housing 450 in only one direction.

The motor shaft 460a is arranged throughout the spool 430 and does not directly drive the spool 430, namely the motor shaft 460 does not directly transmit the torque to the spool 430. The motor shaft 460a is in a non-rotational connection to the housing 420 and directly drives the housing 420.

According to the foregoing solutions and principles, when the motor 460 is rotated in a forward direction, the spool 430 and the housing 420 may be synchronously rotated to perform the cutting mode. And when the motor 460 is rotated in a reverse direction, the spool 430 remains still, and the spool 430 and the housing 420 may be relatively rotated to perform the auto-winding mode.

It will be appreciated that the damping device may not only apply a resistance force damping the rotation of the housing to the housing, but also apply a resistance force damping the rotation of the spool to the spool.

In one example, the damping device may apply the damping effect to the spool and the housing. In one example, the damping device may include a first damping member and a second damping member. The first damping member applies a first resistance force damping the rotation of the spool to the spool. The second damping member applies a second resistance force damping the rotation of the housing to the housing. Due to the first resistance force and the second resistance force, the housing and the spool are relatively rotatable.

As shown in FIG. 44 to FIG. 48, a grass trimmer 510 includes a grass trimming head 520, a first motor 530, a second motor 540, a connecting pipe 550 and a handle 560.

The grass trimming head 520 is configured to mount or fix the cutting line 510a. The handle 560 is used for being gripped by the user. The grass trimmer 510 includes a trigger 560a. The trigger 560a is configured to activate the first motor 530 and the second motor 540. The trigger 560a is arranged on the handle 560. When gripping the handle 560, the user can operate the trigger 560a to control the first motor 530 and the second motor 540. The connecting pipe 550 is connected to the handle 560 and the grass trimming head 520. The grass trimmer 510 further includes an auxiliary handle 560b. The auxiliary handle 560b is fixed to the connecting pipe 550. In one example, the auxiliary handle 560b is located between the grass trimming head 520 and the handle 560. The user can grip the handle 560 and the auxiliary handle 560b by both hands respectively. In one example, the connecting pipe 550 has a hollow tubular structure, and substantially extends along a straight line.

The grass trimmer 510 further includes a power supply device for supplying power to the first motor 530 and the second motor 540. In one example, the power supply device is a battery pack 570. Of course, the power supply device may be a cable or an interface that is connected to an AC power supply network or a battery. The cable or the interface may supply the power of the AC power supply network or the battery to the grass trimmer 510.

The grass trimmer 510 includes a main housing 580. The battery pack 570 is fixed by the main housing 580. The battery pack 570 is detachably connected to the main housing 580. The main housing 580 is fixed to one end of the connecting pipe 550. The grass trimmer 510 includes a circuit board for controlling the first motor 530 and the second motor 540. The circuit board is arranged inside the main housing 580.

The grass trimmer 510 further includes a motor housing 590. The first motor 530 and the second motor 540 is accommodated by the motor housing 590. The motor housing 590 is fixed to another end of the connecting pipe 550. The connecting pipe 550 is connected to the main housing 580 and the motor housing 590. The motor housing 590 and the main housing 580 are fixed to two ends of the connecting pipe 550 respectively.

The grass trimming head 520 includes a spool 5201 and a housing assembly 5202. The spool 5201 is configured for the cutting line 510a winding. At least a portion of the spool 5201 is arranged inside the housing assembly 5202, and the spool 5201 is rotatable with respect to the housing assembly 5202 about a central axis 510b. The first motor 530 is configured to drive the spool 5201 to rotate, and the second motor 540 is configured to drive the housing assembly 5202 to rotate. A rotational axis of the first motor 530 is parallel to a rotational axis of the second motor 540.

The grass trimmer 510 further includes a driving gear 5208 and a driven gear 5209. The second motor 540 is configured to drive the driving gear 5208 to rotate. The driving gear 5208 is engaged with the driven gear 5209 to drive the driven gear 5209 to rotate. The driven gear 5209 is coupled to the housing assembly 5202. The driven gear 5209 and the housing assembly 5202 are synchronously rotated. In one example, the driving gear 5208 includes a plurality of blades. The driving gear 5208 is used as a fan to generate airflow for cooling the second motor 540. Similarly, the driven gear 5209 includes a plurality of blades. The driven gear 5209 is used as a fan to generate airflow for cooling the first motor 530.

In one example, the driven gear and the housing assembly are configured to be a whole. That is, no driven gear is provided, and the housing assembly is formed with a gear engaged with the driving gear.

In one example, the housing assembly includes a plurality of blades, and is formed with a fan.

The grass trimmer 510 has an auto-winding mode and a cutting mode. The cutting mode is a mode that the grass trimmer 510 is operated by the user to perform the vegetation cutting operation. The auto-winding mode is a mode that the cutting line 510a is automatically wound around the spool 5201 to complete the string winding without the user manually rotating the spool 5201 or the housing assembly 5202.

In the cutting mode, a rotational speed of the spool 5201 driven by the first motor 530 is the same as a rotational speed of the housing assembly 5202 driven by the second motor 540. A rotation direction of the spool 5201 is the same as a rotation direction of the housing assembly 5202. Under the driving of the first motor 530 and the second motor 540, the spool 5201 and the housing assembly 5202 are synchronously rotated.

In the auto-winding mode, the spool 5201 is rotated with respect to the housing assembly 5202, so that the cutting line 510a is automatically wound around the spool 5201. The housing assembly 5202 is formed with an outer aperture 520b. When the cutting line 510a wound around the spool 5201 is used up, the user inserts the cutting line 510a through the outer aperture 520b of the housing assembly 5202, and fixes the cutting line 510a to the spool 5201. In the auto-winding mode, under the driving of the first motor 530 and the second motor 540, the spool 5201 and the housing assembly 5202 are relatively rotated, and the cutting line 510a is automatically wound around the spool 5201.

In one example, a rotational speed of the spool 5201 with respect to the housing assembly 5202 in the auto-winding mode is less than a rotational speed of the spool 5201 in the cutting mode. The rotational speed of the spool 5201 with respect to the housing assembly 5202 is a winding speed of the cutting line 510a. The winding speed of the cutting line 510a is relatively low, which contributes to the safety of the user's operation. The rotational speed of the spool 5201 in the cutting mode is a rotational speed of the grass trimming head 520. The rotational speed of the grass trimming head 520 is relatively high, so that the efficiency of grass trimming is high.

In one example, in the cutting mode, the first motor 530 drives the spool 5201 to rotate along one direction. In the auto-winding mode, the first motor 530 drives the spool 5201 to rotate along a direction opposite to the one direction.

In another example, in the cutting mode, the first motor drives the spool to rotate along one direction. In the auto-winding mode, the second motor drives the housing assembly to rotate along the same one direction, and the spool is still, so that the spool is rotated with respect to the housing assembly.

In another example, in the cutting mode, the first motor drives the spool to rotate along one direction. In the auto-winding mode, the first motor drives the spool to rotate along the same one direction, and the second motor drives the housing assembly to rotate along the same one direction. A rotational speed of the housing assembly driven by the second motor is greater than a rotational speed of the spool driven by the first motor, so that the spool is rotated with respect to the housing assembly.

The housing assembly 5202 is formed with the outer aperture 520b, and the cutting line 510a can be inserted into the housing assembly 5202 from the outside of the housing assembly 5202 through the outer aperture 520b. The spool 5201 is provided with the inner aperture 520a for the cutting line 510a trimming in. The housing assembly 5202 includes a housing 5203 and an eyelet member 5206. The spool 5201 is accommodated by the housing 5203. The eyelet member 5206 is formed with the outer aperture 520b. The housing 5203 includes an upper housing 5204 and a lower housing 5205. The spool 5201 is located between the upper housing 5204 and the lower housing 5205.

In one example, the housing assembly includes the housing, and the housing is formed with the outer aperture. That is, no eyelet member is provided.

The grass trimmer 510 further includes a controller, and the controller is configured to control the first motor 530 and the second motor 540 so that the spool 5201 and the housing assembly 5202 can be stopped at a position at which the inner aperture 520a is aligned with the outer aperture 520b. In one example, each of the first motor 530 and the second motor 540 is a brushless motor. The control detects rotor positions of the first motor 530 and the second motor 540 and controls the first motor 530 and the second motor 540 so as to align the outer aperture 520b with the inner aperture 520a. The controller is arranged on the circuit board. In other words, the controller is composed of electrical components on the circuit board.

In one example, the grass trimmer 510 further includes a Hall sensor detecting a position of the spool 5201 or the housing assembly 5202, and an inductive controller controlling the first motor 530 and the second motor 540 to stop the spool 5201 and the housing 5203 at a position at which the inner aperture 520a is aligned with the outer aperture 520b. Based on the position of the spool 5201 and the position of the housing 5203 detected by the Hall sensor, the inductive controller controls the first motor 530 and the second motor 540 to align the outer aperture 520b with the inner aperture 520a.

When the user needs to wind the cutting line 510a around the spool 5201, the user can directly insert the cutting line 510a into the inner aperture 520a through the outer aperture 520b. Then the user starts the auto-winding mode, the spool 5201 and the housing assembly 5202 are relatively rotated under the driving of the first motor 530 and the second motor 540, and the cutting line 510a is automatically wound around the spool 5201.

The grass trimmer 510 cuts the vegetation through the rotation of the cutting line 510a protruding out of the grass trimming head 520. When the grass trimmer 510 is in the cutting mode for a long time, the cutting line 510a is in contact with the grass and is worn, causing the cutting line 510 being shortened. At this point, the user needs to increase a length of the cutting line 510a protruding out of the housing assembly 5202.

The grass trimmer 510 also has a auto feeding mode. The rotation direction of the spool 5201 with respect to the housing assembly 5202 in the auto feeding mode is opposite to the rotation direction of the spool 5201 with respect to the housing assembly 5202 in the auto-winding mode. The spool 5201 release portion of the cutting line 510a wound around the spool 5201, to increase the length of the cutting line 510a protruding out of the housing assembly 5202. The grass trimmer 510 further includes a controller for controlling the spool 5201 to rotate a preset angle with respect to the housing assembly 5202 in the auto feeding mode.

In one example, the grass trimming head 520 may also release a certain length of cutting line 510*a* by a knocking manner. That is, the grass trimmer 510 has a knock feeding mode. The spool 5201 is provided with a first engaging tooth 520*c*. The housing assembly 5202 is formed with a first matching tooth 520*d* matched with the first engaging tooth 520*c*. The first engaging tooth 520*c* and the first matching tooth 520*d* are matched to release a desired length of cutting line 510*a*. The grass trimming head 520 further includes a spring 5207. The spring 5207 applies an acting force between the lower housing 5205 and the spool 5201, and is arranged between the lower housing 5205 and the spool 5201.

As shown in FIG. 42 to FIG. 52, a grass trimmer 610 includes a grass trimming head 620, a motor 630, a connecting pipe 640, a handle 650 and a transmission mechanism 660.

The grass trimming head 620 is configured to mount or fix the cutting line 610*a*. The motor 630 is configured to drive the grass trimming head 620 to rotate.

The handle 650 is configured for being gripped by the user. The grass trimmer 610 includes a trigger 650*a* for activating the motor 630. The trigger 650*a* is arranged on the handle 650. When gripping the handle 650, the user can operate the trigger 650*a* to control the motor 630. The connecting pipe 640 is connected to the handle 650 and the grass trimming head 620. The grass trimmer 610 further includes an auxiliary handle 650*b*. The auxiliary handle 650*b* is fixed to the connecting pipe 640. In one example, the auxiliary handle 650*b* is located between the grass trimming head 620 and the handle 650. The user can grip the handle 560 and the auxiliary handle 650*b* by both hands respectively. In one example, the connecting pipe 640 has a hollow tubular structure, and substantially extends along a straight line.

The transmission mechanism is connected to the grass trimming head 620 and the motor 630 so as to realize the motor 630 driving the grass trimming head 620 to rotate.

The grass trimmer 610 further includes a power supply device for supplying power to the motor 630. In one example, the power supply device is a battery pack 670. Of course, the power supply device may be a cable or an interface that is connected to an AC power supply network or a battery. The cable or the interface may supply the power of the AC power supply network or the battery to the grass trimmer 610.

The grass trimmer 610 includes a main housing 680. The battery pack 670 is fixed by the main housing 680. The battery pack 670 is detachably connected to the main housing 680. The main housing 680 is fixed to one end of the connecting pipe 640. The grass trimmer 610 includes a circuit board for controlling the motor 630. The circuit board is arranged inside the main housing 680.

The grass trimmer 610 further includes a motor housing 690. The motor 630 is accommodated by the motor housing 690. The motor housing 690 is fixed to another end of the connecting pipe 640. The connecting pipe 640 is connected to the main housing 680 and the motor housing 690. The motor housing 690 and the main housing 680 are fixed to two ends of the connecting pipe 640 respectively. The motor 630 and the grass trimming head 620 are located on a same end of the connecting pipe 640. Such grass trimmer 610 is generally referred to as a pre-motor 630 grass trimmer 610.

In on example, the motor 630 and the grass trimming head 620 are located on two ends of the connecting pipe 640. Such grass trimmer 610 is generally referred to as a near-motor 630 grass trimmer 610.

The grass trimming head 620 includes a spool 6201 and a housing assembly 6202. The spool 6201 is configured for the cutting line 610*a* winding. At least a portion of the spool 6201 is arranged inside the housing assembly 6202 and rotatable with respect to the housing assembly 6202 about a central axis 610*b*.

The grass trimmer 610 has an auto-winding mode and a cutting mode. The cutting mode is a mode that the grass trimmer 610 is operated by the user to perform the vegetation cutting operation. The auto-winding mode is a mode that the cutting line 610*a* is automatically wound around the spool 6201 to complete the string winding without the user manually rotating the spool 6201 or the housing assembly 6202.

In the cutting mode, the motor 630 drives the grass trimming head 620 to rotate about the central axis 610*b*. In one example, the motor 630 drives the spool 6201 and the housing assembly 6202 to synchronously rotate.

In the auto-winding mode, the motor 630 drives the spool 6201 and the housing assembly 6202 to relatively rotate to automatically wind the cutting line 610*a* around the spool 6201. The housing assembly 602 is formed with an outer aperture. When the cutting line 610*a* wound around the spool 6201 is used up, the user inserts the cutting line 610*a* through the outer aperture of the housing assembly 6202, and fixes the cutting line 610*a* to the spool 6201. In the auto-winding mode, the spool 6201 and the housing assembly 6202 are relatively rotated, and the cutting line 610*a* is automatically wound around the spool 6201.

The transmission mechanism 660 includes a first output shaft 6601 and a second output shaft 6602. The motor 630 drives the first output shaft 6601 and the second output shaft 6602 to rotate. The motor shaft 6301 simultaneously drives the first output shaft 6601 and the second output shaft 6602 to rotate. The first output shaft 6601 drives the spool 6201 to rotate, and the second output shaft 6602 drives the housing assembly 6202 to rotate.

The transmission mechanism 660 has a first running state and a second running state. When the transmission mechanism 660 is in the first running state, a rotational speed of the spool 6201 driven by the first output shaft 6601 is the same as a rotational speed of the housing assembly 6202 driven by the second output shaft 6602, and rotation directions of the spool 6201 and the housing assembly 6202 are the same. The spool 6201 and the housing assembly 6202 are synchronously rotated, at this moment, the grass trimmer 610 is in the cutting mode.

When the transmission mechanism 660 is in the second running state, the motor 630 drives the spool 6201 and the housing assembly 6202 to relatively rotate so as to automatically wind the cutting line 610*a* around the spool 6201, and at this moment, the grass trimmer 610 is in the auto-winding mode. In one example, when the transmission mechanism 660 is in the second running state, the rotational speed of the spool 6201 driven by the first output shaft 6601 is different from the rotational speed of the housing assembly 6202 driven by the second output shaft 6602.

In one example, a rotational speed of the spool 6201 with respect to the housing assembly 6202 in the auto-winding mode is less than a rotational speed of the spool 6201 in the cutting mode. The rotational speed of the spool 6201 with respect to the housing assembly 6202 is a winding speed of the cutting line 610*a*. The winding speed of the cutting line 610a is relatively low, which contributes to the safety of the user's operation. The rotational speed of the spool 6201 in the cutting mode is a rotational speed of the grass trimming head 620. The rotational speed of the grass trimming head 620 is relatively high, so that the efficiency of grass trimming is high.

In one example, the rotational speed of the spool 6201 in the auto-winding mode is less than the rotational speed of the spool 6201 in the cutting mode. In the auto-winding mode, the rotational speeds of the spool 6201 and the housing assembly 6202 are relatively low, which avoids the damages caused by the housing where the spool 6201 and the housing assembly 6202 are accidentally touched by the user.

In the cutting mode, the first output shaft 6601 drives the spool 6201 to rotate in one direction. In the auto-winding mode, the first output shaft 6601 drives the spool 6201 to rotate in a direction opposite to the one direction.

In one example, in the cutting mode, the motor 630 is rotated in a forward direction. In the auto-winding mode, the motor 630 is rotated in a reverse direction. The rotational speed of the motor 630 rotated in the forward direction is greater than the rotational speed of the motor 630 rotated in the reverse direction.

In one example, in the cutting mode, the first output shaft 6601 drives the spool 6201 to rotate in one direction. In the auto-winding mode, the first output shaft 6601 drives the spool 6201 to rotate in the same one direction, and the second output shaft 6602 drives the housing assembly 6202 to rotate in the same one direction; the rotation speed of the housing assembly 6202 driven by the second output shaft 6602 is greater than the rotational speed of the spool 6201 driven by the first output shaft 6601, so that the housing assembly 6202 and the spool 6201 are relatively rotates to automatically wind the cutting line 610a around the spool 6201.

The grass trimmer 610 is provided with a function switching member 6615. The function switching member 6615 is movable between a first position and a second position. When the function switching member 6615 is at the first position, the transmission mechanism 660 is in the first running state. When the function switching member 6615 is at the second position, the transmission mechanism 660 is in the second running state.

The transmission mechanism 660 further includes a first transmission gear 6603, a second transmission gear 6604, a third transmission gear 6605 and a fourth transmission gear 6606. The third transmission gear 6605 and the first transmission gear 6603 are coaxially rotated, and the fourth transmission gear 6606 and the second transmission gear 6604 are coaxially rotated.

The transmission mechanism 660 further includes a gear housing 6616, a driving gear 6607, a driven gear 6608, a first shaft coupling 6609, a second shaft coupling 6610, a first drive gear 6611, a second drive gear 6612, a first shaft 6613 and a second shaft 6614.

The first transmission gear 6603, the second transmission gear 6604, the third transmission gear 6605, and the fourth transmission gear 6606 are accommodated by the gear housing 6616. The driving gear 6607 is fixed to the motor shaft 6301. The driving gear 6607 is engaged with the driven gear 6608 to drive the driven gear 6608 to rotate. The driven gear 6608 is engaged with the first transmission gear 6603 to drive the first transmission gear 6603 and the third transmission gear 6605 to rotate. The first transmission gear 6603 and the third transmission gear 6605 are fixed to the first shaft 6613. The second transmission gear 6604 and the fourth transmission gear 6606 are fixed to the second shaft 6614. The second shaft 6614 is connected to the second output shaft 6602 through the second shaft coupling 6610. The second 6614 is slidable with respect to the second output shaft 6602. By the arrangement of the first shaft coupling 6609, the second shaft 6614 and the second output shaft 6602 may remain in a synchronous rotation. The first drive gear 6611 is fixed to the second output shaft 6602. The shaft 6301 is connected to the first output shaft 6601 through the first shaft coupling 6609. The motor shaft 6301 and the first output shaft 6601 are synchronously rotated.

In one example, no first shaft coupling is provided, and the first output shaft and the motor shaft are configured to be a whole. In other words, the motor shaft is used as the first output shaft. A rotor of the motor drives the first output shaft to rotate.

When the function switching member 6615 is at the first position, the transmission mechanism 660 is in the first running state. At this moment, the motor 630 drives the first drive transmission gear 6603 and the third transmission gear 6605 to rotate; the first transmission gear 6603 and the second transmission gear 6604 are engaged; and the third transmission gear 6605 and the fourth transmission gear 6606 are unengaged, so as to drive the second shaft 6614 to rotate. The second shaft 6614 drives the second output shaft 6602 to rotate. The second output shaft 6602 drives the first drive gear 6611 to rotate. The first drive gear 6611 is engaged with the second drive gear 6612 to drive the second drive gear 6612 to rotate. The first output shaft 6601 drives the spool 6201 to rotate. The spool 6201 and the housing assembly 6202 can remain in a synchronous rotation.

The second drive gear 6612 is coupled to the housing assembly 6202. The second driving gear 6612 and the housing assembly 6202 are synchronously rotated. The housing assembly 6202 is slidable with respect to the second drive gear 6612 along a rotational axis, which ensures that the first drive gear 6611 and the second drive gear 6612 keep engaged when the user knocks the grass trimming head 620 to release the cutting line. In one example, the second drive gear 6612 is provided with a plurality of fan blades. The second drive gear 6612 is used as a fan.

In one example, the housing assembly is provided with a plurality of fan blades.

When the auto-winding mode needs to be performed by the user, the function switching member 6615 is moved to the second position. The third transmission gear 6605 is engaged with the fourth transmission gear 6606, and the first transmission gear 6603 is unengaged with the second transmission gear 6604, so that the motor 630 drives the second shaft 6614. Since a transmission ratio of the third transmission gear 6605 to the fourth transmission gear 6606 is different from a transmission ratio of the first transmission gear 6603 to the second transmission gear 6604, the rotational speed of the housing assembly 6202 when the function switching member 6615 is at the second position is different from the rotational speed of the housing assembly 6202 when the function switching member 6615 is at the first position. Since the rotational speed of the spool 6201 when the function switching member 6615 is at the first position is the same as the rotational speed of the spool 6201 when the function switching member 6615 is at the second position, the rotational speeds of the spool 6201 and the housing assembly 6202 are different when the function switching member 6615 is at the second position. The spool 6201 and the housing assembly 6202 are relatively rotated to automatically wind the cutting line 610a around the spool 6201, realizing the automatic winding.

The basic principles, main features and advantages of the present disclosure have been shown and described above. It is to be understood by any person skilled in the art that the foregoing examples are not intended to limit the present disclosure in any form. All technical solutions obtained by equivalent substitution or equivalent transformation are within the scope of the present disclosure.

What is claimed is:

1. A grass trimmer, comprising:
a trimming head; and
a motor for driving the trimming head,
wherein the trimming head comprises:
    a housing assembly formed with a housing cavity, wherein the housing assembly is provided with outer apertures for allowing a cutting line to be inserted from outside of the housing assembly into the housing cavity; and
    a spool at least partially disposed in the housing cavity and rotatable relative to the housing assembly about a central axis, wherein the spool is provided with inner apertures for the cutting line to be inserted,
wherein the spool has a line loading position relative to the housing assembly, and the cutting line is capable of being passed through the outer apertures and be directly inserted into the inner apertures when the spool is in the line loading position,
wherein the spool is formed with a plurality of first engaging portions arranged in a circumferential direction around the central axis, the housing assembly is formed with a plurality of first matching portions corresponding to the plurality of the first engaging portions, each of the plurality of first matching portions is formed with a first positioning surface, and each of the plurality of first engaging portions is formed with a second positioning surface,
wherein when the spool is rotated relative to the housing assembly to a position where the first positioning surface and the second positioning surface contact, the spool is in the line loading position, and
wherein each of the plurality of first matching portions is formed with a first inclined surface, each of the plurality of first engaging portions is formed with a second inclined surface, the first inclined surface and the first positioning surface are located on two sides of each of the plurality of first matching portions, and the second inclined surface and the second positioning surface are located on two sides of each of the plurality of first engaging portions.

2. The grass trimmer according to claim 1, wherein the trimming head further comprises a spring disposed between the housing assembly and the spool, and the spring applies a force to the spool or the housing assembly to make the first positioning surface and the second positioning surface closer to each other.

3. The grass trimmer according to claim 1, wherein the trimming head further comprises a spring disposed between the housing assembly and the spool, and the spring applies a force to the spool or the housing assembly to make the plurality of first engaging portions contact with the plurality of first matching portions.

4. The grass trimmer according to claim 1, wherein the housing assembly comprises an upper housing and a lower housing, the plurality of first matching portions are arranged on the upper housing, and the plurality of first engaging portions are formed on an upper portion of the spool.

5. The grass trimmer according to claim 1, wherein an even number of the plurality of first engaging portions are provided.

6. The grass trimmer according to claim 1, wherein a number of the plurality of first engaging portions is the same as a number of the inner apertures.

7. The grass trimmer according to claim 1, wherein the inner aperture and the outer aperture are aligned when the spool is in the line loading position.

8. The grass trimmer according to claim 1, wherein the spool is provided with a line guide passage for the cutting line passing through the spool, and two ends of the line guide passage are defined as the inner apertures.

9. The grass trimmer according to claim 1, wherein the trimming head further comprises a driving member for applying a force to the spool or the housing assembly to make the first positioning surface and the second positioning surface closer to each other.

10. A grass trimmer, comprising:
a trimming head; and
a motor for driving the trimming head,
wherein the trimming head comprises:
    a housing assembly formed with a housing cavity, wherein the housing assembly is provided with outer apertures for allowing a cutting line to be inserted from outside of the housing assembly into the housing cavity; and
    a spool at least partially disposed in the housing cavity and rotatable relative to the housing assembly about a central axis, wherein the spool is provided with inner apertures for the cutting line to be inserted,
wherein the housing assembly is provided with a first positioning surface, and the spool is provided with a second positioning surface for matching with the first positioning surface, and
wherein the trimming head further comprises a driving member for driving the spool to rotate to a position where the second positioning surface contacts with the first positioning surface, so that a selected one of the inner apertures and a corresponding one of the outer apertures are aligned.

11. A trimming head comprises:
a housing assembly formed with a housing cavity, wherein the housing assembly is provided with outer apertures for allowing a cutting line to be inserted from outside of the housing assembly into the housing cavity; and
a spool at least partially disposed in the housing cavity and rotatable relative to the housing assembly about a central axis, wherein the spool is provided with inner apertures for the cutting line to be inserted,
wherein the spool has a line loading position relative to the housing assembly, and the trimming head allows the cutting line to pass through the outer apertures and the inner apertures when the spool is in the line loading position,
wherein the spool is formed with a plurality of first engaging portions, the housing assembly is formed with a plurality of first matching portions corresponding to the plurality of the first engaging portions, each of the plurality of first matching portions is formed with a first positioning surface, and each of the plurality of first engaging portions is formed with a second positioning surface,
wherein when the spool is rotated relative to the housing assembly to a position where the first positioning surface and the second positioning surface contact, the spool is in the line loading position, and wherein each of the plurality of first matching portions is formed with a first inclined surface, each of the plurality of first engaging portions is formed with a second inclined surface, the first inclined surface and the first positioning surface are located on two sides of each of the plurality of first matching portions, and the second inclined surface and the second positioning surface are located on two sides of each of the plurality of first engaging portion.

12. The trimming head according to claim 11, wherein the trimming head further comprises a spring disposed between the housing assembly and the spool, and the spring applies a force to the spool or the housing assembly to make the first positioning surface and the second positioning surface closer to each other.

13. The trimming head according to claim 11, wherein the housing assembly comprises an upper housing and a lower housing, the plurality of first matching portions are arranged on the upper housing, and the plurality of first engaging portions are formed on an upper portion of the spool.

14. The trimming head according to claim 11, wherein an even number of the plurality of first engaging portions are provided.

15. The trimming head according to claim 11, wherein a number of the plurality of first engaging portions is the same as a number of the inner apertures.

16. The trimming head according to claim 11, wherein the inner aperture and the outer aperture are aligned when the spool is in the line loading position.

17. The trimming head according to claim 11, wherein the spool is provided with a line guide passage for the cutting line passing through the spool, and two ends of the line guide passage are defined as the inner apertures.

18. The trimming head according to claim 11, wherein the trimming head further comprises a driving member for applying a force to the spool or the housing assembly to make the first positioning surface and the second positioning surface closer to each other.

* * * * *